United States Patent [19]
Hibi et al.

[11] Patent Number: 5,724,097
[45] Date of Patent: Mar. 3, 1998

[54] ADAPTIVE QUANTIZATION OF VIDEO BASED ON EDGE DETECTION

[75] Inventors: Taketoshi Hibi; Tomohiro Ueda; Satoshi Kurahashi; Ken Onishi, all of Nagaokakyo, Japan

[73] Assignee: Mitsubishi Denki Kabushiki Kaisha, Tokyo, Japan

[21] Appl. No.: 325,100

[22] Filed: Oct. 18, 1994

[30] Foreign Application Priority Data

| Oct. 18, 1993 | [JP] | Japan | 5-284308 |
| Oct. 18, 1993 | [JP] | Japan | 5-284309 |
| Dec. 27, 1993 | [JP] | Japan | 5-349950 |
| Dec. 27, 1993 | [JP] | Japan | 5-349953 |
| Dec. 27, 1993 | [JP] | Japan | 5-349954 |

[51] Int. Cl.$^6$ ............................................. H04N 7/30
[52] U.S. Cl. ............................................. 348/405; 348/420
[58] Field of Search ........................... 348/405, 419, 348/384, 390, 420; 382/251, 252; H04N 7/137, 7/133, 7/13

[56] References Cited

U.S. PATENT DOCUMENTS

| 5,150,208 | 9/1992 | Otaka et al. | 348/405 |
| 5,251,028 | 10/1993 | Iu | 348/400 |
| 5,369,439 | 11/1994 | Matsuda et al. | 348/405 |
| 5,374,958 | 12/1994 | Yanagihara | 348/405 |
| 5,491,761 | 2/1996 | Kim | 348/405 |

FOREIGN PATENT DOCUMENTS

| 5-103316 | 4/1993 | Japan . |
| 5-95539 | 4/1993 | Japan . |
| 5-268001 | 7/1993 | Japan . |

*Primary Examiner*—Bryan S. Tung

[57] ABSTRACT

A video signal is divided into blocks, and an orthogonal transform is performed on each block to obtain transformed coefficients. Of the transformed coefficients thus obtained, dominant transformed coefficients are selected from a low-frequency area and a high-frequency area, and based on the dominant transformed coefficients, an evaluation value is calculated, using which value a specific pattern in the video signal is detected. Based on the specific pattern thus detected, an optimum quantization step size is decided, and the transformed coefficients are adaptively quantized, thus preventing image quality degradation.

9 Claims, 53 Drawing Sheets

DC: DC COMPONENT
→ : SCANNING ORDER

FIG. 8
 PRIOR ART

| CLASS NUMBER | 1 | 2 | 3 | 4 |
|---|---|---|---|---|
| QUANTIZATION TABLE NUMBER ADDITIONAL VALUE | 0 | 1 | 2 | 3 |

FIG. 10
PRIOR ART

| QUANTIZATION TABLE NUMBER / AREA NUMBER | 1 | 2 | 3 | 4 |
|---|---|---|---|---|
| 1 | 1 | 1 | 1 | 1 |
| 2 | 1 | 1 | 2 | 2 |
| 3 | 1 | 2 | 2 | 4 |
| 4 | 2 | 2 | 4 | 4 |
| 5 | 2 | 4 | 4 | 8 |
| 6 | 4 | 4 | 8 | 8 |
| 7 | 4 | 8 | 8 | 16 |
| 8 | 8 | 8 | 16 | 16 |

FIG. 13A
PRIOR ART

AREA 1  AREA 2  AREA 3

| DC | 2 | 2 | 4 | 4 | 4 | 4 | 4 |
|----|---|---|---|---|---|---|---|
| 2  | 2 | 4 | 4 | 4 | 4 | 4 | 4 |
| 2  | 4 | 4 | 4 | 4 | 4 | 4 | 4 |
| 4  | 4 | 4 | 4 | 4 | 4 | 4 | 8 |
| 4  | 4 | 4 | 4 | 4 | 4 | 8 | 8 |
| 4  | 4 | 4 | 4 | 4 | 8 | 8 | 8 |
| 4  | 4 | 4 | 4 | 8 | 8 | 8 | 8 |
| 4  | 4 | 4 | 8 | 8 | 8 | 8 | 8 |

AREA 4

FIG. 13B
PRIOR ART

AREA 1  AREA 2  AREA 3

| DC | 4 | 4 | 4 | 4 | 4 | 8 | 8 |
|----|---|---|---|---|---|---|---|
| 4  | 4 | 4 | 4 | 4 | 8 | 8 | 8 |
| 4  | 4 | 4 | 4 | 8 | 8 | 8 | 8 |
| 4  | 4 | 4 | 8 | 8 | 8 | 8 | 8 |
| 4  | 4 | 8 | 8 | 8 | 8 | 8 | 8 |
| 4  | 8 | 8 | 8 | 8 | 8 | 8 | 8 |
| 8  | 8 | 8 | 8 | 8 | 8 | 8 | 8 |
| 8  | 8 | 8 | 8 | 8 | 8 | 8 | 8 |

AREA 4

FIG. 15
PRIOR ART

| DC | 0 | 0 | 1 | 1 | 2 | 3 | 4 |
|----|---|---|---|---|---|---|---|
| 0  | 0 | 1 | 1 | 2 | 3 | 4 | 4 |
| 0  | 1 | 1 | 2 | 3 | 4 | 4 | 5 |
| 1  | 1 | 2 | 3 | 4 | 4 | 5 | 6 |
| 1  | 2 | 3 | 4 | 4 | 5 | 6 | 6 |
| 2  | 3 | 4 | 4 | 5 | 6 | 6 | 7 |
| 3  | 4 | 4 | 5 | 6 | 6 | 7 | 7 |
| 4  | 4 | 5 | 6 | 6 | 7 | 7 | 7 |

FIG. 16
PRIOR ART

| Q NUMBER | AREA NUMBER | | | | | | | |
|---|---|---|---|---|---|---|---|---|
| | 0 | 1 | 2 | 3 | 4 | 5 | 6 | 7 |
| 0 | 16 | 16 | 16 | 32 | 32 | 32 | 32 | 32 |
| 1 | 8 | 16 | 16 | 16 | 32 | 32 | 32 | 32 |
| 2 | 8 | 8 | 16 | 16 | 16 | 32 | 32 | 32 |
| 3 | 8 | 8 | 8 | 16 | 16 | 16 | 32 | 32 |
| 4 | 4 | 8 | 8 | 8 | 16 | 16 | 16 | 32 |
| 5 | 4 | 4 | 8 | 8 | 8 | 16 | 16 | 16 |
| 6 | 4 | 4 | 4 | 8 | 8 | 8 | 16 | 16 |
| 7 | 4 | 4 | 4 | 4 | 8 | 8 | 8 | 16 |
| 8 | 2 | 4 | 4 | 4 | 4 | 8 | 8 | 8 |
| 9 | 2 | 2 | 4 | 4 | 4 | 4 | 8 | 8 |
| 10 | 2 | 2 | 2 | 4 | 4 | 4 | 4 | 8 |
| 11 | 2 | 2 | 2 | 2 | 4 | 4 | 4 | 4 |
| 12 | 1 | 2 | 2 | 2 | 2 | 4 | 4 | 4 |
| 13 | 1 | 1 | 2 | 2 | 2 | 2 | 4 | 4 |
| 14 | 1 | 1 | 1 | 2 | 2 | 2 | 2 | 4 |
| 15 | 1 | 1 | 1 | 1 | 2 | 2 | 2 | 2 |

▭ LOW-FREQUENCY IN HORIZONTAL AND VERTICAL DIRECTION

▨ HIGH IN HORIZONTAL AND LOW IN VERTICAL DIRECTION

▨ LOW IN HORIZONTAL AND HIGH IN VERTICAL DIRECTION

▩ HIGH-FREQUENCY IN HORIZONTAL AND VERTICAL DIRECTION

FIG. 25

| HORIZON-TAL | VERTICAL | OBLIQUE | ADJUSTMENT OF QUANTIZATION STEP SIZE |
|---|---|---|---|
| ABSENCE | ABSENCE | ABSENCE | NO CHANGE |
| ABSENCE | ABSENCE | PRESENCE | SMALL |
| ABSENCE | PRESENCE | ABSENCE | SMALL |
| ABSENCE | PRESENCE | PRESENCE | NO CHANGE |
| PRESENCE | ABSENCE | ABSENCE | SMALL |
| PRESENCE | ABSENCE | PRESENCE | NO CHANGE |
| PRESENCE | PRESENCE | ABSENCE | NO CHANGE |
| PRESENCE | PRESENCE | PRESENCE | LARGE |

```
ABSENCE   : NO EDGE IS DETECTED
PRESENCE  : EDGE IS DETECTED
LARGE     : MAKE QUANTIZATION STEP SIZE LARGE
SMALL     : MAKE QUANTIZATION STEP SIZE SMALL
NO CHANGE : NOT CHANGE QUANTIZATION STEP SIZE
```

FIG. 27

| HORIZON-TAL | VERTICAL | OBLIQUE | QUANTIZATION STEP ADJUST-MENT SIGNAL |
|---|---|---|---|
| LOW | LOW | LOW | 00 |
| LOW | LOW | HIGH | 01 |
| LOW | HIGH | LOW | 01 |
| LOW | HIGH | HIGH | 00 |
| HIGH | LOW | LOW | 01 |
| HIGH | LOW | HIGH | 00 |
| HIGH | HIGH | LOW | 00 |
| HIGH | HIGH | HIGH | 10 |

FIG. 33

| 1.77 | 0.91 | 0.30 | 0.26 |
|------|------|------|------|
| 1.64 | 0.39 | 1.06 | 2.93 |
| 0.46 | 0.92 | 1.11 | 1.33 |
| 0.14 | 0.98 | 2.46 | 1.99 |

FIG. 53

|   | 1 | 2 | 3 | 4 | 5 | 6 |
|---|---|---|---|---|---|---|
| 1 | Y1 | Y2 | CR | Y3 | Y4 | CB |
| 2 | Y1 | Y2 | CR | Y3 | Y4 | CB |
| 3 | Y1 | Y2 | CR | Y3 | Y4 | CB |
| 4 | Y1 | Y2 | CR | Y3 | Y4 | CB |
| 5 | Y1 | Y2 | CR | Y3 | Y4 | CB |

ADAPTIVE QUANTIZATION OF VIDEO BASED ON EDGE DETECTION

BACKGROUND OF THE INVENTION

1. Field of the Invention

The present invention relates to a high-efficiency encoding apparatus for compressing the amount of information carried in digital video signals such as television signals and encoding them with a variable-length code, and also relates to a decoding apparatus used in combination with the same.

2. Description of Related Art

FIG. 1 shows a basic functional block diagram of a typical consumer digital video tape recorder (VTR). In FIG. 1, the numeral 200 indicates an input terminal via which an analog video signal such as a television signal is inputted. The analog signal inputted via the input terminal 200 is fed into an A/D converter 201 for conversion into a digital signal which is supplied to a high-efficiency encoder 202. The high-efficiency encoder 202 compression-encodes the digital signal to reduce the amount of information thereof, and supplies the encoded data to an error-correction encoder 203. The error-correction encoder 203 appends an error-correcting code to the input encoded data so that errors can be corrected at the time of signal reproduction, and supplies the output to a recording modulator 204. The recording modulator 204 modulates the input data into encoded data suitable for recording; the modulated data is then amplified by a recording amplifier 205 for recording on a magnetic recording tape 206, a recording medium. The signal played back from the magnetic recording tape 208 is amplified by a head amplifier 207 and inputted to a playback demodulator 208. The playback demodulator 208 demodulates the playback signal and supplies it to an error-correction decoder 209. The error-correction decoder 209 performs error correction on the demodulated playback signal by using the error-correcting code, and supplies the output to a high-efficiency decoder 210. The high-efficiency decoder 210 reconstructs the compressed data into the original form. The reconstructed digital signal is fed into a D/A converter 211 for conversion into an analog signal which is outputted via an output terminal 212.

In digital VTRs, controlling the amount of data is of critical importance in connection with special-mode playback or editing, tape record formats, etc. The amount of data is controlled, for example, with a sync block, such as shown in FIG. 2, as the minimum recording unit. Sync block data is divided into a SYNC field A, a video data field B, and a check code field C to be stored. The SYNC field A, video data field B, and check code field C have respectively fixed lengths: the SYNC field A is provided to carry a synchronizing pattern, the video data field B to carry a digital signal compressed by the high-efficiency encoder 202, and the check code field C to carry an error-correcting code generated by the error-correction encoder 203. Generally, digital signals are divided into blocks of m pixels×n lines (m and n are integers), and several such blocks are combined together as a control unit and placed in the video data field B.

As can be seen in the above-described digital VTR, a high-efficiency encoding apparatus needs to be provided to reduce the amount of data for recording or transmitting the video signal, and it is widely practiced to compress data using orthogonal transform techniques. In that case, adaptive quantization is commonly employed to minimize picture quality degradation. Some of such high-efficiency encoding apparatus disclosed in the prior art will be described below.

FIG. 3 is a block diagram showing the configuration of a prior art high-efficiency encoding apparatus (corresponding to the high-efficiency encoder 202 shown in FIG. 1). In FIG. 3, the numeral 301 designates an orthogonal transform circuit to which a digital video signal is inputted in blocks of m pixels×n lines. In the orthogonal transform circuit 301, each input pixel block of m pixels×n lines is subjected to an orthogonal transform, such as the discrete cosine transform (DCT), and the resulting orthogonal-transformed coefficients (DCT coefficients in the case of the DCT) are supplied to a scanning circuit 302. In the scanning circuit 302, the coefficients supplied from the orthogonal transform circuit 301 are rearranged in a prescribed order. The rearranged coefficients are supplied to a quantizer 303 and a quantization step deciding circuit 305. The quantization step deciding circuit 305 decides an appropriate quantization step size on the basis of the output from the scanning circuit 302. The quantizer 303 quantizes the orthogonal-transformed coefficients with the thus decided quantization step size, and supplies the quantized orthogonal-transformed coefficients to a variable-length encoder 304 for variable-length encoding of the orthogonal-transformed coefficients.

Next, the operation of the high-efficiency encoding apparatus shown in FIG. 3 will be described. The digital video signal (for example, a block of 8 pixels×8 lines) inputted to the orthogonal transform circuit 301 is subjected to an orthogonal transform process for conversion into an orthogonal-transformed block including orthogonal-transformed coefficients. The orthogonal-transformed coefficients include a DC component, which can be considered as defining the mean value of the inputted digital video signal, and AC components which indicate variations of the digital video signal within the block.

The orthogonal-transformed coefficients in the orthogonal-transformed block are supplied to the scanning circuit 302, rearranged in such an order as to maximize the encoding efficiency in the variable-length encoder 304, and outputted in the thus rearranged order. That is, the coefficients are outputted with the DC component first, followed by the remaining 63 AC components, in the scanning order (zig-zag scanning) shown in FIG. 4, for example. Since the low-frequency coefficients of the AC components, as well as the DC component, have greater effects on visual perception, the coefficients of lower frequencies are treated as components having greater significance, and therefore, the data are encoded in order of increasing frequency.

The orthogonal-transformed coefficients rearranged in the scanning circuit 302 are supplied to the quantizer 303 as well as to the quantization step deciding circuit 305. First, the quantization step deciding circuit 305 decides a quantization step size such that the amount of data, after quantizing and variable-length encoding the orthogonal-transformed coefficients, will be constant in a plurality of blocks. Generally, since low-frequency components of transformed coefficients have greater effects on visual perception, the quantization step size is reduced for lower-frequency coefficients; conversely, the quantization step size is increased for high-frequency components.

In the quantizer 303, the orthogonal-transformed coefficients fed from the scanning circuit 302 are quantized with the quantization step size decided by the quantization step deciding circuit 305, and the DC and AC components are each rounded to a prescribed number of bits and supplied to the variable-length encoder 304. The quantized orthogonal-transformed coefficients are variable-length encoded by the variable-length encoder 304 which thus outputs variable-length encoded data.

Since the quantization step size is decided in exactly the same way for any block of an image without considering the difference in characteristic between portions of the image, the prior art high-efficiency encoding apparatus shown in FIG. 3 has the problem that image quality degradation occurs in blocks corresponding to edges or the like of objects.

FIG. 8 is a block diagram showing the configuration of another prior art high-efficiency encoding apparatus disclosed, for example, in Japanese Patent Application Laid-Open No. 5-95539 (1993). In FIG. 5, the numeral 311 designates an orthogonal transform circuit to which a digital video signal is inputted in blocks of m pixels×n lines. In the orthogonal transform circuit 311, the input video signal is subjected to an orthogonal transform, such as the DCT, and the resulting orthogonal-transformed coefficients are supplied to a sequencing circuit 312 and a pattern detecting circuit 313. The sequencing circuit 312 rearranges the inputted transformed coefficients and supplies the rearranged data to a quantizer 314 and a quantization step selection circuit 315. The pattern detecting circuit 313 detects, on the basis of the supplied transformed coefficients, a specific pattern whose image degradation is easily noticeable, and supplies a pattern signal to the quantization step selection circuit 315. The quantization step selection circuit 315 selects the quantization step size for quantization on the basis of the outputs of the sequencing circuit 312 and pattern detecting circuit 313. The quantizer 314 quantizes the transformed coefficients with the selected quantization step size and supplies the output to a variable-length encoder 316 for variable-length encoding of the quantized transformed coefficients.

Next, the operation of the prior art high-efficiency encoding apparatus shown in FIG. 5 will be described. The digital video signal is inputted to the orthogonal transform circuit 311 where each block includes, for example, of 4 pixels×4 lines=16 pixels is subjected to an orthogonal transform such as DCT. The orthogonal-transformed coefficients from the orthogonal transform circuit 311 are fed into the sequencing circuit 312 where the coefficients are rearranged in a prescribed order, for example, in order of increasing frequency. The rearranged orthogonal-transformed coefficients are supplied to the quantizer 314 as well as to the quantization step selection circuit 315. The orthogonal-transformed coefficients from the orthogonal transform circuit 311 are also input to the pattern detecting circuit 313, and when a specific pattern of orthogonal-transformed coefficients, i.e. the pattern whose image degradation is easily noticeable, is detected, a pattern signal is supplied to the quantization step selection circuit 315.

The transformed coefficients outputted from the sequencing circuit 312 are quantized by the quantizer 314 with the quantization step size selected by the quantization step selection circuit 315. The transformed coefficients thus quantized are variable-length encoded by the variable-length encoder 316 for output. In the quantizing process, higher-frequency transformed coefficients are quantized with a larger quantization step size to reduce the amount of data; on the other hand, when the block compression ratio is to be increased, larger quantization step sizes are selected for the entire transformed coefficients, and when the compression ratio is to be reduced, smaller quantization step sizes are selected, to control the resulting code amount. Furthermore, when a pattern signal is outputted from the pattern detecting circuit 313, the quantization step selection circuit 315 that has received the pattern signal reduces the quantization step size to reduce the distortion caused by the quantizing error for the block concerned and improve the picture quality.

A method of specific pattern detection by the pattern detecting circuit 313 will be described below. FIG. 6 is a diagram for explaining how an edge is detected in the pattern detecting circuit 313; the orthogonal-transformed coefficients in absolute value terms are arranged in order of increasing frequency and divided at a halfway point into two areas, a low-frequency area and a high-frequency area. The largest absolute value in the low-frequency area is designated as the maximum value Lmax, and the largest absolute value in the high-frequency area as the maximum value Hmax. One of four classes divided by prescribed threshold values is selected in accordance with the maximum value Lmax, and likewise, one of four classes divided by prescribed threshold values is selected in accordance with the maximum value Hmax. With four classes in each of the low-frequency and high-frequency areas, 4×4 or 16 different kinds of patterns are identified. The pattern detecting circuit 313 stores a table corresponding to the 16 kinds of patterns, and codes signifying a pattern detection are stored only for those patterns whose image degradation is easily noticeable. The pattern detecting circuit 313 determines the maximum values Lmax and Hmax from the supplied transformed coefficients and identifies the corresponding classes, and detects a specific pattern by referencing the stored table.

In the prior art high-efficiency encoding apparatus of the configuration shown in FIG. 5, when detecting a specific pattern, such as an edge of an object, whose image distortion is easily noticeable, the orthogonal-transformed coefficients of about 10 bits are identified as four classes, which is equivalent to rounding the number of bits to two bits; since the pattern detection is performed using this class information, the resolution of the detection may not be sufficient. As a result, an edge may not be able to be detected in some portions of an image, while an irrelevant pattern may be detected as an edge, causing image quality degradation or leading to an unnecessary increase in the code amount. Furthermore, since horizontal, vertical, and oblique edges are all detected as edges, a complex block whose image degradation is not easily noticeable is also identified as an edge, and a larger number of bits than necessary are assigned to such a block, the resulting problem thus being the inability to assign bits efficiently to each block.

In another prior art method of detecting a specific pattern whose image degradation is easily noticeable, the number of orthogonal-transformed coefficients, in a given frequency area, whose absolute values are greater than a prescribed threshold value, is counted, and a specific pattern is detected on the basis of the count value. In this prior art method, however, since the orthogonal-transformed coefficients are converted to binary form by comparing their absolute values with the prescribed threshold value, this prior art method has the shortcoming that the amplitude information represented by each individual coefficient cannot be reflected in the pattern detection. Other methods include a method that detects a specific pattern from the pixel values before orthogonal transformation.

FIG. 7 is a diagram showing the configuration of yet another high-efficiency encoding apparatus according to the prior art. In FIG. 7, the numeral 321 designates a blocking circuit for dividing a prescribed number of digital signals serially inputted to it into blocks. The blocking circuit 321 supplies the blocked data to an orthogonal transform circuit 322 where the input data is subjected to an orthogonal transform process such as a DCT, the resulting orthogonal-transformed coefficients then being supplied to a classifying circuit 323. The classifying circuit 323 classifies each block based on the values of the orthogonal-transformed coefficients in the block, and supplies the classified orthogonal-transformed coefficients to a quantizer 324 and a quantization step selection circuit 328. The quantization step selection circuit 328 selects a quantization step size on the basis of class information from the classifying circuit 323 and a quantization step control signal from a code amount control circuit 327, and supplies the resulting selection signal to the quantizer 324. The quantizer 324 quantizes the orthogonal-transformed coefficients in accordance with the selected quantization step size, and supplies the quantized orthogonal-transformed coefficients to a variable-length encoder 325. The variable-length encoder 325 variable-length encodes the quantized orthogonal-transformed coefficients, and supplies the encoded data to a buffer memory 326. The buffer memory 326 outputs the variable-length encoded data at a prescribed rate. The code amount control circuit 327 accepts the variable-length encoded data at its input, and supplies a quantization step control signal to the quantization step selection circuit 328 to control the amount of data in the buffer memory 326 within a prescribed limit.

Next, the operation of the prior art high-efficiency encoding apparatus shown in FIG. 7 will be described. Digital video signal data are inputted to the blocking circuit 321 and divided into blocks of, for example, 8 pixels×8 lines=84 pixels. The blocks of data are supplied to the orthogonal transform circuit 322 one block at a time. In the orthogonal transform circuit 322, the inputted data is subject to the DCT process to produce 64 transformed coefficients which are supplied to the classifying circuit 323. The classifying circuit 323 classifies the data according to the magnitude of the variance of the transformed coefficients; for example, a larger code amount is assigned to a block with larger variance and a smaller code amount to a block with smaller variance. FIG. 8 shows an example of the classification performed in the classifying circuit 323; in the figure, the class numbers, and the values to be added to the quantization table numbers to be described later, are shown. Here, blocks with smaller variance are assigned larger class numbers, and larger-numbered quantization tables have larger quantization step sizes; thus, blocks with smaller variance are quantized with larger quantization step sizes, and therefore, smaller code amounts are assigned to blocks with smaller variance.

The classified transformed coefficients are quantized in the quantizer 324. In this case, as shown in FIG. 9, there are 64 transformed coefficients, of which 63 coefficients, excluding the DC coefficient, are classified into four areas, area 1 to area 4, in order of increasing frequency, and quantization is performed with different quantization step sizes for different areas. DCT coefficients of image data tend to have larger values at lower frequencies and smaller values at higher frequencies. Also, the human eye is relatively insensitive to degradation in high-frequency components. Making use of these properties, the quantization step size for the areas shown in FIG. 9 can be chosen to have larger values for higher-frequency components.

FIG. 10 shows the quantization step size for each area in eight quantization tables contained in the quantizer 324. Since larger quantization step sizes are assigned to larger-numbered quantization tables, the code amount resulting from the classification can be reduced. Denoting the input as x, the characteristic of the quantizer 324 can be defined by a function $Q(x)$ with quantization step size q and center dead zone width p as parameters. FIG. 11 shows an example of $Q(x)$, with input value x plotted along the abscissa and output value $Q(x)$ along the ordinate; the filled circles in the figure include their associated points while the unfilled circles do not. The upper and lower limits of the center dead zone are $(3/4)\cdot q$ and $-(3/4)\cdot q$, respectively. The dead zone width p may be set as desired according to the nature of the input video signal and to the image quality required, but is usually set to a predetermined value, i.e., $p=(3/2)\cdot q$ in this example. In FIG. 11, when the parameter q is 4, for example, $Q(x)$ takes a positive unit value D only when the input value x is within a range from 3 to 5.

The transformed coefficients quantized in the quantizer 324 are fed into the variable-length encoder 325 where zero-run length coding is performed, followed by Huffman coding. The variable-length encoder 325 supplies the Huffman-coded data to the buffer memory 326. The buffer memory 326 in which the data are stored outputs the data at a prescribed rate. The code amount control circuit 327 determines the internal data amount from the write and read addresses in the buffer memory 326, and supplies a quantization step control signal to the quantization step selection circuit 328 to control the data amount within a prescribed limit by increasing the quantization step size when the code amount is large, and reducing it when the code amount is small. Based on the quantization step control signal and on the block classification signal from the classifying circuit 323, the quantization step selection circuit 328 supplies a quantization table selection signal to the quantizer 324. The quantizer 324 quantizes the block data using the quantization table specified by the quantization table selection signal.

The code amount is controlled for each block, for each group of blocks, or for each frame, for example. When control is performed for each group of blocks, the amount of data to be assigned to each block within the group or control unit is determined on the basis of the class number of the block. Blocks with larger class numbers are quantized using tables with larger quantization step sizes. The following description deals with an example in which the code amount is controlled for each block. FIG. 12 shows the variation of per-block encoded data amount occurring in the variable-length encoder 325 when the quantizer 324 is switched between different quantization tables. The abscissa represents the variance of the data or information amount of the source picture signal, the ordinate represents the resulting encoded data amount, and the horizontal dashed line indicates the target value for data amount control. Straight lines E, F, and G show the resulting data amount for quantization table numbers 5, 6, and 7, respectively.

The information amount of source picture varies from block to block. Here, consider the situation where a certain block has the amount of information indicated at point a. When this block is quantized using the quantization table number 5 (line E), the resulting encoded data amount is shown by point b. Since this value is greater than the target value of the data amount, the code amount control circuit 327 generates a quantization step control signal such that the quantization step size is increased. In response to this signal, the quantization step selection circuit 328 outputs a quantization table selection signal, based on which the quantization table in the quantizer 324 is changed to number 6 (line F). As a result, the data amount decreases to point c below the target value of the data amount. Encoded data within the range of the target data amount is used.

The following describes how the resulting encoded data amount changes with the change of the quantization table. FIG. 13A shows the quantization table number 5, and FIG. 13B the quantization table number 6. The quantization step size is given by a power of 2 because of ease of division of binary numbers. When the quantization table is changed from number 5 to number 6, the quantization step sizes for area 1 and area 3 are doubled. As a result, the number of data terms that become zero after quantization increases, primarily for area 3; this is subjected to zero-run length coding, followed by Huffman coding, in the variable-length encoder 325, thus achieving a reduction in the data amount.

When transmitting or recording encoded data, the upper limit of the data rate is usually specified. In data amount control, the data amount may be freely assigned within the control unit, but the total data amount at the end of the control unit must be kept within the predetermined value. When control is performed on a block-by-block basis, actual encoding is performed using the data amount shown by segments e, f, and g of the respective lines E, F, and G in FIG. 12. As a result, data that cannot be made effective use of occurs despite of enough margin in data amount to the predetermined value, as shown by regions H and I. For example, for the block with the information amount shown by point a, the encoded data amount is at point c, which is significantly smaller than the control target of the data amount indicated by the dashed line.

In the prior art high-efficiency encoding apparatus of the configuration shown in FIG. 7, when the quantization table is changed to control the resulting data amount, it often happens that the data amount varies to a greater extent than necessary. As a result, in cases where, with a certain quantization step size, the data amount is expected to slightly exceed the predetermined value, when the quantization step size is increased to control the resulting data amount within the predetermined value, there arises the problem that the data amount greatly decreases and falls far below the predetermined value, resulting in the occurrence of data that cannot be made effective use of. On the other hand, when the quantization step size is given by other values than powers of 2 to reduce the variation of the data amount associated with the quantization step size change, there arises the problem that the size of the hardware for performing binary data quantization is increased. Furthermore, when the quantization step size is changed one by one for the plurality of areas to reduce the variation of the data amount associated with the change of the quantization table, there arises the problem that the data amount varies greatly among areas for which the step size has been changed. In such cases, since the quantizing distortion only of a specific frequency signal varies, the image may appear unnatural. This also presents a problem.

FIG. 14 is a block diagram showing the configuration of further another high-efficiency encoding apparatus according to the prior art. In FIG. 14, the numeral 331 designates a blocking circuit for dividing incoming digital video signals into blocks of pixels. The blocking circuit 331 supplies the block data to a DCT circuit 332. The DCT circuit 332 performs DCT on the block data, and supplies the resulting DCT coefficients to an activity deciding circuit 333, a Q number deciding circuit 334, and a quantizer 335. The activity deciding circuit 333 decides activity, a parameter relating to the compression ratio, for each block, and supplies the activity to the Q number deciding circuit 334, the quantizer 335, and also to a multiplexer circuit 337. The Q number deciding circuit 334 decides a Q number (the number representing the quantization step) that provides the largest data amount within a predetermined value, and supplies the Q number to the quantizer 335 and the multiplexer circuit 337. The quantizer 335 quantizes the DCT coefficients fed from the DCT circuit 332, and supplies the result to a variable-length encoder 336. The variable-length encoder 336 variable-length encodes the quantized DCT coefficients, and supplies the encoded data to the multiplexer circuit 337. The outputs of the activity deciding circuit 333, Q number deciding circuit 334, and variable-length encoder 336 are multiplexed together in the multiplexer circuit 337 for output.

Next, the operation of the prior art high-efficiency encoding apparatus shown in FIG. 14 will be described. The digital signal inputted to the blocking circuit 331 is divided into blocks of a fixed size, then subjected to the DCT on a block-by-block basis in the DCT circuit 332. The DCT coefficient block transformed by the DCT circuit 332 is subsequently subjected to a quantization process to reduce the data amount. For quantization, the AC coefficients in the DCT coefficient block are divided among a plurality of areas, each including a plurality of AC coefficients, and the coefficients in each area are quantized with the product of the quantization step size decided for the area and the weight determined by the activity that will be described later. The number representing the quantization step size decided for each area is designated as the Q number. FIG. 15 shows an example of area division, and FIG. 16 displays an example of Q number and quantization step sizes for each area number.

The DCT coefficient block transformed by the DCT circuit 332 is supplied to the activity deciding circuit 333 where activity is decided for each block. The activity is a parameter relating to the compression ratio, and determines the weight to be assigned to the quantization step size. Suppose, for example, that the weight assigned to the quantization step size increases with increasing activity and decreases with decreasing activity. Then, in the example of FIG. 16, the compression ratio is higher for blocks with smaller Q number and larger activity. A plurality of DCT coefficient block/activity pairs are combined together as a control unit and inputted to the Q number deciding circuit 334.

The Q number deciding circuit 334 calculates the expected data amount with each Q number for the DCT coefficient blocks as the control unit, and decides the Q number that gives the largest total data amount within the size of the video data field (FIG. 2). The Q number thus decided is supplied to the quantizer 335. The quantizer 335 obtains the parameters for quantization from the activity supplied from the activity deciding circuit 333 and the Q number supplied from the Q number deciding circuit 334, and quantizes the DCT coefficient block in accordance with these parameters. The quantized coefficients outputted from the quantizer 335 are fed into the variable-length encoder 336 where the coefficients are encoded with a variable-length code such as a Huffman code. The variable-length encoded data from the variable-length encoder 336, the activity from the activity deciding circuit 333, and the Q number from the Q number deciding circuit 334 are multiplexed in the multiplexer circuit 337 for output.

In the prior art image encoding apparatus of the configuration shown in FIG. 14, the Q number is decided so that the data amount occurring in the control unit is kept within the size of the video data field, but no means is provided for fine-adjusting the data amount after the Q number is decided. This leads to the problem that in some cases, the difference between the actually occurring data amount and the size of the video data field becomes large, leaving much unused space in the video data field.

FIG. 17 is a block diagram showing the configuration of further another high-efficiency encoding apparatus according to the prior art. In FIG. 17, the numeral 341 designates a blocking/shuffling circuit for blocking and shuffling incoming digital video signals. The blocked data are supplied to a DCT circuit 342 which performs the DCT on each block and supplies the resulting DCT coefficients to a code amount control circuit 343 and a quantizer 344. The code amount control circuit 343 decides the quantization step size so that the code amount for one frame is kept within a prescribed limit, and the quantizer 344 quantizes the DCT coefficients with the quantization step size decided by the code amount control circuit 343. The quantized DCT coefficients outputted from the quantizer 344 are fed into a variable-length encoder 345 which encodes the coefficients with a variable-length code such as a Huffman code and supplies the encoded data to a packing circuit 346. The packing circuit 346 performs encoded-data packing on the encoded data supplied from the variable-length encoder 348, as will be described hereinafter.

The packing circuit 346 will be described below. FIG. 18 shows an example of the configuration of the packing circuit 348. The numeral 380 indicates an input terminal via which the encoded data produced by the variable-length encoder 345 are inputted. The encoded data inputted via the input terminal 350 are stored into a first memory 351, a second memory 352, a third memory 353, . . . , an n-th memory 354. A memory controller 355 counts the incoming encoded data and switches the encoded data between the several memories for writing. The encoded data stored in the first memory 351 is read out via an output terminal 358. In the packing method hereinafter described, the first memory 351 is used as a memory for packing the encoded data, and the other memories are used as overflow buffers for temporarily storing the encoded data overflown from a fixed area.

As previously mentioned, in digital VTRs, code amount control is of critical importance in connection with special-mode playback, editing, etc. FIG. 19 is a schematic diagram showing a tape recording format. In the figure, the numeral 400 designates a recording signal for one track; the format of the recording signal 400 is as shown in FIG. 20. The recording signal for one track includes a plurality of SYNC blocks, and control of the code amount is performed by treating the SYNC block as a unit (the SYNC block is hereinafter referred to as the macro block by considering only data in the DCT block).

The following describes how the encoded data are packed (packing method) when the macro block is treated as a control unit. FIG. 21 is a schematic diagram showing the macro block. First, the encoded data produced by the variable-length encoder 345 from the DCT coefficients in one DCT block are stored starting from the top of a fixed area (a virtual area obtained by dividing the first memory 351) assigned to that DCT block. Any encoded data that cannot be stored in the fixed area is stored in an overflow buffer MR (for example, the second memory 352). This processing is repeated on all the DCT blocks in one macro block, in the order of Y1, Y2, Y3, Y4, CR, and CB. The encoded data that cannot be stored in the respective fixed areas are sequentially stored in respective overflow buffer MRs, starting from the location immediately following the encoded data stored therein from the preceding DCT block. After all the DCT blocks have been processed, when there are data stored in any overflow buffer MR, a fixed area assigned to the macro block, which includes the fixed areas assigned to the respective DCT blocks, is checked to see if there is any space where no data is stored yet; when there is any such vacant space, the encoded data stored in the overflow buffer MR are written in that space until all vacant space is filled up.

The packing method described above controls the code amount by treating one macro block as a control unit. Alternatively, a plurality of macro blocks may be combined and treated together as a control unit. In that case, when there is any encoded data overflown from one macro block, such encoded data is stored in vacant space in the areas assigned to the other macro blocks.

According to the encoded data packing method employed in the prior art high-efficiency encoding apparatus shown in FIG. 17, when no overflow occurs within one control unit, all coefficient data within one DCT block can be decoded at the decoding end, but when an overflow occurs, this will result in missing coefficient data at the decoding end. In many images, most of the AC coefficients of the color-difference signal CB become zero after DCT and quantization, and therefore, an overflow is not likely to occur on a DCT block basis. Accordingly, when an overflow occurs within one control unit, the DCT coefficients tend to be dropped from the color-difference signal CR. In the decoded image, degradation of the color-difference signal CB is not easily perceptible to the eye, but degradation of the color-difference signal CR is very noticeable to the eye. This greatly affects the subjective evaluation of the decoded image.

SUMMARY OF THE INVENTION

One object of the invention is to provide a high-efficiency encoding apparatus capable of improving the image quality of blocks whose image degradation is easily perceptible to the eye.

Another object of the invention is to provide a high-efficiency encoding apparatus that accomplishes image compression and encoding without causing perceptible image distortion, and that achieves optimum image quality improvement by detecting, for example, edge portions more accurately than previous systems can.

A further object of the invention is to provide a high-efficiency encoding apparatus having an image pattern detector with simple hardware configuration suitable for use in combination with an orthogonal transform.

A still further object of the invention is to provide a high-efficiency encoding apparatus that is capable of meticulous control of the code amount by alleviating abrupt changes in the data amount that can occur when the quantization step size is varied as a power of 2.

A yet further object of the invention is to provide a high-efficiency encoding apparatus that is capable of meticulous control of the data amount without causing unnatural changes in an image when quantization tables are changed from one table to another.

Another object of the invention is to provide a decoding apparatus simple in hardware configuration and suitable for use in combination with the high-efficiency encoding apparatus.

Still another object of the invention is to provide a high-efficiency encoding apparatus capable of reducing unused space in a video data field where a compressed digital video signal is recorded.

Yet another object of the invention is to provide a high-efficiency encoding apparatus capable of obtaining a decoded image of subjectively good quality by suppressing degradation in the color-difference signal CR.

In a high-efficiency encoding apparatus according to a first invention, an array of orthogonal-transformed AC component coefficients in an orthogonal-transformed block is divided into a plurality of areas, and the characteristic of each of the divided areas is detected, these characteristics being combined together to determine the characteristic of the entire block forming an image portion. Based on this result, the quantization step size for that block is decided. Thus, the characteristic of each block can be reflected in deciding the quantization step size on a block-by-block basis, which serves to suppress degradation of edge portions, etc. and thereby achieves a reproduction of an image of good quality in visual perception.

In a high-efficiency encoding apparatus according to a second invention which is a modification of the first invention, for a block containing a visually perceptible pattern such as an edge, the quantization step size with which to quantize the orthogonal-transformed coefficients in the block is controlled so that code bits can be assigned efficiently to the block, while maintaining the total data amount at a constant level, and thereby achieving an improvement in image quality. According to the second invention, therefore, code bits can be assigned efficiently to each block without waste in cases where the largest of the absolute values of the AC components in an orthogonal-transformed block is sufficiently large, where a complex block whose image degradation is not easily perceptible to the eye or a block containing an edge (a sufficiently smooth edge) not being easily detectable by the eye is processed.

In a high-efficiency encoding apparatus according to a third invention, a plurality of dominant coefficients, for example, two coefficients of large absolute values, are selected from among the orthogonal-transformed coefficients, and based on the values of the thus selected coefficients and the basic numbers of these orthogonal-transformed coefficients, an evaluation value is obtained; using this value, a block containing a specific pattern is detected, and the quantization step size is adaptively changed when quantizing the thus detected block. Since the evaluation value is obtained using about 10 bits of data generally assigned to the orthogonal-transformed coefficients, pattern detection of high accuracy can be achieved. For example, compared to a prior art method in which the orthogonal-transformed coefficients are classified into four classes according to their absolute values, and pattern detection is performed using data virtually rounded to two bits, the third invention has the advantage that adaptive processing can be performed with the nature of each image block faithfully reflected in it. More specifically, image blocks in which image distortion is easily noticeable and for which a smaller quantization step size needs to be selected by adaptive processing can be selected with good accuracy. Furthermore, the quantization step size can be adjusted in small increments in accordance with the evaluation value. As a result, the image quality of a block containing a pattern whose image distortion is easily noticeable can be improved accurately and as far as required. Thus, the third invention provides a high-efficiency encoding apparatus capable of producing an image whose degradation is not easily noticeable compared to the prior art, that is, an image of good quality, when a video signal is encoded, for example, under the condition that the code amount is constant.

In another prior art method in which an evaluation value is obtained using all the orthogonal-transformed coefficients, for example, an evaluation equation used in such a method involves an enormous number of computations; when implementing this method using an electronic circuit, there is the problem that the circuit size is large and the processing speed is slow. In another prior art method, an evaluation value is obtained using pixel values of a block before orthogonal transformation; this method, however, has the disadvantage that when the evaluation value is obtained from a limited number of pixel values, the nature of the image of the whole block is difficult to reflect in the evaluation value, and when the evaluation value is obtained using all the pixel values, large circuitry is required and the processing speed is slow. According to the method of the third invention, on the other hand, the evaluation value is obtained by selecting dominant coefficients from among the orthogonal-transformed coefficients; since all the pixel values are reflected in individual orthogonal-transformed coefficients, this method is advantageous in evaluating the nature of the image of the whole block. Since dominant coefficients are selected from among these orthogonal-transformed coefficients and used for the evaluation of the nature of the image without the coefficients being rounded to a smaller number of bits, an evaluation value of high accuracy can be obtained using simple circuitry. The third invention thus provides an apparatus inexpensive to implement and having good performance.

In a high-efficiency encoding apparatus according to a fourth invention which is a modification of the third invention, an array of AC coefficients in an orthogonal-transformed coefficient block is divided into two areas, the first area, including low-frequency coefficients, and the second area, including high-frequency coefficients, and a maximum value a, the largest of the absolute values of the orthogonal-transformed coefficients in the first area, and a maximum value b, the largest of the absolute values of the orthogonal-transformed coefficients in the second area, are obtained. By using the limits predefined for the maximum value a, blocks of flat images having low amplitudes and blocks of extremely high image contrast are excluded. Further, an evaluation value r is obtained from an evaluation equation $r=b/a$, and when this value is within a prescribed range, the block is judged as containing an edge. For judgment, two threshold values, an upper limit TH and a lower limit TL, are used. Accurate pattern detection is thus made possible, and by adaptively quantizing the detected block, image quality can be improved.

We will now explain the reason why an image block is judged as containing an edge when the evaluation value r is within a prescribed range. Generally, when a time-domain waveform is frequency analyzed, an impulse waveform has a flat frequency component, while a step waveform has a frequency component decreasing monotonically in increasing direction of frequency. Since the basis function for an orthogonal transform has their spectral components arranged in increasing order of frequency, when an image contains an edge or step waveform, the absolute values of the resulting orthogonal-transformed coefficients generally tend to decrease monotonically in increasing order of frequency, and r takes a value within the prescribed range. When an image contains a pulse waveform, a complex waveform, or a random waveform, the high-frequency coefficients take values close to those of the low-frequency coefficients, and therefore, the evaluation value r is relatively large. On the other hand, in the case of an image containing a smooth waveform, the high-frequency orthogonal-transformed coefficients take smaller values, so that the evaluation value r is also small. As is apparent from the above, an edge in an image can be detected by detecting the evaluation value r within a prescribed range.

In a high-efficiency encoding apparatus according to a fifth invention which is a modification of the fourth invention, the threshold value TL used to detect an edge from the evaluation value r is given as a power of 1/2, or the sum of a power of 1/2 and a power of 1/2, or the difference between a power of 1/2 and a power of 1/2, and therefore, the edge detection condition is $b/a \geq TL$ or $b \geq TL \times a$. When a is expressed in binary number, the number of bits by which the binary number representing a is shifted downward, and their sum or difference, are obtained and compared with b, to judge the lower limit. This arrangement eliminates the need for a dividing circuit for obtaining b/a, and accurate evaluation can be accomplished with simple circuitry using a bit shifter, an adder, and a subtractor.

In a high-efficiency encoding apparatus according to a sixth invention which is a modification of the fourth invention, the threshold value TH used to detect an edge from the evaluation value r is given as a power of 2, or the sum of a power of 2 and a power of 1/2, or the difference between a power of 2 and a power of 1/2, and therefore, the edge detection condition is $b/a \leq TH$ or $b \leq TH \times a$. When a is expressed in binary number, the number of bits by which the binary number representing a is shifted upward, and the sum or difference between the number of bits by which the binary number representing a is shifted upward and the number of bits by which the binary number representing a is shifted downward, are obtained and compared with b, to judge the upper limit. This arrangement eliminates the need for a dividing circuit for obtaining b/a, and accurate evaluation can be accomplished with simple circuitry using a bit shifter, an adder, and a subtractor.

In a high-efficiency encoding apparatus according to a seventh invention, when changing the quantization step size to increase or reduce the data amount resulting from the quantization of input signal, comparisons are made with the data amount resulting from the quantization with the original quantization step size q1 and center dead zone width (hereinafter simply called the dead zone width) p1: When increasing the data amount, quantization is performed sequentially, first with the quantization step size q1 and dead zone width p2 (where p1>p2>p1/2), then with the quantization step size q1/2 and dead zone width p2 (where p1>p2>p1/2), and then with the quantization step size q1 ×2 and dead zone width p1/2; when reducing the data amount, quantization is performed sequentially, first with the quantization step size q1 and dead zone width p3 (where p1<p3<p1×2), then with the quantization step size q1×2 and dead zone width p3 (where p1<p3<p1×2), and then with the quantization step size q1×2 and dead zone width p1×2. According to this method, the change in the data amount is smaller and the code amount is controlled in smaller increments, compared with the prior art method in which the original quantization step size q1 and dead zone width p1 are both increased or reduced by a factor of 2.

In a high-efficiency encoding apparatus according to a ninth invention, when changing the quantization table to increase or reduce the data amount resulting from the quantization of orthogonal-transformed coefficients, comparisons are made with the data amount resulting from the quantization with the original quantization step size q1 and dead zone width p1, for the area for which the quantization step size is to be changed: When increasing the data amount, quantization is performed sequentially, first with the quantization step size q1/2 and dead zone width p2 (where p1>p2>p1/2) and then with the quantization step size q1/2 and dead zone width p1/2; when reducing the data amount, quantization is performed sequentially, first with the quantization step size q1 and dead zone width p3 (where p1<p3<p1×2) and then with the quantization step size q1×2 and dead zone width p1×2. According to this method, the change in the data amount is smaller for the area concerned, and the overall code amount is controlled in smaller increments, compared with the prior art method in which the original quantization step size q1 and dead zone width p1 are both increased or reduced by a factor of 2.

In a decoding apparatus according to an eighth or 10th invention, the decoding apparatus is connected to the high-efficiency encoding apparatus of the seventh or ninth invention, and an inverse quantizer is switched to match the quantization step size q used in the quantizer of the high-efficiency encoding apparatus. Compared with a conventional method in which the inverse quantizer is switched to match the quantization step size q and dead zone width p, the number of bits of the appended code indicating the quantization step size or quantization table used for quantization can be reduced at the encoding end, while at the decoding end, the inverse quantizer need only be switched according to the quantization step size q. This simplifies the hardware configuration.

In the seventh to 10th inventions, the change in the data amount occurring when the quantization step size is changed by a power of 2 is reduced by being combined with a change in the dead zone width, making it possible to control the code amount in small increments. Furthermore, the data amount can be controlled at a level intermediate between the levels possible with the prior art method when the quantization step size is changed by a power of 2, and the quantizing distortion also can be controlled at such an intermediate level. The effect of this is that unnatural distortion does not occur when inverse quantization is performed at the decoding apparatus to match the quantization step size only. As a result, the decoding apparatus can be constructed using simple hardware. Furthermore, at the encoding end, there is no need to append an additional code indicating the dead zone width, and there are involved no increase in the hardware size or in the amount of encoded data.

In a high-efficiency encoding apparatus according to an 11th invention, after a Q number is decided, activity is changed so as to reduce the compression ratio for the orthogonal-transformed coefficients within a control unit, in the order decided on the basis of the evaluation value calculated from the activity alone or from the activity and Q number. Then, it is determined whether the data amount resulting from the encoding of the control unit falls within the size of a video data field; if it falls within the size of the video data field, then the changed activity is decided as the activity for the block concerned. In this manner, the data amount can be fine-adjusted, and vacant space occurring in the video data field can be reduced. Furthermore, since the evaluation value is related to the compression ratio, when the activity is corrected in order of decreasing compression ratio, the block of the highest compression ratio first, the image quality of encoded images can be improved.

In a high-efficiency encoding apparatus according to a 12th invention which is a modification of the 11th invention, the Q number is decided so that it provides the largest data amount within a limit smaller by a prescribed value than the size of the video data field; this leaves a relatively large vacant space in the video data field before activity correction, allowing further optimum adaptive quantization for blocks of high compression ratio.

In the 11th and 12th inventions, since activity correction is performed after deciding the Q number, the data amount can be fine-adjusted, and vacant space occurring in the video data field can be reduced. Furthermore, since the compression ratio is reduced for some transformed coefficient blocks as a result of the activity correction, the image quality of encoded images can be improved.

In a high-efficiency encoding apparatus according to a 13th invention, when the code amount occurring from each block is overflown from a fixed-length area (macro block), the encoded data overflown from each block are written in units of one codeword into vacant space in the fixed-length area assigned to another block.

In a high-efficiency encoding apparatus according to a 14th invention, when an overflow occurs within a macro block, the order of blocks in which encoded data are stored in a fixed area and the order in which encoded data overflown from the fixed area are stored in vacant space are adaptively controlled in accordance with the result of red color detection performed in advance.

In a high-efficiency encoding apparatus according to a 15th invention, when an overflow occurs within a macro block, the size of a designated area where encoded data of each block is to be stored is changed in accordance with the result of red color detection performed in advance.

In a high-efficiency encoding apparatus according to a 16th invention, the order in which encoded data of respective blocks are stored in fixed areas assigned to the respective blocks is different from the order in which encoded data overflown from the fixed areas are stored in vacant space.

In the 13th to 16th invention, provisions are made so that when an overflow occurs within a control unit, the orthogonal-transformed coefficients of the color-difference signal CR can be transmitted to the decoding end with minimum loss of orthogonal-transformed coefficients, since degradation of the color-difference signal CR due to missing coefficients would be very noticeable to the eye. This suppresses degradation of the color-difference signal CR, and helps to enhance the subjective evaluation of the decoded image.

The above and further objects and features of the invention will more fully be apparent from the following detailed description with accompanying drawings.

BRIEF DESCRIPTION OF THE DRAWINGS

FIG. 8 is a diagram showing an example of the classification performed in a classifying circuit shown in FIG. 7;

FIG. 10 is a diagram showing the relationship between the area numbers and quantization step sizes according to each quantization table used in the quantizer shown in FIG. 7;

FIGS. 13A and 13B are diagrams showing two of the eight quantization tables given in FIG. 10;

FIG. 15 is a diagram showing an example of area division;

FIG. 16 is a diagram showing an example of Q numbers and quantization step sizes for each area number;

FIG. 25 is a diagram showing the directions of quantization step size adjustment for various combinations of parameters, according to the first embodiment;

FIG. 27 is a diagram showing input/output relations of a quantization step adjustment signal generating circuit shown in FIG. 26;

FIG. 33 is a diagram showing the results of evaluation value calculations for image blocks shown in FIG. 32, according to the third embodiment;

FIGS. 38A and 38B are diagrams showing quantization step characteristics of a quantizer shown in FIG. 35;

FIG. 53 is a diagram showing an example of a code amount control unit in the 11th embodiment.

DESCRIPTION OF THE PREFERRED EMBODIMENTS

The present invention will be described in detail below with reference to the accompanying drawings illustrating the preferred embodiments.

Embodiment 1

Figure 22:
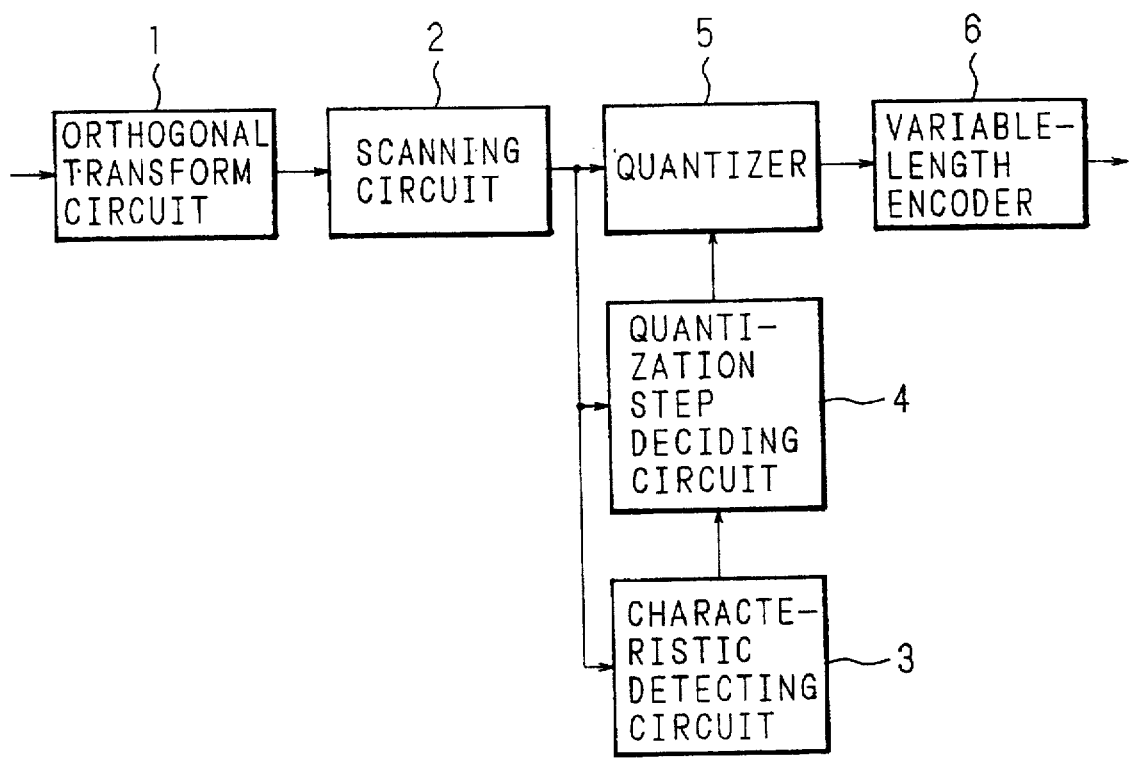
FIG. 22 is a block diagram showing the configuration of a high-efficiency encoding apparatus according to a first embodiment of the present invention.

FIG. 22 is a block diagram showing the configuration of a high-efficiency encoding apparatus according to a first embodiment of the present invention. In FIG. 22, the numeral 1 designates an orthogonal transform circuit to which a digital video signal is inputted in blocks of m pixels×n lines. The orthogonal transform circuit 1 performs an orthogonal transform, such as the DCT, on each inputted pixel block of m pixels x n lines, and supplies the resulting orthogonal-transformed coefficients (the DCT coefficients in the case of the DCT) to a scanning circuit 2. The scanning circuit 2 rearranges the orthogonal-transformed coefficients outputted from the orthogonal transform circuit 1 into a prescribed order, and supplies the rearranged orthogonal-transformed coefficients to a characteristic detecting circuit 3, a quantization step deciding circuit 4, and a quantizer 5. The characteristic detecting circuit 3 detects a characteristic block-wise, and supplies a quantization step adjusting signal that matches the detected characteristic to the quantization step deciding circuit 4. The quantization step deciding circuit 4 decides an appropriate quantization step size on the basis of the quantization step adjustment signal and the output of the scanning circuit 2. The quantizer 5 quantizes the orthogonal-transformed coefficients with the thus decided quantization step size, and supplies the quantized orthogonal-transformed coefficients to a variable-length encoder 6 where the quantized orthogonal-transformed coefficients are variable-length encoded.

Figure 4:
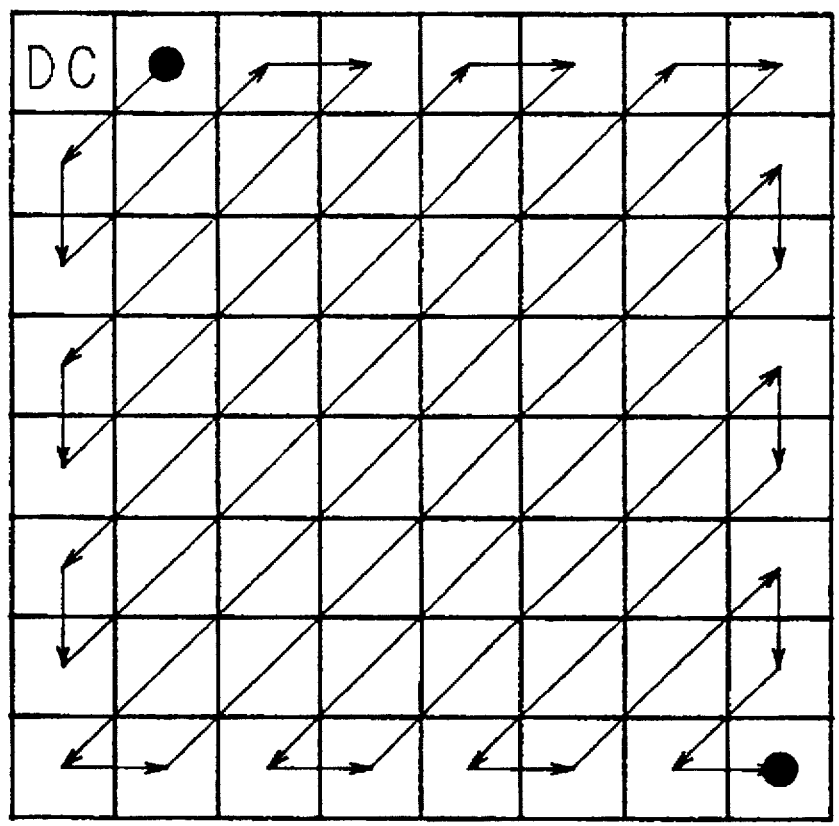
FIG. 4 is a diagram showing the order in which orthogonal-transformed coefficients are scanned.
Figure 5:
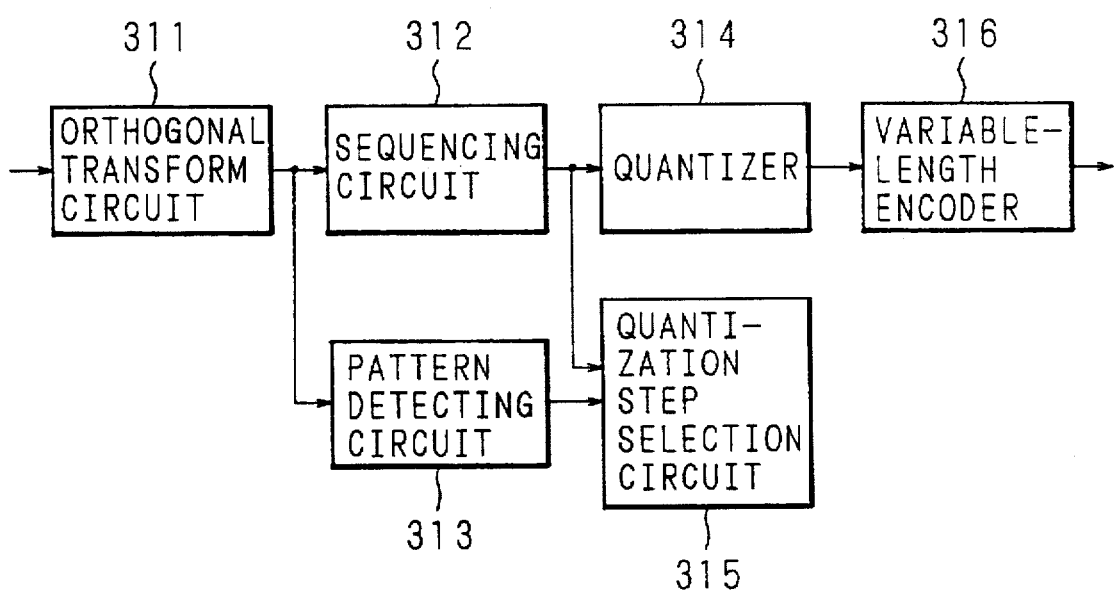
FIG. 5 is a block diagram showing the configuration of another prior art high-efficiency encoding apparatus.
Figure 6:
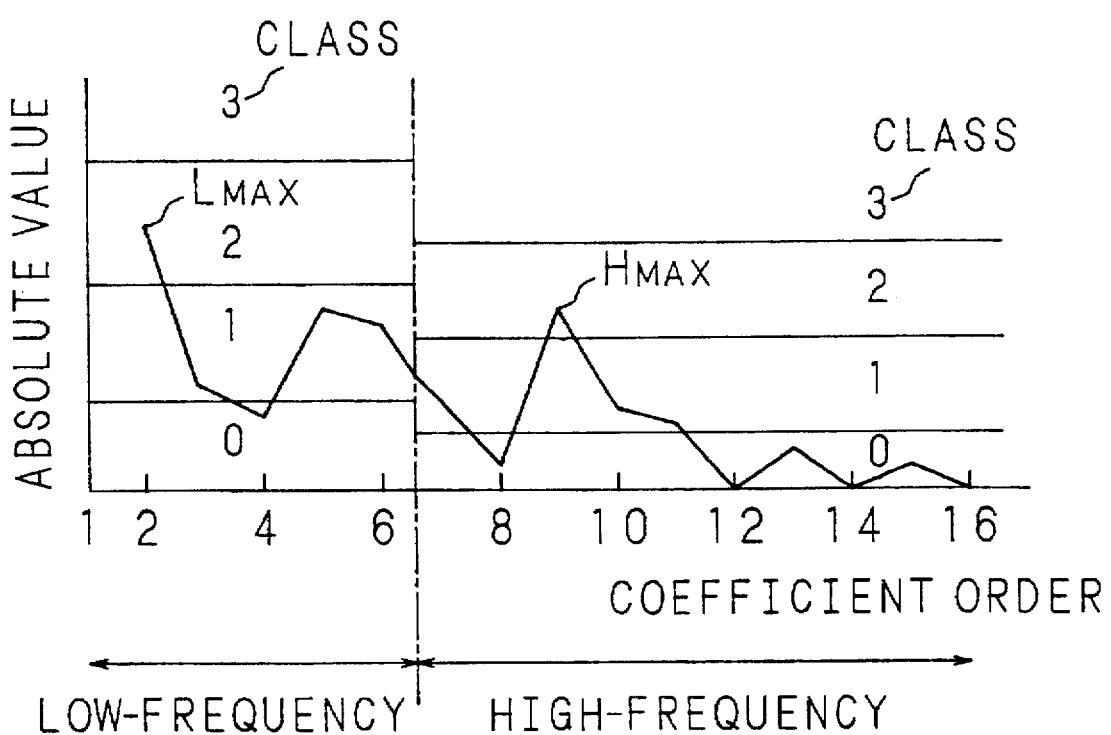
FIG. 6 is a diagram illustrating an edge detection method in the high-efficiency encoding apparatus shown in FIG. 5.

Next, the operation of the high-efficiency encoding apparatus shown in FIG. 22 will be described. The digital video signal (for example, a block of 8 pixels×8 lines) inputted to the orthogonal transform circuit 1 is subjected to an orthogonal transform process for conversion into an orthogonal-transformed block of orthogonal-transformed coefficients. The orthogonal-transformed coefficients include a DC component, which can be considered as defining the mean value of the inputted digital video signal, and AC components which indicates the variation of the digital video signal within the block. The orthogonal-transformed coefficients in the orthogonal-transformed block are fed into the scanning circuit 2 where they are rearranged in such an order as to maximize the encoding efficiency in the variable-length encoder 6, e.g., in the scanning order shown in FIG. 4, and are outputted in the rearranged order. The orthogonal-transformed coefficients rearranged in the scanning circuit 2 are supplied to the characteristic detecting circuit 3, quantization step deciding circuit 4, and quantizer 5.

The characteristic detecting circuit 3 detects the presence or absence, within the block, of an edge in the horizontal, vertical, and oblique directions, and detects the characteristic of the block from the respective detection results. Then, the quantization step deciding circuit 4 is controlled for each block; for example, when the block contains an edge in one the horizontal, vertical, or oblique directions, the quantization step size is made smaller than the previous step size, and when the block contains edges in all of the horizontal, vertical, and oblique directions, the quantization step size is made larger than the previous one since degradation of such a complex block is not easily perceptible to the eye.

Figure 23:
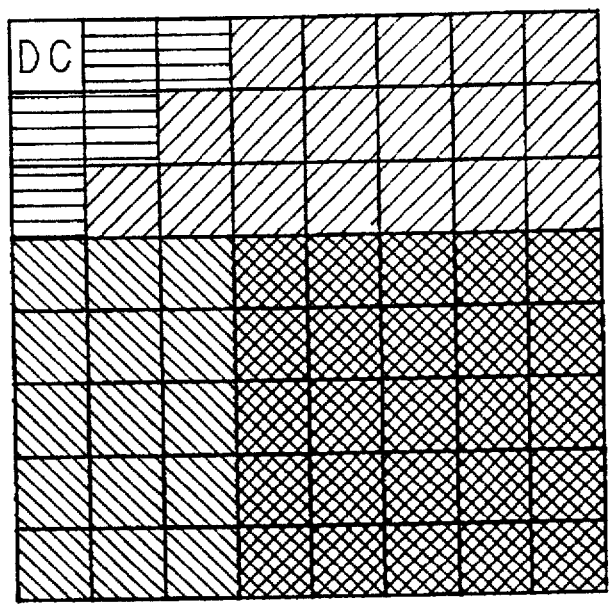
FIG. 23 is a diagram showing an orthogonal-transformed block divided into four areas, excluding the DC component, according to the first embodiment.

The characteristic detecting circuit 3 will be described below in further detail. When the orthogonal-transformed coefficients are input in the prescribed order, the characteristic detecting circuit 3 divides the AC component array into four areas, a horizontal/vertical low-frequency area, a horizontal high-, vertical low-frequency area, a horizontal low-, vertical high-frequency area, and a horizontal/vertical high-frequency area, as shown in FIG. 23, and detects the largest value of the absolute values of the orthogonal-transformed coefficients in each area. The largest value is designated as the maximum value Lmax for the horizontal/vertical low-frequency area, Hhmax for the horizontal high-, vertical low-frequency area, Hvmax for the horizontal low-, vertical high-frequency area, and Hdmax for the horizontal/vertical high-frequency area.

It is well known that when an orthogonal transform is performed on a block containing an edge, the resulting orthogonal-transformed coefficients spread into the high-frequency range, with a characteristic being different from when a block with no edge is orthogonal-transformed. The ratios of Lmax to Hhmax, Hvmax, and Hdmax, respectively, are obtained, and the presence or absence of an edge is detected using the evaluation functions shown below.

Thmin<Hhmax/Lmax<Thmax Horizontal direction

Tvmin<Hvmax/Lmax<Tvmax Vertical direction

Tdmin<Hdmax/Lmax<Tdmax Oblique direction where Thmin, Thmax, Tvmin, Tvmax, Tdmin, and Tdmax are threshold values in the evaluation functions.

The reason that the evaluation functions are set as shown above is as follows. It is known that generally, when a time-domain waveform is frequency analyzed, an impulse waveform has a flat frequency component, while a step waveform has a frequency component decreasing monotonically in increasing direction of frequency. Since the basis function for an orthogonal transform has its spectral components arranged in increasing order of frequency, when an image contains an edge or step waveform the absolute values of the resulting orthogonal-transformed coefficients generally tend to decrease monotonically in increasing order of frequency, and each of the above ratios takes a value within a certain range. That is, each of the above ratios represents a value equivalent to the rate of increase between the largest absolute value in the horizontal/vertical low-frequency area and the largest absolute value in one of the high-frequency areas in the AC component array within the same block, and that value falls within a certain range.

Figure 24A:
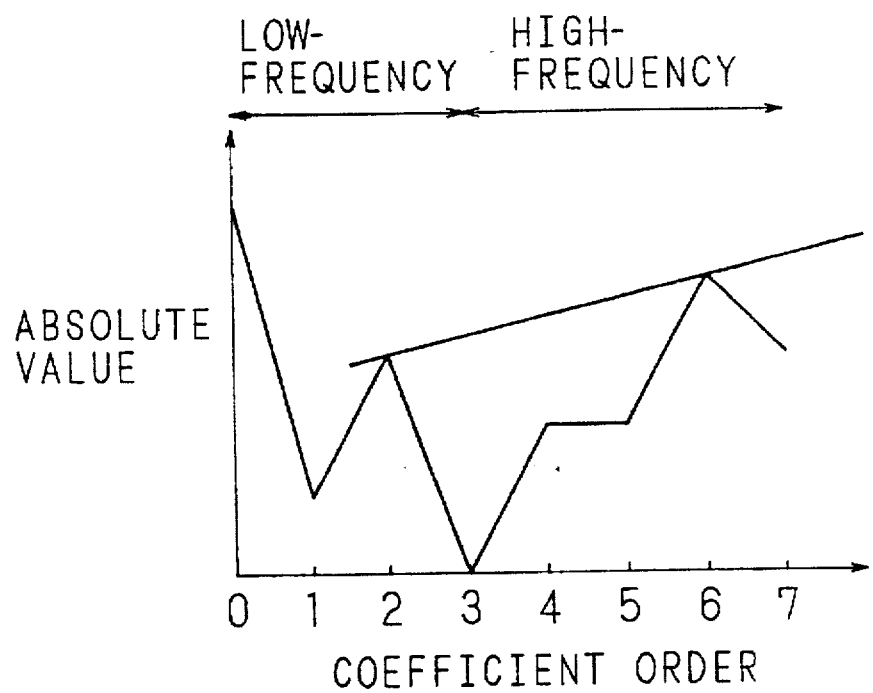
FIGS. 24A and 24B are diagrams for explaining how threshold values are set according to the first embodiment.

On the other hand, in the case of a block containing a pulse waveform or a complex waveform, its orthogonal-transformed coefficients are such that the largest of the absolute values of the high-frequency orthogonal-transformed coefficients of the AC components in the block is larger than the largest absolute value in the horizontal/vertical low-frequency area in the same block, as shown in FIG. 24A (FIG. 24A shows a one-dimensional, 8-point DCT for simplicity). What type of pulse waveform or complex waveform is to be detected for the block is determined by the setting of the upper threshold value in each of the above inequalities.

Figure 24B:
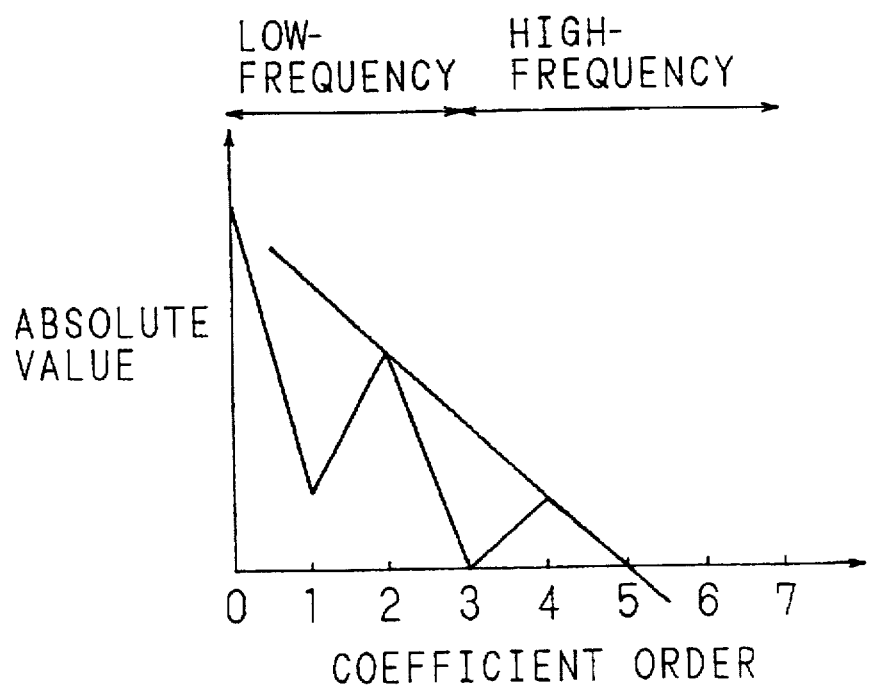

By contrast, in the case of a block containing a smooth edge, its orthogonal-transformed coefficients are such that the largest of the absolute values of the high-frequency orthogonal-transformed coefficients of the AC components in the block is smaller than the largest absolute value in the horizontal/vertical low-frequency area in the same block, as shown in FIG. 24B (FIG. 24B shows a one-dimensional, 8-point DCT for simplicity). What type of smooth edge is to be detected for the block is determined by the setting of the lower threshold value in each of the above inequalities.

When any of the above inequalities is satisfied, it is determined that there is an edge in the direction concerned. FIG. 25 shows an example of how the quantization step size is changed for various combinations of edge detection results. It will be noted here that Thmin, Thmax, Tvmin, Tvmax, Tdmin, and Tdmax in the above inequalities are prescribed threshold values and may be set at appropriate values as desired.

Figure 28:
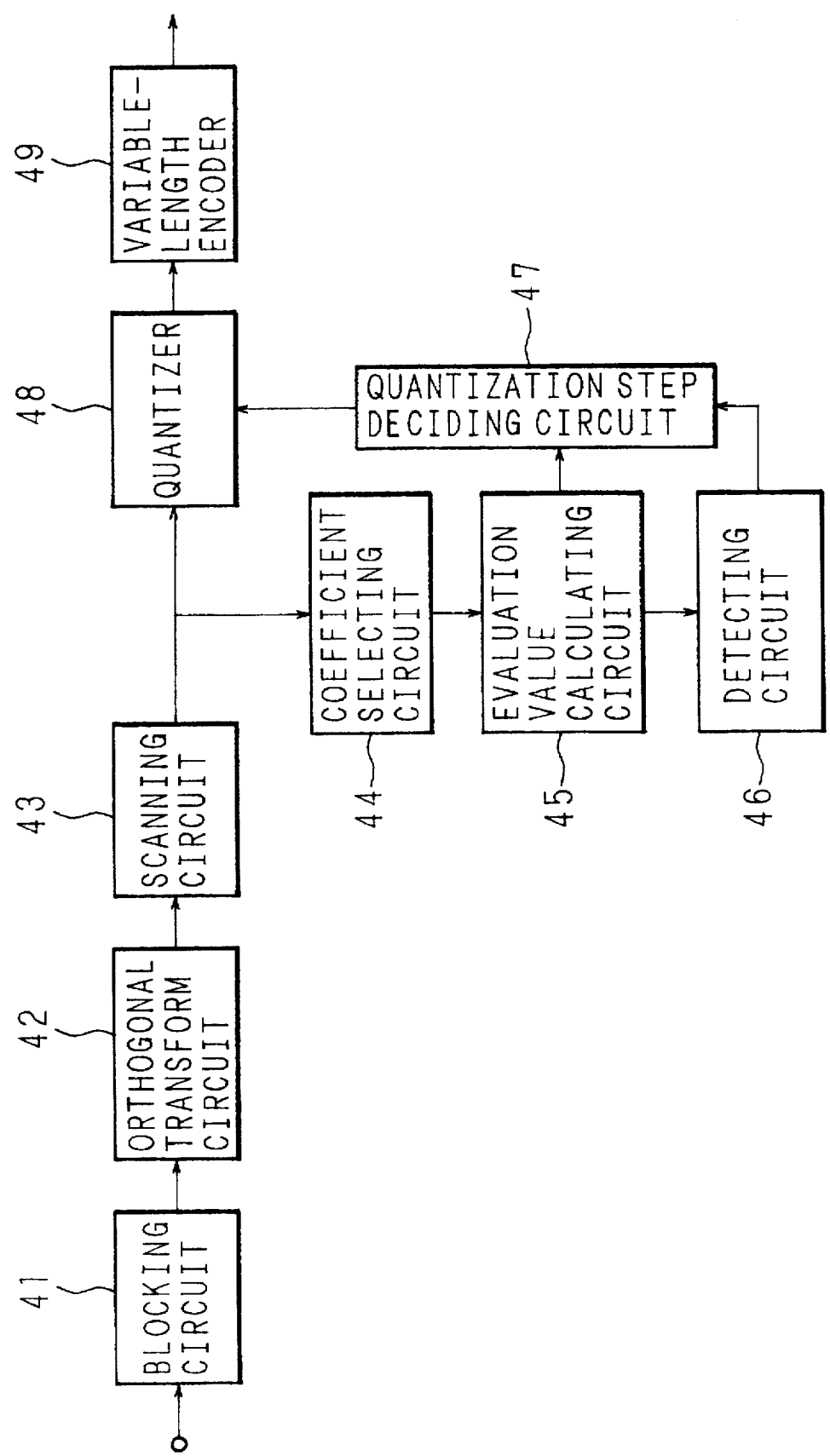
FIG. 28 is a block diagram showing the configuration of a high-efficiency encoding apparatus according to second and third embodiments of the present invention.

FIG. 28 is a block diagram showing the internal configuration of the characteristic detecting circuit 3 of FIG. 22. In FIG. 28, the numeral 10 indicates an input terminal via which the orthogonal-transformed coefficients are inputted from the scanning circuit 2 in the scanning order previously illustrated. The orthogonal-transformed coefficients inputted via the input terminal 10 are directed to an all-area MAX value detecting circuit 11, a low-area MAX value detecting circuit 12, a horizontal high-area MAX value detecting circuit 13, a vertical high-area MAX value detecting circuit 14, and an oblique high-area MAX value detecting circuit 15. The all-area MAX value detecting circuit 11 detects the largest absolute value out of all the orthogonal-transformed coefficients of the AC components in one orthogonal-transformed block, and supplies the detected value to a comparator 17. The low-frequency area MAX value detecting circuit 12 detects the largest absolute value out of the AC components in the horizontal/vertical low-frequency area shown, for example, in FIG. 23, and supplies the detected value to a horizontal evaluation circuit 23, a vertical evaluation circuit 28, an oblique evaluation circuit 29, and a comparator 19. The horizontal high-area MAX value detecting circuit 13 detects the largest absolute value out of the AC components in the horizontal high-, vertical low-frequency area shown, for example, in FIG. 23, and supplies the detected value to the horizontal evaluation circuit 23. The vertical high-area MAX value detecting circuit 14 detects the largest absolute value out of the AC components in the horizontal low-, vertical high-frequency area shown, for example, in FIG. 23, and supplies the detected value to the vertical evaluation circuit 26. The oblique high-area MAX value detecting circuit 15 detects the largest absolute value out of the AC components in the horizontal/vertical high-frequency area (oblique high-area) shown, for example, in FIG. 23, and supplies the detected value to the oblique evaluation circuit 29.

The comparator 17 compares the output of the all-area MAX value detecting circuit 11 with a threshold value applied at an input terminal 16, and supplies the result of the comparison to an AND gate 20. On the other hand, the comparator 19 compares the output of the low-area MAX value detecting circuit 12 with a threshold value applied at an input terminal 18, and supplies the result of the comparison to the AND gate 20. The AND gate 20 ANDs the outputs of the comparators 17 and 18 and supplies the result to AND gates 30, 31, and 32. The horizontal evaluation circuit 23 evaluates the horizontal high-, vertical low-frequency area on the basis of the threshold values Thmin and Thmax applied at input terminals 21 and 22, and the maximum values Lmax and Hhmax supplied from the low-area MAX value detecting circuit 12 and horizontal high-area MAX value detecting circuit 13, and supplies the result of the evaluation to the AND gate 30. The vertical evaluation circuit 26 evaluates the horizontal low-, vertical high-frequency area on the basis of the threshold values Tvmin and Tvmax applied at input terminals 24 and 25 respectively, and the maximum values Lmax and Hvmax supplied from the low-area MAX value detecting circuit 12 and vertical high-area MAX value detecting circuit 14, and supplies the result of the evaluation to the AND gate 31. The oblique evaluation circuit 29 evaluates the oblique high-area on the basis of the threshold values Tdmin and Tdmax applied at input terminals 27 and 28 respectively, and the maximum values Lmax and Hdmax supplied from the low-area MAX value detecting circuit 12 and the oblique high-area MAX value detecting circuit 15, and supplies the result of the evaluation to the AND gate 32.

The AND gate 30 ANDs the output of the AND gate 20 with the output of the horizontal evaluation circuit 23, and supplies the result to a quantization step adjustment signal generating circuit 33. The AND gate 31 ANDs the output of the AND gate 20 with the output of the vertical evaluation circuit 26, and supplies the result to the quantization step adjustment signal generating circuit 33. Further, the AND gate 32 ANDs the output of the AND gate 20 with the output of the oblique evaluation circuit 29, and supplies the result to the quantization step adjustment signal generating circuit 33. The quantization step adjustment signal generating circuit 33 accepts the outputs of the AND gates 30, 31, and 32, and generates a quantization step adjustment signal which is outputted via an output terminal 34.

Figure 26:
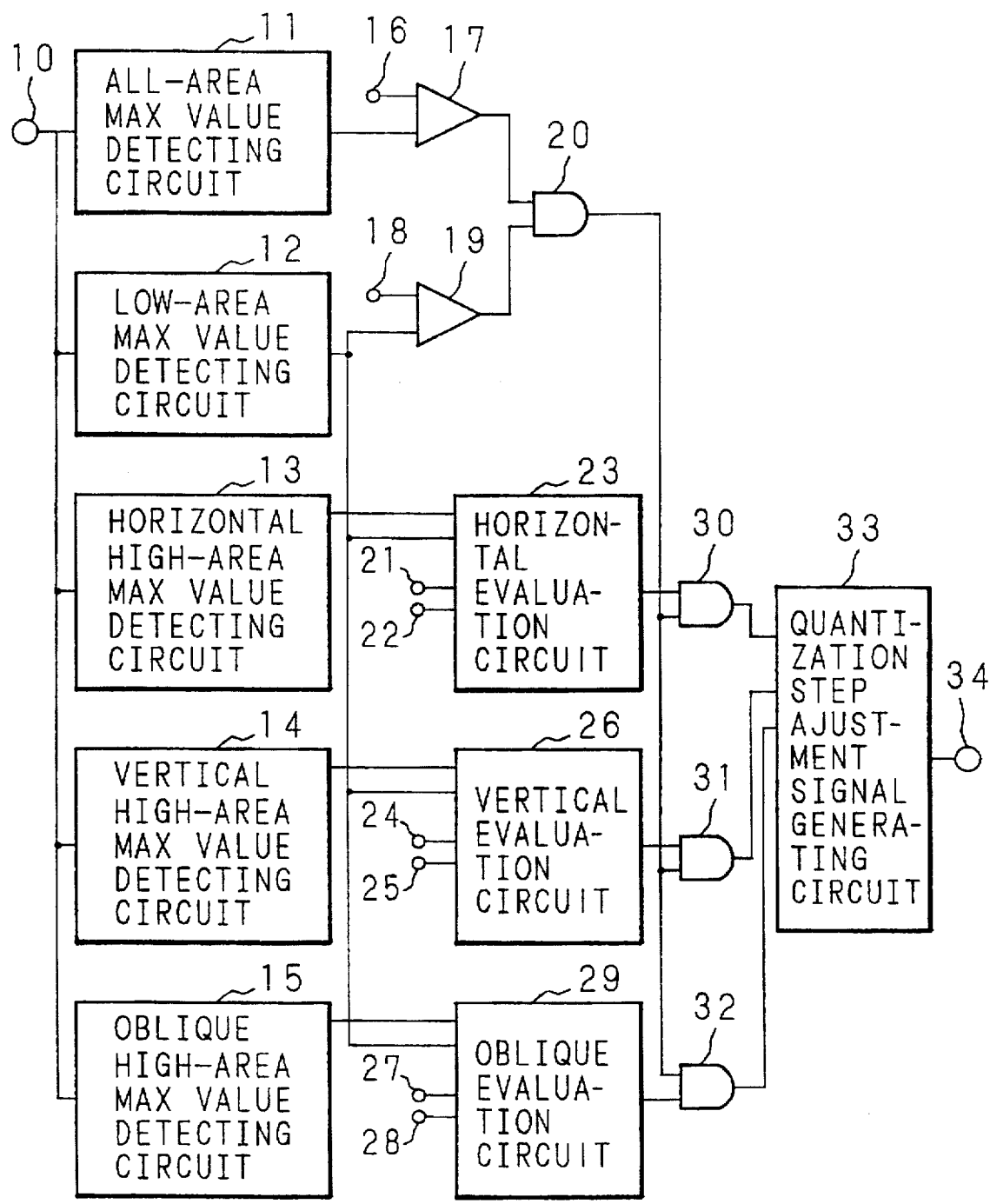
FIG. 26 is a block diagram showing the internal configuration of a characteristic detecting circuit shown in FIG. 22.

Next, the operation of the characteristic detecting circuit 3 will be described below with reference to FIG. 26. From among the orthogonal-transformed coefficients inputted via the input terminal 10, the all-area MAX value detecting circuit 11 detects the largest of the absolute values of the AC components in one orthogonal-transformed block. The low-area MAX value detecting circuit 12 detects the largest of the absolute values of the AC components in the horizontal/ vertical low-frequency area in the one orthogonal-transformed block such as shown in FIG. 23. Likewise, the horizontal high-area MAX value detecting circuit 13 detects the largest of the absolute values of the AC components in the horizontal high-, vertical low-frequency area in the one orthogonal-transformed block such as shown in FIG. 23; the vertical high-area MAX value detecting circuit 14 detects the largest of the absolute values of the AC components in the horizontal low-, vertical high-frequency area in the one orthogonal-transformed block such as shown in FIG. 23; and the oblique high-area MAX value detecting circuit 15 detects the largest of the absolute values of the AC components in the oblique high-area in the one orthogonal-transformed block such as shown in FIG. 23.

The detected value from the all-area MAX value detecting circuit 11 is compared in the comparator 17 with the threshold value applied at the input terminal 16; the comparator 17 is configured to output a low when the detected value from the all-area MAX value detecting circuit 11 is larger than the threshold value, and a high in the opposite case. With this configuration, when the largest of the absolute values of the AC components of the orthogonal-transformed coefficients in the orthogonal-transformed block is sufficiently large compared with the threshold value, no quantization step size adjustment will be made regardless of whether an edge is detected or not. It is well known that when the largest of the absolute values of the AC components of the orthogonal-transformed coefficients in an orthogonal-transformed block is sufficiently large compared with the threshold value, the data amount of the block after variable-length encoding will become large. When the quantization step size for such a block were reduced, the data amount after variable-length encoding would become even larger and sufficient bits could not be assigned to other blocks.

The detected value from the low-area MAX value detecting circuit 12 is compared in the comparator 19 with the threshold value applied at the input terminal 18. The comparator 19 outputs a high if the detected value from the low-area MAX value detecting circuit 12 is larger than the threshold value, and a low in the opposite case. This is because the low-frequency components of the orthogonal-transformed coefficients have a significant effect on the picture quality, as previously noted, and almost all blocks contain low-frequency orthogonal-transformed coefficients. Therefore, when the largest of the absolute values of the orthogonal-transformed coefficients in the low-frequency area is sufficiently small, it is considered that there is little need to reduce the quantization step size. The outputs of the comparators 17 and 19 are ANDed in the AND gate 20.

The detected value from the horizontal high-area MAX value detecting circuit 13 is evaluated in the horizontal evaluation circuit 23, along with the output from the low-area MAX value detecting circuit 12 and the threshold values Thmin and Thmax applied at the input terminals 21 and 22. The evaluation formula previously given is used; that is, the horizontal evaluation circuit 23 compares the ratio of the output of the horizontal high-area MAX value detecting circuit 13 to the output of the low-area MAX value detecting circuit 12 with the Thmin and Thmax applied at the input terminals 21 and 22 respectively, and outputs a high signal when the condition is satisfied, and a low signal when the condition is not satisfied.

The detected value from the vertical high-area MAX value detecting circuit 14 is evaluated in the vertical evaluation circuit 26, along with the output from the low-area MAX value detecting circuit 12 and the threshold values Tvmin and Tvmax applied at the input terminals 24 and 25. The evaluation formula previously given is used; that is, the vertical evaluation circuit 26 compares the ratio of the output of the vertical high-area MAX value detecting circuit 14 to the output of the low-area MAX value detecting circuit 12 with the Tvmin and Tvmax applied at the input terminals 24 and 25, and outputs a high signal when the condition is satisfied, and a low signal when the condition is not satisfied.

The detected value from the oblique high-frequency area MAX value detecting circuit 15 is evaluated in the oblique evaluation circuit 29, along with the output from the low-area MAX value detecting circuit 12 and the threshold values Tdmin and Tdmax applied at the input terminals 27 and 28. The evaluation formula previously given is used; that is, the oblique evaluation circuit 29 compares the ratio of the output of the oblique high-area MAX value detecting circuit 15 to the output of the low-area MAX value detecting circuit 12 with the Tdmin and Tdmax applied at the input terminals 27 and 28, and outputs a high signal when the condition is satisfied, and a low signal when the condition is not satisfied.

The output of the horizontal evaluation circuit 23 is ANDed in the AND gate 30 with the output of the AND gate 20; that is, when the output of the AND gate 20 is high, the output of the AND gate 30 is the same as the output of the horizontal evaluation circuit 23, and when the output of the AND gate 20 is low, the output of the AND gate 30 is low irrespective of the output of the horizontal evaluation circuit 23. The output of the vertical evaluation circuit 26 is ANDed in the AND gate 31 with the output of the AND gate 20; that is, when the output of the AND gate 20 is high, the output of the AND gate 31 is the same as the output of the vertical evaluation circuit 26, and when the output of the AND gate 20 is low, the output of the AND gate 31 is low irrespective of the output of the vertical evaluation circuit 26. The output of the oblique evaluation circuit 29 is ANDed in the AND gate 32 with the output of the AND gate 20; that is, when the output of the AND gate 20 is high, the output of the AND gate 32 is the same as the output of the oblique evaluation circuit 29, and when the output of the AND gate 20 is low, the output of the AND gate 32 is low irrespective of the output of the oblique evaluation circuit 29.

The outputs of the AND gates 30, 31, and 32 are supplied as inputs to the quantization step adjustment signal generating circuit 33. Based on the outputs from the AND gates 30, 31, and 32, the quantization step adjustment signal generating circuit 33 generates a 2-bit quantization step adjustment signal such as shown in FIG. 27. FIG. 27 shows the same contents given in FIG. 25 but in a different representation. FIGS. 25 and 27 only show examples, and neither the form of the quantization step adjusting signal nor the adjusting direction of the quantization step size is limited to the illustrated examples.

The quantization step adjustment signal thus decided is supplied to the quantization step deciding circuit 4. The quantization step deciding circuit 4 first selects a quantization step size such that the data amount, after quantizing and variable-length encoding the orthogonal-transformed coefficients, will be constant in any groups of blocks, and then decides a quantization step size in accordance with the selected quantization step size and in consideration of the quantization step adjustment signal. The orthogonal-transformed coefficients outputted from the scanning circuit 2 are quantized in the quantizer 5 with a prescribed number of bits in accordance with the quantization step size decided by the quantization step deciding circuit 4. The quantized orthogonal-transformed coefficients are supplied to the variable-length encoder 6 for variable-length encoding, and variable-length encoded data are outputted.

In the first embodiment described above, the all-area MAX value detecting circuit is provided to which the orthogonal-transformed coefficients after scanning are directly input, but it will be appreciated that the invention is not limited to such a configuration. Alternatively, the maximum value for all areas may be detected from the maximum values obtained from the respective split areas. Furthermore, in the above configuration, different threshold values are used for evaluation of different areas, but it will be recognized that the evaluation may be accomplished in other ways; for example, a single lower threshold value and a single upper threshold value may be used for evaluation of all areas. Moreover, the method of area division is not limited to the one illustrated in FIG. 23, but any other method may be used as long as the method can detect the characteristics in the horizontal, vertical, and oblique directions.

As described above, according to the first embodiment, using the characteristic detecting circuit 3 it is possible to detect only those blocks whose image degradation would be perceptible to the eye, while on the other hand, excluding blocks whose image degradation resulting from encoding is not easily perceptible to the eye. Thus, in the first embodiment, image quality can be improved by controlling the quantization step size on a block-by-block basis.

Embodiment 2

FIG. 28 is a block diagram showing the configuration of a high-efficiency encoding apparatus according to a second embodiment of the present invention. In FIG. 28, the numeral 41 designates a blocking circuit for dividing incoming digital video signals into blocks of a predetermined number of pixels. The blocking circuit 41 supplies the block data to an orthogonal transform circuit 42. The orthogonal transform circuit 42 performs an orthogonal transform, such as the DCT, on the block data, and supplies the resulting orthogonal-transformed coefficients to a scanning circuit 43. The scanning circuit 43 rearranges the orthogonal-transformed coefficients in a prescribed order, and supplies the rearranged orthogonal-transformed coefficients in sequence to a coefficient selecting circuit 44 and a quantizer 48. The coefficient selecting circuit 44 selects the largest of the absolute values of the high-frequency coefficients and the largest of the absolute values of the low-frequency coefficients in the orthogonal-transformed frequency array, and supplies the selected values to an evaluation value calculating circuit 45. The evaluation value calculating circuit 45 calculates an evaluation value based on the output values from the coefficient selecting circuit 44, and supplies the evaluation value to a detecting circuit 46 and a quantization step deciding circuit 47. The detecting circuit 46 supplies an edge detection signal to the quantization step deciding circuit 47 when the evaluation value calculated by the evaluation value calculating circuit 45 satisfies a certain condition. The quantization step deciding circuit 47 decides a quantization step size to be used in the quantizer 48 on the basis of the outputs from the evaluation value calculating circuit 45 and detecting circuit 46, and supplies a signal indicating the quantization step size to the quantizer 48. The quantizer 48 quantizes the orthogonal-transformed coefficients in accordance with the thus decided quantization step size, and supplies the output to the variable-length encoder 49. In the variable-length encoder 49, the quantized transformed coefficients are subjected to variable-length encoding.

Figure 29:
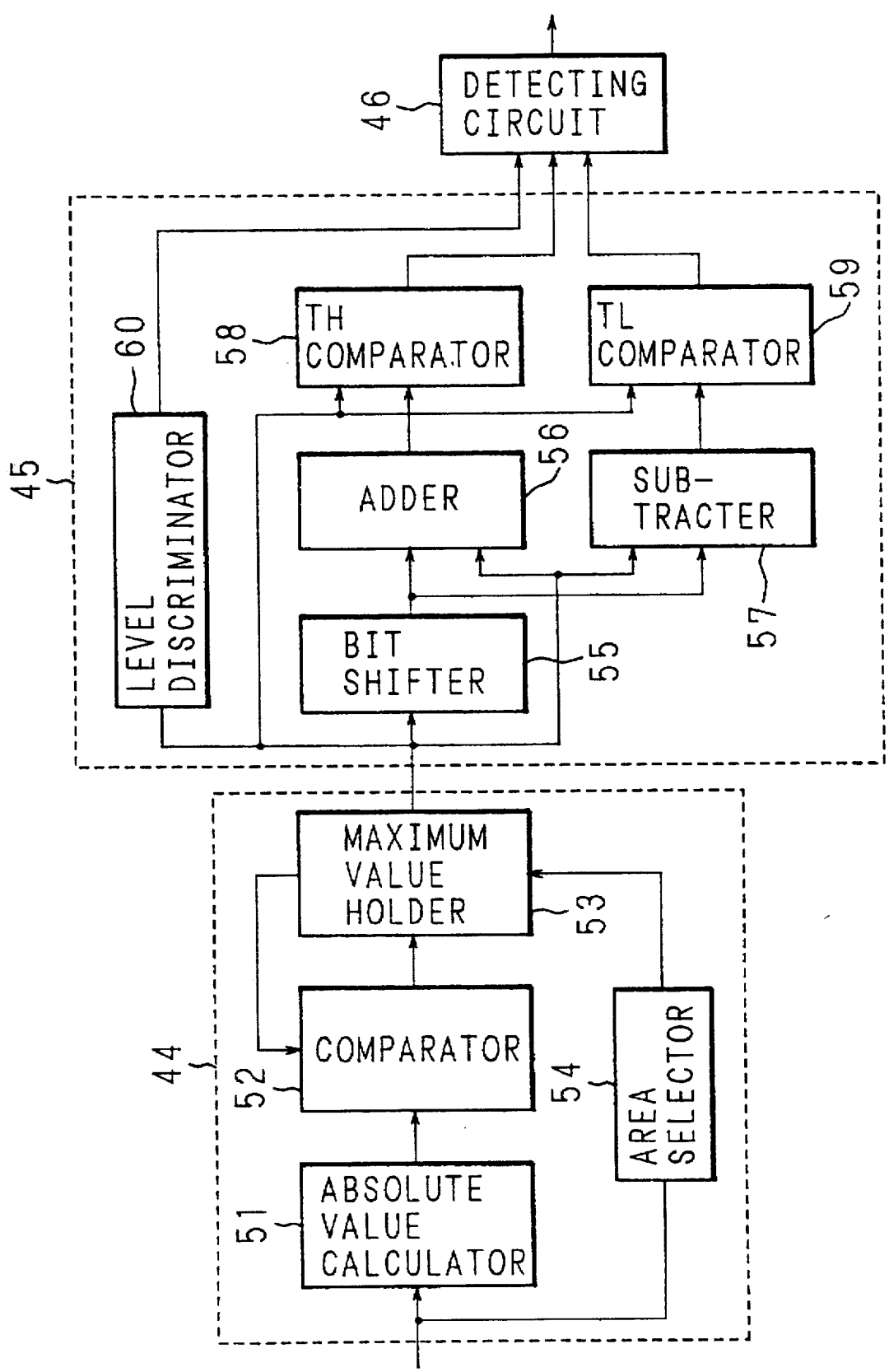
FIG. 29 is a block diagram showing the internal configuration of a coefficient selecting circuit and an evaluation value calculating circuit in the high-efficiency encoding apparatus of the second embodiment.

FIG. 29 is a block diagram showing the internal configuration of the coefficient selecting circuit 44 and evaluation value calculating circuit 45 shown in FIG. 28. The coefficient selecting circuit 44 has: an absolute value calculator 51 for calculating the absolute value of each inputted transformed coefficient; a comparator 52 for comparing an output of the absolute value calculator 51 with an output of a maximum value holder 53; the maximum value holder 53 for holding the largest of the absolute values of the transformed coefficients; and an area selector 54 for selecting high-frequency and low-frequency coefficient areas. On the other hand, the evaluation value calculating circuit 45 has: a bit shifter 55 for shifting input data by a prescribed number of bits; an adder 56 for adding an output of the coefficient selecting circuit 44 to an output of the bit shifter 55; a subtracter 57 for subtracting an output of the bit shifter 55 from an output of the coefficient selecting circuit 44; a TH comparator 58 for comparing an output of the coefficient selecting circuit 44 with an output of the adder 56; a TL comparator 59 for comparing an output of the coefficient selecting circuit 44 with an output of the subtracter 57; and a level discriminator 60 for discriminating the output level of the coefficient selecting circuit 44.

Next, the operation of the high-efficiency encoding apparatus of the second embodiment shown in FIGS. 28 and 29 will be described. A digital video signal is inputted to the blocking circuit 41 and divided into blocks each including, for example, 8 pixels horizontally and 8 lines vertically. Each block of data is supplied to the orthogonal transform circuit 42, and subjected to the DCT to produce 64 transformed coefficients, which are fed into the scanning circuit 43. The scanning circuit 43 first outputs one DC coefficient, and then sequentially outputs 63 AC coefficients in the order shown in FIG. 30, for example. In the figure, the DC coefficient and the horizontal/vertical low-frequency AC coefficients are placed in the upper left portion of the block, the horizontal high-frequency AC coefficients in the right-hand portion, and the vertical high-frequency AC coefficients in the lower portion. The numbers shown indicate the order in which the AC coefficients are outputted. The AC coefficients need only be output, roughly in order of increasing frequency, and the output order is not necessarily limited to the one illustrated in FIG. 30.

Figure 30:
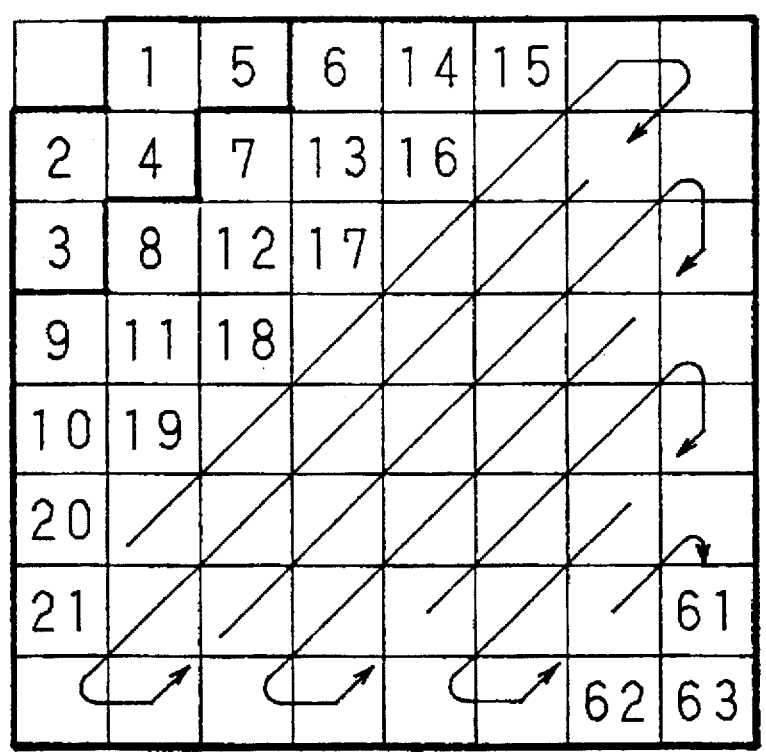
FIG. 30 is a diagram showing the order in which orthogonal-transformed coefficients are read out from a scanning circuit.

The orthogonal-transformed coefficients sequentially output from the scanning circuit 43 are supplied to the quantizer 48 and also to the coefficient selecting circuit 44. Of the AC coefficients in the orthogonal-transformed coefficient array, the first to fifth coefficients in the scanning order shown in FIG. 30 are grouped as the low-frequency coefficients, and the sixth to 63rd as the high-frequency coefficients, and the coefficient selecting circuit 44 selects maximum values a and b from the absolute values of the low-frequency and high-frequency coefficients, respectively.

In the coefficient selecting circuit 44, each incoming coefficient is fed into the absolute value calculator 51 where the absolute value is obtained for inputted to the comparator 52. The comparator 52 compares the absolute value of the incoming coefficient with the value outputted from the maximum value holder 53, and supplies the larger of the two to the maximum value holder 53. When the value is inputted from the comparator 52, the maximum value holder 53 holds that value as a new maximum value, and at the same time, outputs this new value to the comparator 52. Upon input of the first coefficient, the area selector 54 resets the maximum value holder 53, and when the input of the fifth coefficient is complete, the maximum value holder 53 is made to output the value held therein as the maximum value a for the low-frequency area. In like manner, upon input of the sixth coefficient, the maximum value holder 53 is reset, and when the input of the 63rd coefficient is complete, the maximum value holder 53 is made to output the value held therein as the maximum value b for the high-frequency area.

The low-frequency maximum value a and the high-frequency maximum value b are supplied to the evaluation value calculating circuit 45 which performs evaluation using the following equations.

$$a \times (1-(1/2)^2) \leq b \qquad \text{(Equation 1)}$$

$$b \leq a \times (1+(1/2)^2) \qquad \text{(Equation 2)}$$

$$AL \leq a \leq AH \qquad \text{(Equation 3)}$$

where AL and AH are constants. When rewritten, Equations 1 and 2 are equivalent to value r in evaluation equation r=b/a satisfying the condition $0.75 \leq r \leq 1.25$, based on which it is judged whether an image block contains a step waveform or an edge. However, blocks having extremely low amplitude or extremely high amplitude are excluded using the condition of Equation 3 defining the limits for a. Both sides of each of Equations 1 to 3 are values having a accuracy of about 10 bits. By appropriately setting the coefficients and constants for these equations, wide pulses and edges having medium amplitude whose image distortion is easily perceptible to the eye can be detected with high accuracy.

The low-frequency maximum value a fed into the evaluation value calculating circuit 45 is shifted two bits downward by the bit shifter 55, to obtain $a \times (1/2)^2$ or $0.25 \times a$. This value and a are added together in the adder 56, and the result, $1.25 \times a$, is fed to the TH comparator 58. Likewise, the value $0.25 \times a$ is subtracted from a in the subtractor 57, and the result, $0.75 \times a$, is fed to the TL comparator 59. Next, the high-frequency maximum value b fed into the evaluation value calculating circuit 45 is inputted to the TH comparator 58 and TL comparator 59 for comparison with the above results. When the result of the comparison satisfies Equation 2, the TH comparator 58 produces a detection output, and when Equation 1 is satisfied, the TL comparator 59 produces a detection output. Each detection output is supplied to the detecting circuit 46. The level discriminator 60 produces a detection output to be inputted to the detecting circuit 46 when the input a satisfies the condition of Equation 3. The evaluation value calculating circuit 45 of the above configuration performs evaluation of the evaluation value r=b/a by using a bit shifter, functionally equivalent to but without using a divider, and therefore, can be implemented in simple circuitry.

The detecting circuit 46, to which the evaluation results of Equations 1 to 3 are inputted, outputs an edge detection signal to the quantization step deciding circuit 47 only when all the three equations are satisfied. The quantization step deciding circuit 47 decides the quantization step size to be used in the quantizer 48; that is, by adjusting the quantization step size at the time of quantization, the code amount occurring in the variable-length encoder 49 after the quantizer 48, is controlled at a prescribed value. Blocks detected as containing edges are quantized with a smaller step size than that for blocks detected as containing no edges. This reduces quantizing distortion for blocks containing edges.

Embodiment 3

Figure 31:
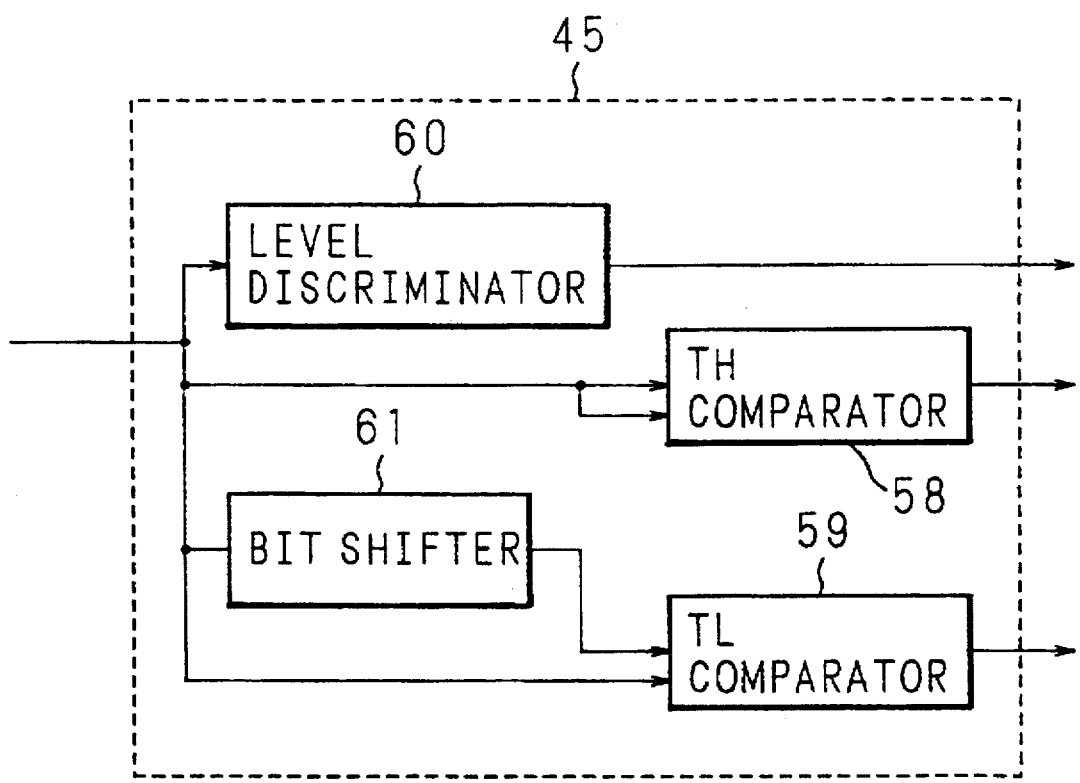
FIG. 31 is a block diagram showing the internal configuration of an evaluation value calculating circuit in the high-efficiency encoding apparatus of the third embodiment.

The configuration of a high-efficiency encoding apparatus according to a third embodiment of the invention is the same as that of the high-efficiency encoding apparatus of the aforementioned second embodiment, the only difference being in the internal configuration of the evaluation value calculating circuit 45. FIG. 31 is a block diagram showing the internal configuration of the evaluation value calculating circuit 45 according to the third embodiment. In FIG. 31, the same parts as those shown in FIG. 29 are designated by the same numerals, and the description of such parts will not be repeated here. The numeral 61 is a bit shifter for shifting input data three bits downward.

The low-frequency maximum value a and the high-frequency maximum value b are supplied from the coefficient selecting circuit 44 to the evaluation value calculating circuit 45 of the third embodiment, which performs evaluation using the following equations.

$$a \times (1/2)^3 \leq b \qquad \text{(Equation 4)}$$

$$b \leq a \qquad \text{(Equation 5)}$$

$$AL \leq a \leq AH \qquad \text{(Equation 3)}$$

where AL and AH are constants. When rewritten, Equations 4 and 5 are equivalent to value r in evaluation equation r=b/a satisfying the condition $0.125 \leq r \leq 1$. The constants on both sides of this equation are determined in consideration of the type of image to be judged as an edge and the nature of the input image. In the third embodiment, the range of value r based on which to detect an edge is smaller than that in the second embodiment.

In FIG. 31, the low-frequency maximum value a fed into the evaluation value calculating circuit 45 is input to the level discriminator 60, TH comparator 58, and bit shifter 61. The bit shifter 61 shifts the input a three bits downward to obtain $a \times (1/2)^3$ which is inputted to the TL comparator 59. Next, the high-frequency maximum value b fed into the evaluation value calculating circuit 45 is inputted to the TH comparator 58 and TL comparator 59 for comparison; when the result of the comparison satisfies Equation 5, the TH comparator 58 produces a detection output, and when Equation 4 is satisfied, the TL comparator 59 produces a detection output. Each detection output is supplied to the detecting circuit 48. The level discriminator 60 produces a detection output to be inputted to the detecting circuit 46 when the input a satisfies the condition of Equation 3. When an edge can be detected with the conditions of Equations 4 and 5, the advantage is that the circuit design can be made simple as shown in FIG. 31, compared with that shown in FIG. 29.

Figure 32A:
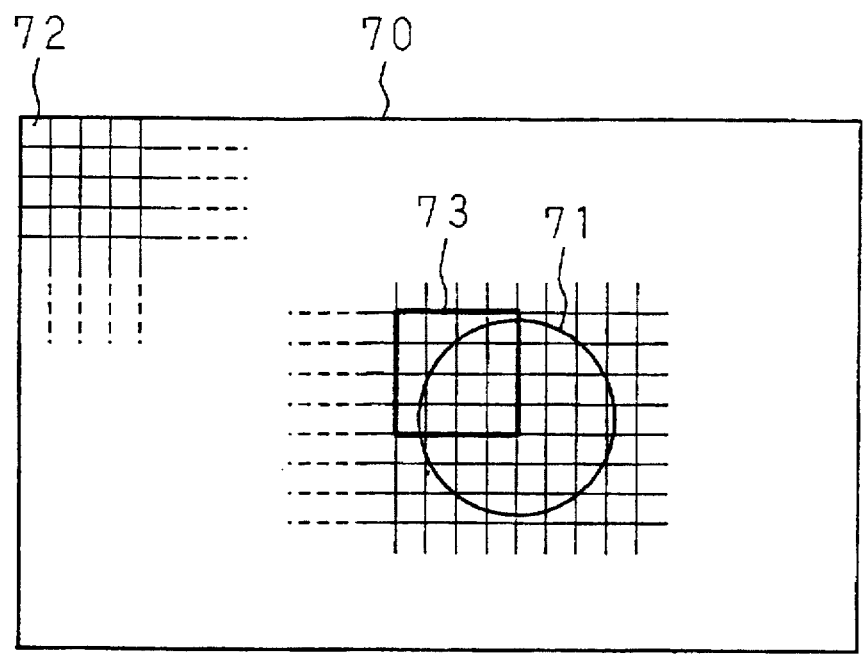
FIGS. 32A and 32B are diagrams showing a screen display of an input video signal.
Figure 32B:
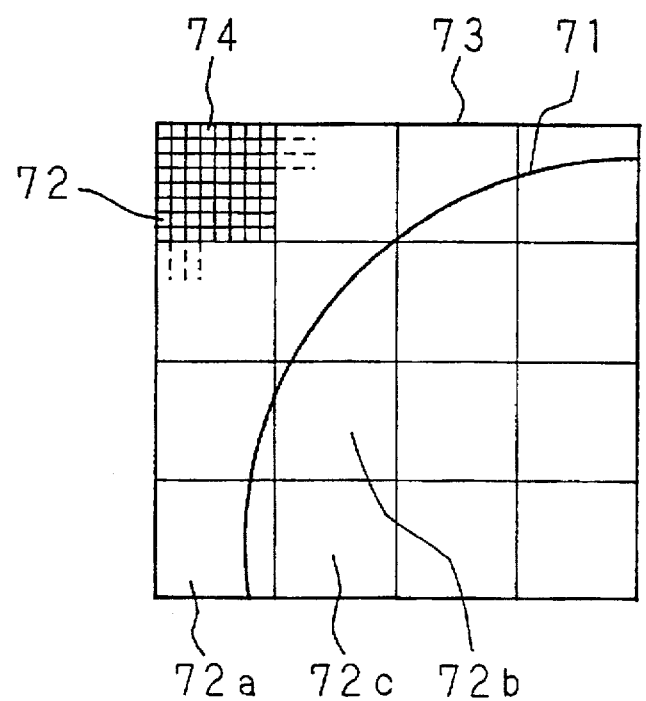

We will now describe with reference to drawings how an edge is detected using the conditional equations of the third embodiment. FIGS. 32A and 32B show a screen display of a digital video signal inputted to the blocking circuit 41. In FIG. 32A, the numeral 70 designates a screen on which a circular object 71 is displayed. Further, the numeral 72 indicates a block including of 8 pixels vertically and 8 pixels horizontally, and 73 represents a group of blocks in the vicinity of the object 71. An enlarged view of the block group 73 is shown in FIG. 32B. In FIG. 32B, 74 represents a pixel in each block 72, 72a and 72b are pixels containing an edge of the object 71, and 72c is a block that does not contain an edge. The size of each block 72 is not limited to 8 pixels vertically and 8 pixels horizontally, and also, the object 71 may be of any shape. The video signal sequentially scanned horizontally from the top to the bottom of the screen in FIG. 32B is inputted to the blocking circuit 41 which divides the signal into blocks of 8 pixels ×8 lines and supplies each block to the orthogonal transform circuit 42.

Figure 34:
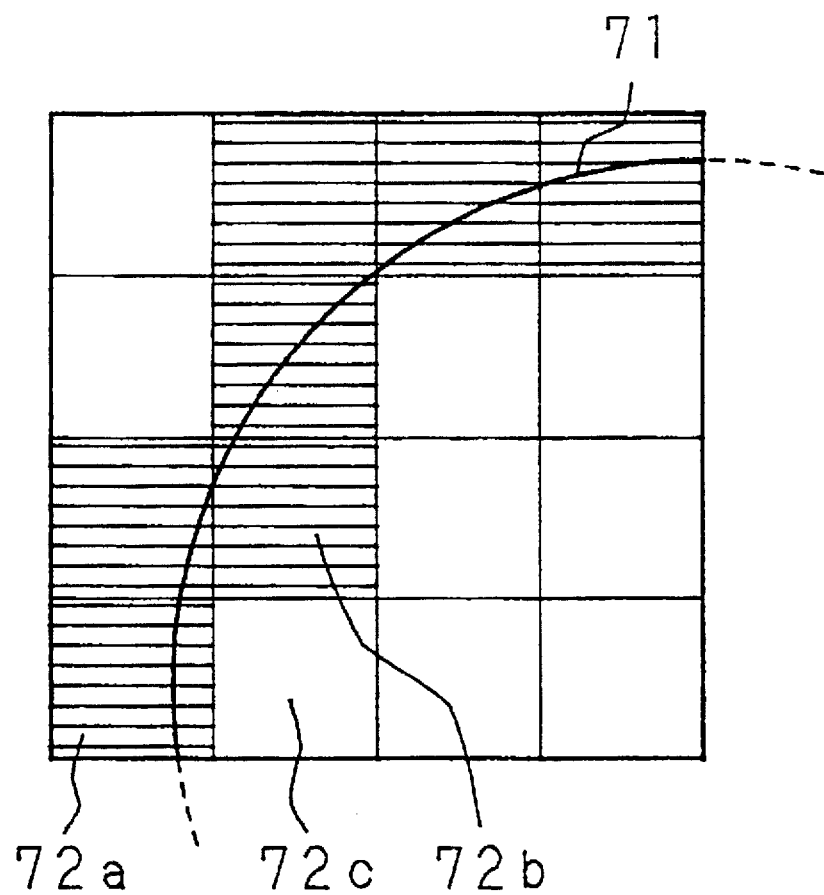
FIG. 34 is a diagram showing the result of edge detection performed using the evaluation values, according to the third embodiment.

As input data for orthogonal transformation, the pixels 74 outside the object 71 were each set at a value 0 and those inside the object 71 at a value 100, and random noise with a maximum amplitude value 1p-p equivalent to −40 dB in terms of amplitude ratio with respect to the object 71 was added to all pixels; after that, the orthogonal transform was performed by numerical calculation, and evaluation values r were obtained from the output coefficients. The resulting values are shown in FIG. 33. In the figure, each square corresponds to one of the 16 blocks shown in FIG. 32B, and the numbers are the evaluation values r of the respective blocks. Based on these values, edge detection was performed using Equations 3 to 5, the result being as shown in FIG. 34. In FIG. 34, those blocks indicated by horizontal lines are each detected as containing an edge. Here, the value of the constant AL in Equation 3 is set to 2, and the condition of AH is not used. As shown in FIG. 34, the blocks 72a and 72b, which contain edges including oblique edges, are correctly detected. The block 72c satisfies both Equations 4 and 5, but the maximum value a of the low-frequency coefficients in absolute value terms is 0.58 which does not satisfy one condition of Equation 3; therefore, this block is not judged as containing an edge. In this example, the other condition a $\leq$AH of Equation 3 is not used, but by defining the constant AH for Equation 3, character signals having an extremely high amplitude or blocks of high contrast whose image degradation is not easily noticeable can be excluded from edge detection.

Embodiment 4

Figure 35:
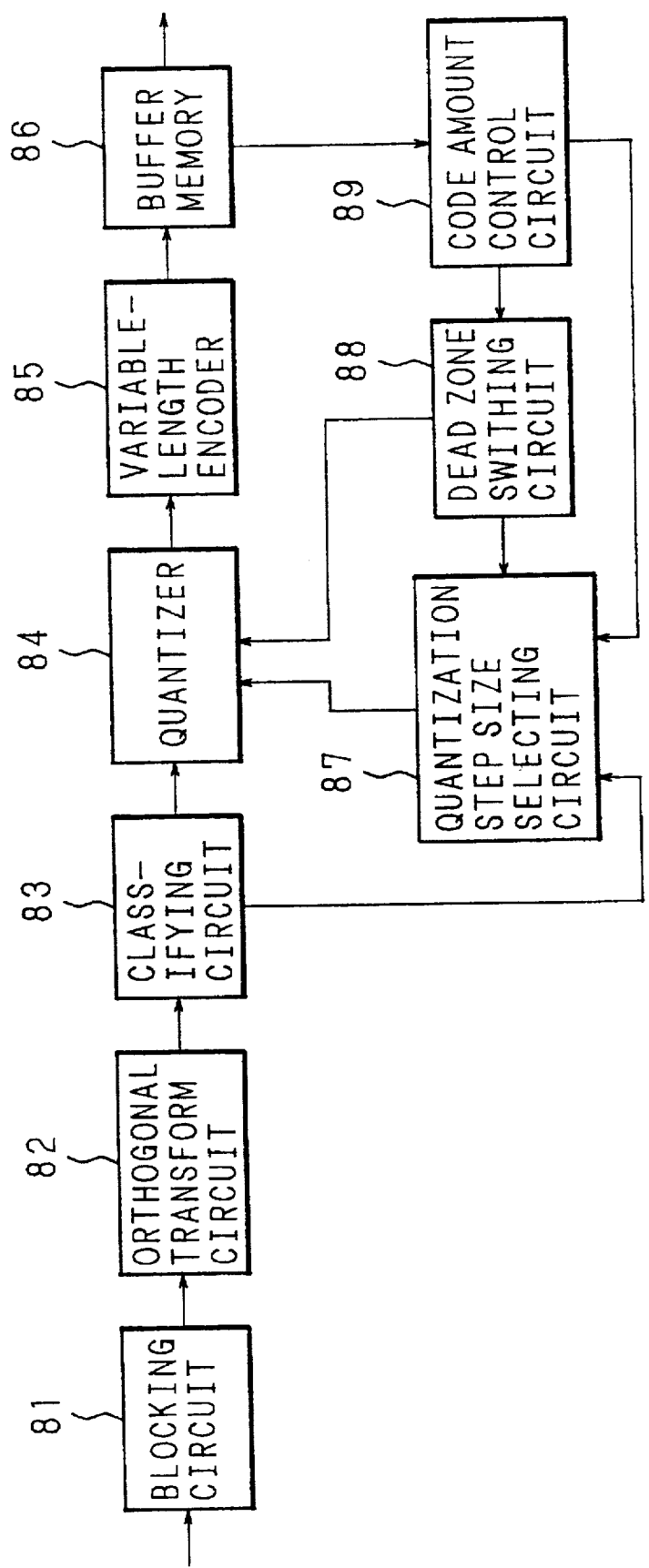
FIG. 35 is a block diagram showing the configuration of a high-efficiency encoding apparatus according to a fourth embodiment of the present invention.

FIG. 35 is a block diagram showing the configuration of a high-efficiency encoding apparatus according to a fourth embodiment of the present invention. In FIG. 35, the numeral 81 designates a blocking circuit for dividing a prescribed number of digital signals serially inputted to it into blocks. The blocking circuit 81 supplies the blocked data to an orthogonal transform circuit 82. The orthogonal transform circuit 82 performs an orthogonal transform, such as the DCT, on the input data, and supplies the resulting orthogonal-transformed coefficients to a classifying circuit 83. The classifying circuit 83 classifies each block based on the values of the orthogonal-transformed coefficients in the block, and supplies the classified orthogonal-transformed coefficients to a quantizer 84 and a quantization step size selecting circuit 87. The quantization step size selecting circuit 87 selects a quantization step size on the basis of class information from the classifying circuit 83, a control signal from a dead zone switching circuit 88, and a quantization step control signal from a code amount control circuit 89, and supplies the resulting selection signal to the quantizer 84. The quantizer 84 quantizes the orthogonal-transformed coefficients with the quantization step size based on the control signal from the dead zone switching circuit 88 and the selection signal from the quantization step size selecting circuit 87, and supplies the quantized orthogonal-transformed coefficients to a variable-length encoder 85. The variable-length encoder 85 variable-length encodes the quantized orthogonal-transformed coefficients, and supplies the encoded data to a buffer memory 86. The buffer memory 86 outputs the variable-length encoded data at a prescribed rate. The code amount control circuit 89 accepts the variable-length encoded data at its input and, to control the amount of data in the buffer memory 86 within a prescribed limit, supplies a quantization step control signal to the quantization step size selecting circuit 87 and a dead zone switching control signal to the dead zone switching circuit 88.

Figure 36A:
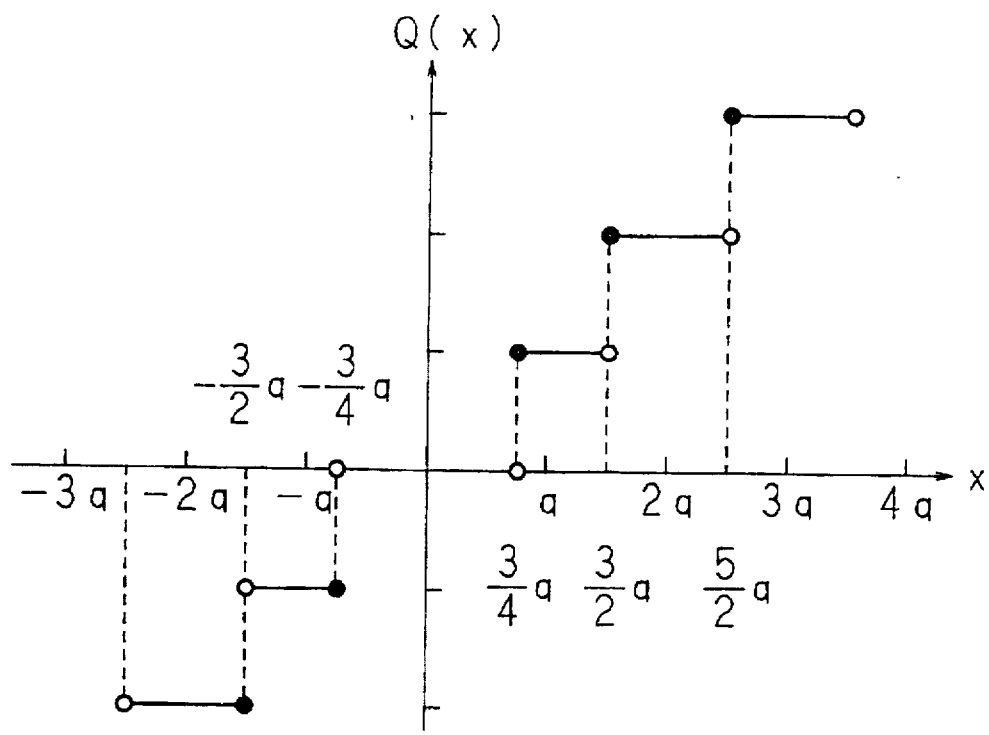
Figure 36B:
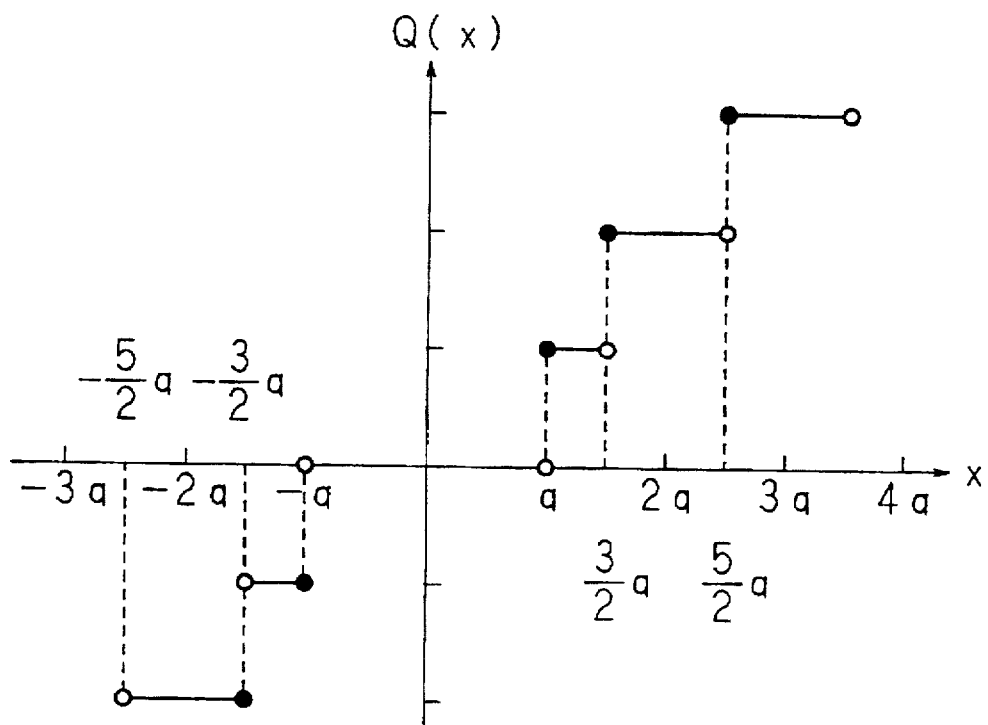

FIGS. 36A and 36B show two quantization step characteristics switchable in the quantizer 84, as defined by a function Q(x) with quantization step size q and center dead zone width p as parameters, where x is an inputted to the quantizer 84. In FIGS. 36A and 36B, the input value x is plotted along the abscissa, and the output value Q(x) along the ordinate; the filled circles in the figures include their associated points while the unfilled circles do not.

Figure 7:
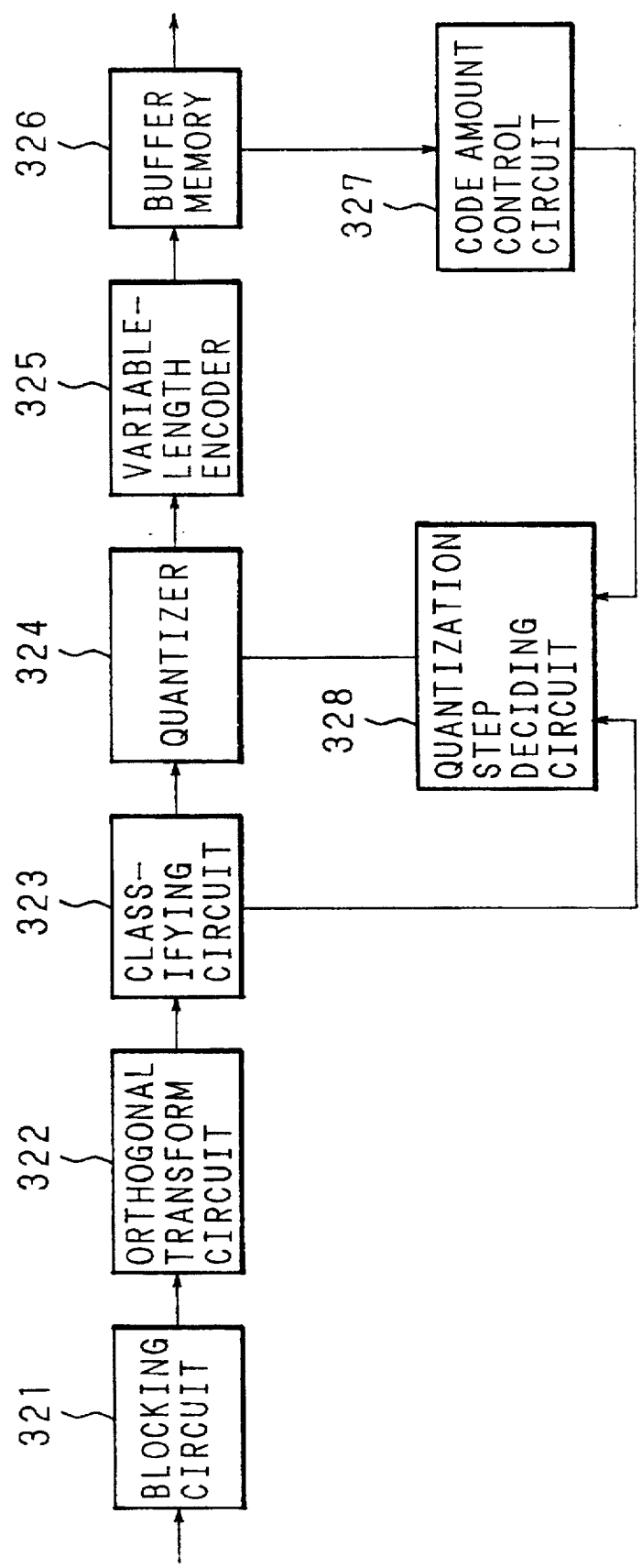
FIG. 7 is a block diagram showing the configuration of yet another prior art high-efficiency encoding apparatus.
Figure 9:
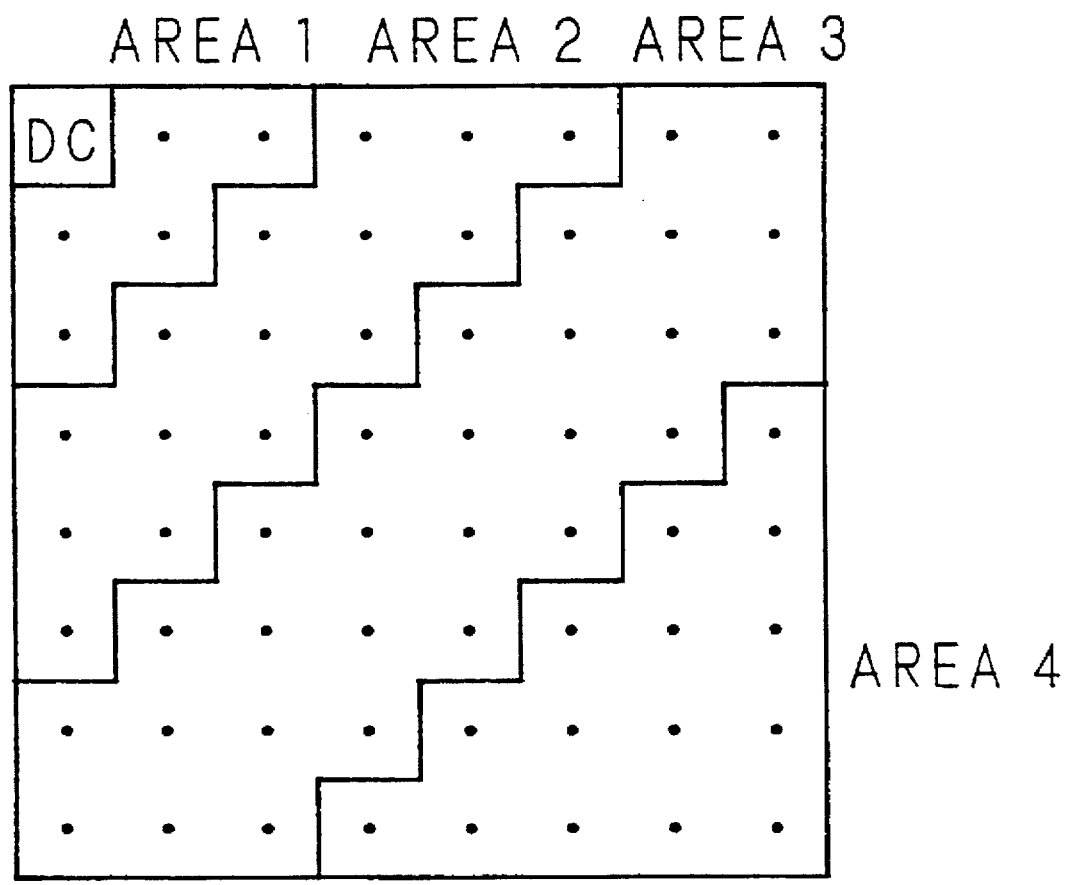
FIG. 9 is a diagram showing orthogonal-transformed coefficient areas for each of which the quantization step size in a quantizer in FIG. 7 is changed collectively.
Figure 11:
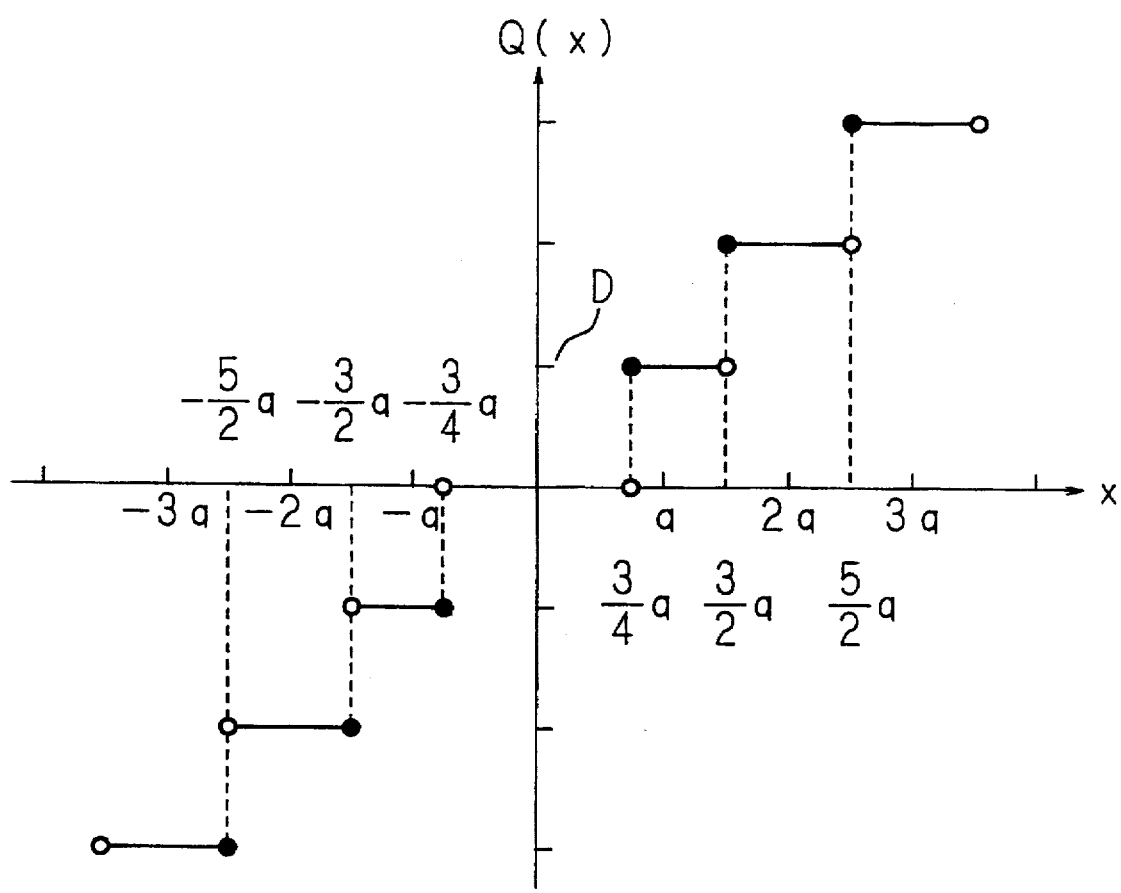
FIG. 11 is a diagram showing a quantization step characteristic of the quantizer shown in FIG. 7.

Next, the operation of the high-efficiency encoding apparatus of the fourth embodiment shown in FIG. 35 will be described. Digital video signal data are inputted to the blocking circuit 81 and divided into blocks of, for example, 8 pixels×8 lines=64 pixels. The blocks of data are supplied to the orthogonal transform circuit 82 one block at a time. In the orthogonal transform circuit 82, the inputted data is subjected, for example, to the DCT process to produce 64 transformed coefficients, which are supplied to the classifying circuit 83. As in the prior art example shown in FIG. 7, the classifying circuit 83 classifies the data according to the magnitude of the variance of the transformed coefficients; for example, a larger code amount is assigned to a block with larger variance and a smaller code amount to a block with smaller variance (see FIG. 8). Each block has a total of 64 transformed coefficients (see FIG. 9), of which the 63 AC coefficients, excluding the DC coefficient, are classified into four areas, area 1 to area 4, in order of increasing frequency, and quantization is performed with different quantization step sizes for different areas.

The transformed coefficients quantized in the quantizer 84 are fed into the variable-length encoder 85 where zero-run length coding is performed, followed by Huffman coding. The variable-length encoder 85 supplies the Huffman-coded data to the buffer memory 86. The buffer memory 86 in which the data are stored outputs the data at a prescribed rate. The code amount control circuit 89 determines the internal data amount from the write and read addresses in the buffer memory 86, and supplies a quantization step control signal to the quantization step size selecting circuit 87, and a dead zone switching control signal to the dead zone switching circuit 88, to control the data amount within a prescribed limit by increasing the quantization step size when the code amount is large, and reducing it when the code amount is small. The dead zone switching circuit 88 switches the quantization step characteristic in the quantizer 84, while the quantization step size selecting circuit 87 changes the quantization step size used in the quantizer 84.

We will now describe the feature of the fourth embodiment, i.e., how the quantization step size is decided based on the encoded data amount. When the data amount resulting from the encoding of the inputted video signal is larger than the control target value of the encoded data amount, the code amount control circuit 89 that has detected this outputs a dead zone switching control signal, in accordance with which the dead zone switching circuit 88 switches the quantization step characteristic of the quantizer 84. The quantizer 84 is currently set either for the quantization characteristic shown in FIG. 36A or for the quantization characteristic shown in FIG. 36B; when the current setting is for the characteristic shown in FIG. 36A, the quantizer 84 is switched to the characteristic shown in FIG. 36B. The only difference between FIGS. 36A and 36B is the dead zone width p. The code amount control circuit 89 supplies, at the same time, a quantization step control signal to the quantization step size selecting circuit 87 which, in response to this signal, increases the quantization step size q in the quantizer 84 by a factor of 2 only when the current setting is for the quantization step characteristic shown in FIG. 36B.

To reduce the data amount when the quantizer 84 is currently set for the quantization table shown in FIG. 13A and the quantization step characteristic shown in FIG. 36A, the quantization step characteristic for areas 1 and 3 is changed from the one shown in FIG. 38A to the one shown in FIG. 36B. As a result, since the dead zone width p is increased from (3/2)·q to 2·q, the number of data terms quantized to 0 increases, allowing a reduction in the data amount when variable-length encoded. To reduce the data amount when the currently selected quantization table is the one shown in FIG. 13A and the quantization step characteristic for areas 1 and 3 is the one shown in FIG. 38B, the quantization step characteristic is changed from the one shown in FIG. 36B to the one shown in FIG. 36A, and at the same time, the quantization table is changed to the one shown in FIG. 13B. In FIG. 13B, the quantization step size q is doubled for areas 1 and 3, compared to that shown in FIG. 13A. As the quantization step size q is doubled, the dead zone width p is also doubled. The dead zone width p is increased when reducing the code amount in the above sequence.

Figure 37A:
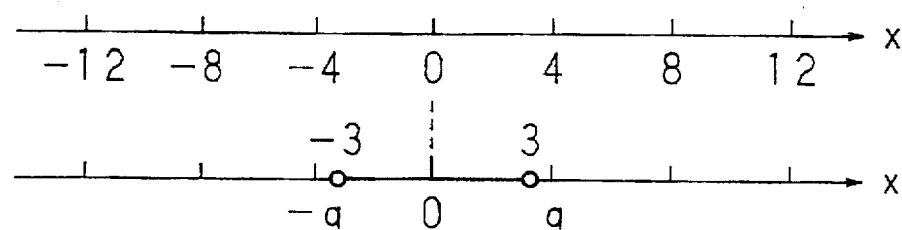
FIGS. 37A, 37B, 37C, and 37D are diagrams showing an example of center dead zone width switching in the quantization step characteristics of the quantizer shown in FIG. 35.
Figure 37B:
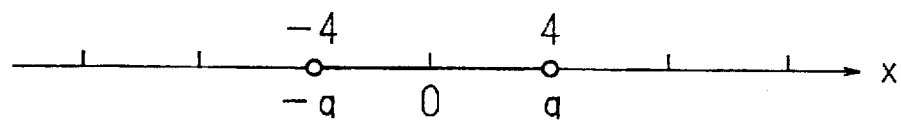
Figure 37C:
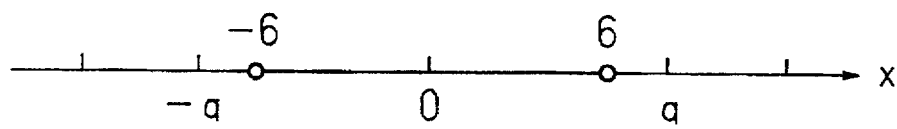

FIGS. 37A, 37B, 37C, and 37D show an example of dead zone width switching. In the quantization table of FIG. 13A, when the quantization step characteristic for area 3 is the one shown in FIG. 36A, the dead zone width is as shown in FIG. 37A since the quantization step size q is 4. Next, when the quantization step characteristic is changed to the one shown in FIG. 36B, the dead zone width is increased by a factor of 4/3, which is shown in FIG. 37B. Further, when the quantization step characteristic is changed to the one shown in FIG. 36A, and the quantization table to the one shown in FIG. 13B, to double the quantization step size q to 8, then the dead zone width is further increased by a factor of 3/2, which is shown in FIG. 37C.

Figure 37D:
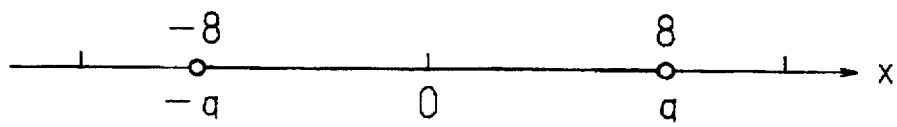

In the prior art, since the dead zone width p was changed in proportion to the quantization step size q, it was only possible to switch the width either between FIGS. 37A and 37C or between FIGS. 37B and 37D. In the fourth embodiment, on the other hand, the width can be switched in four ways. The dead zone width p determines the number of data terms quantized to 0, and the number of data terms quantized to 0 has a high degree of correlation with the amount of data resulting from variable-length encoding. Therefore, by controlling the dead zone width in small increments, meticulous control of the data amount can be accomplished.

Figure 38:
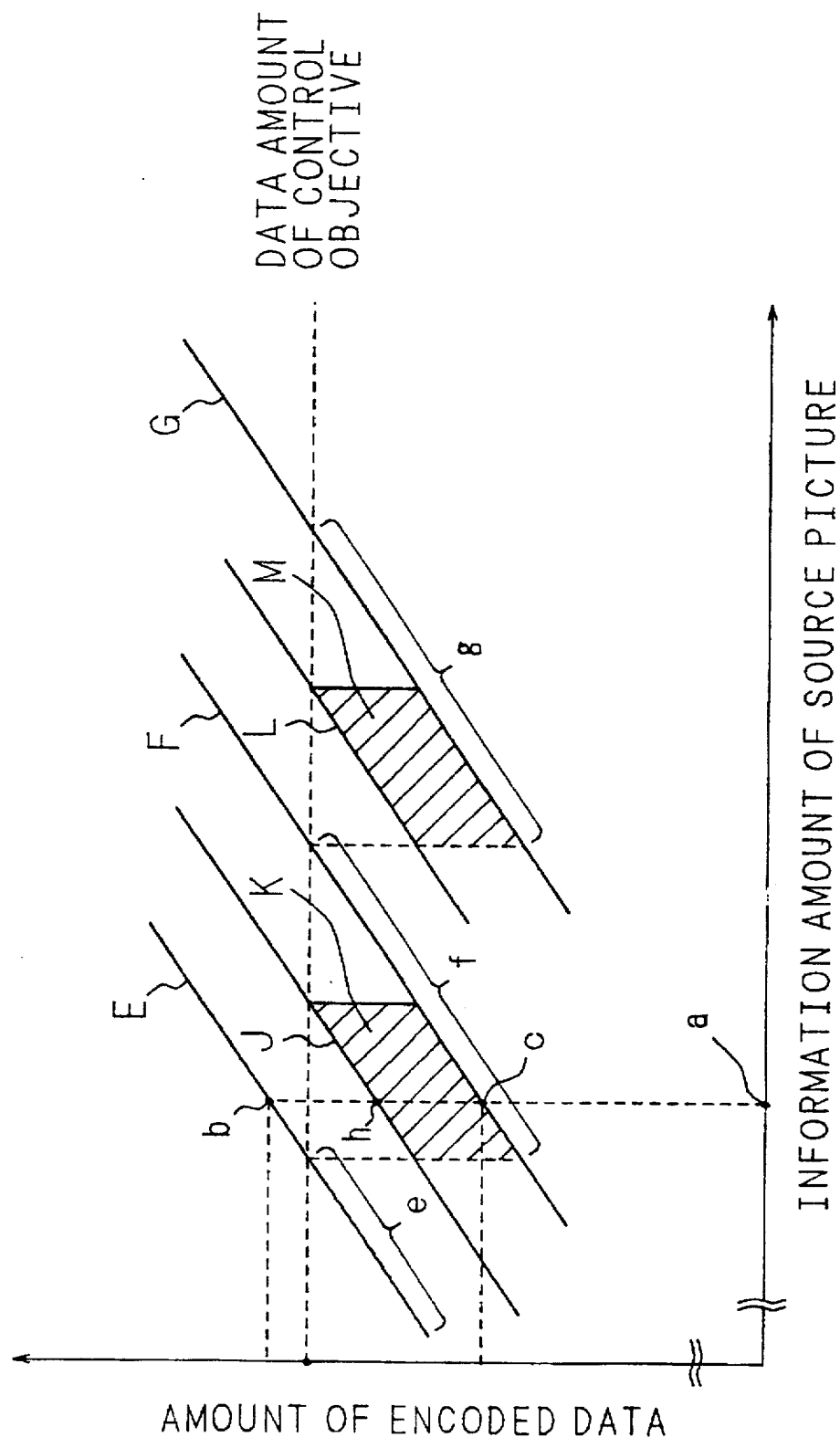
FIG. 38 is a diagram showing the relationship between the amount of data outputted from a variable-length encoder in FIG. 35 and the amount of information of an input video signal.

FIG. 38 shows the amount of encoded data generated by the variable-length encoder 85 in the apparatus of the fourth embodiment. The same reference signs as those used in FIG. 12 for the prior art designate the same parts. Consider a case where a block with the amount of information indicated at point a in FIG. 38 is encoded. When the quantization table used is the one shown in FIG. 13A, and the quantization step characteristic is the one shown in FIG. 36A, the resulting data will be at point b on line E. To reduce the data amount, the quantization step characteristic is changed to the one shown in FIG. 36B. Then, the resulting data amount is at point h on line J, falling within the control target value.

Figure 12:
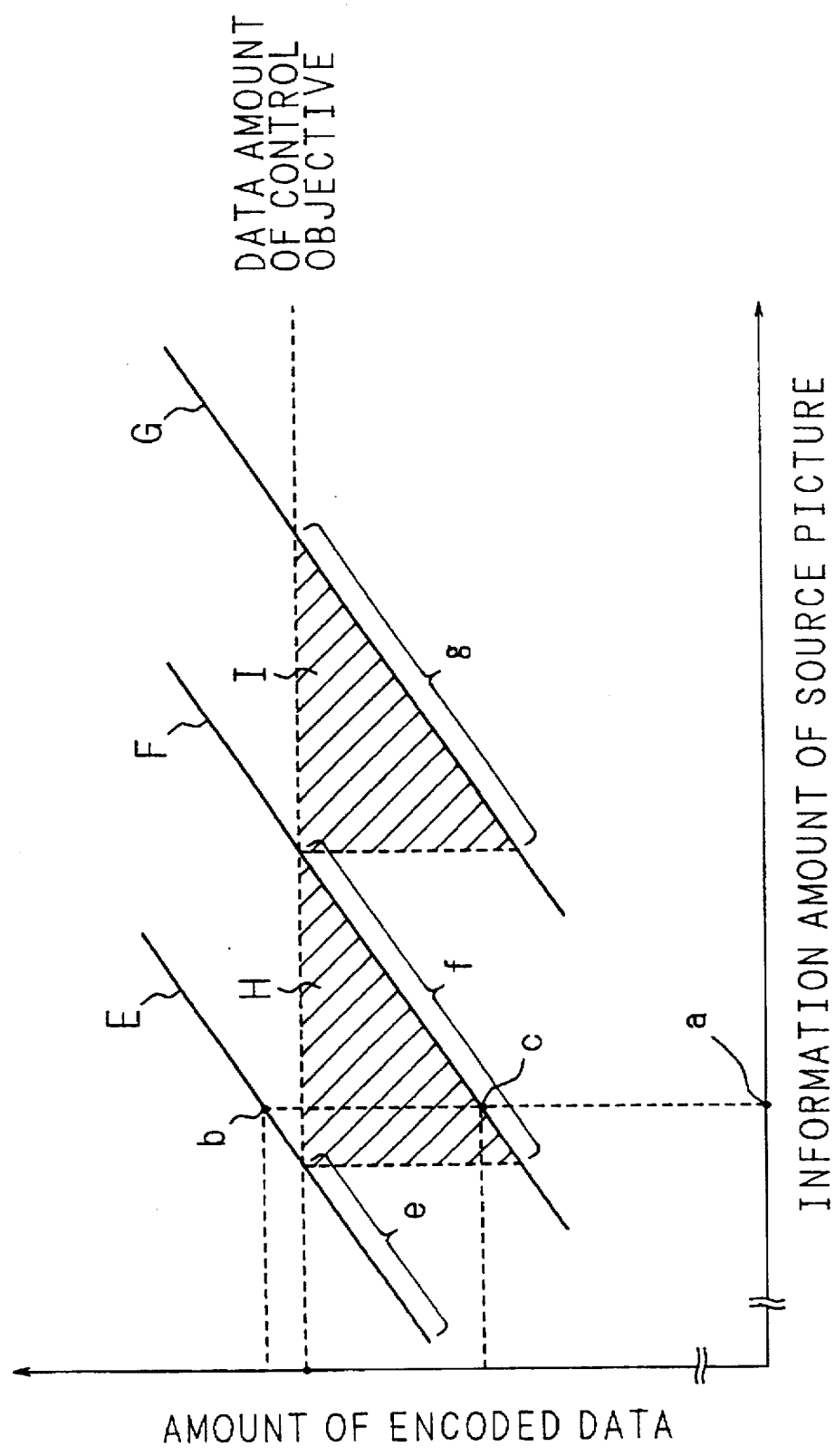
FIG. 12 is a diagram showing the relationship between the amount of data outputted from a variable-length encoder in FIG. 7 and the amount of information of an input video signal.
Figure 14:
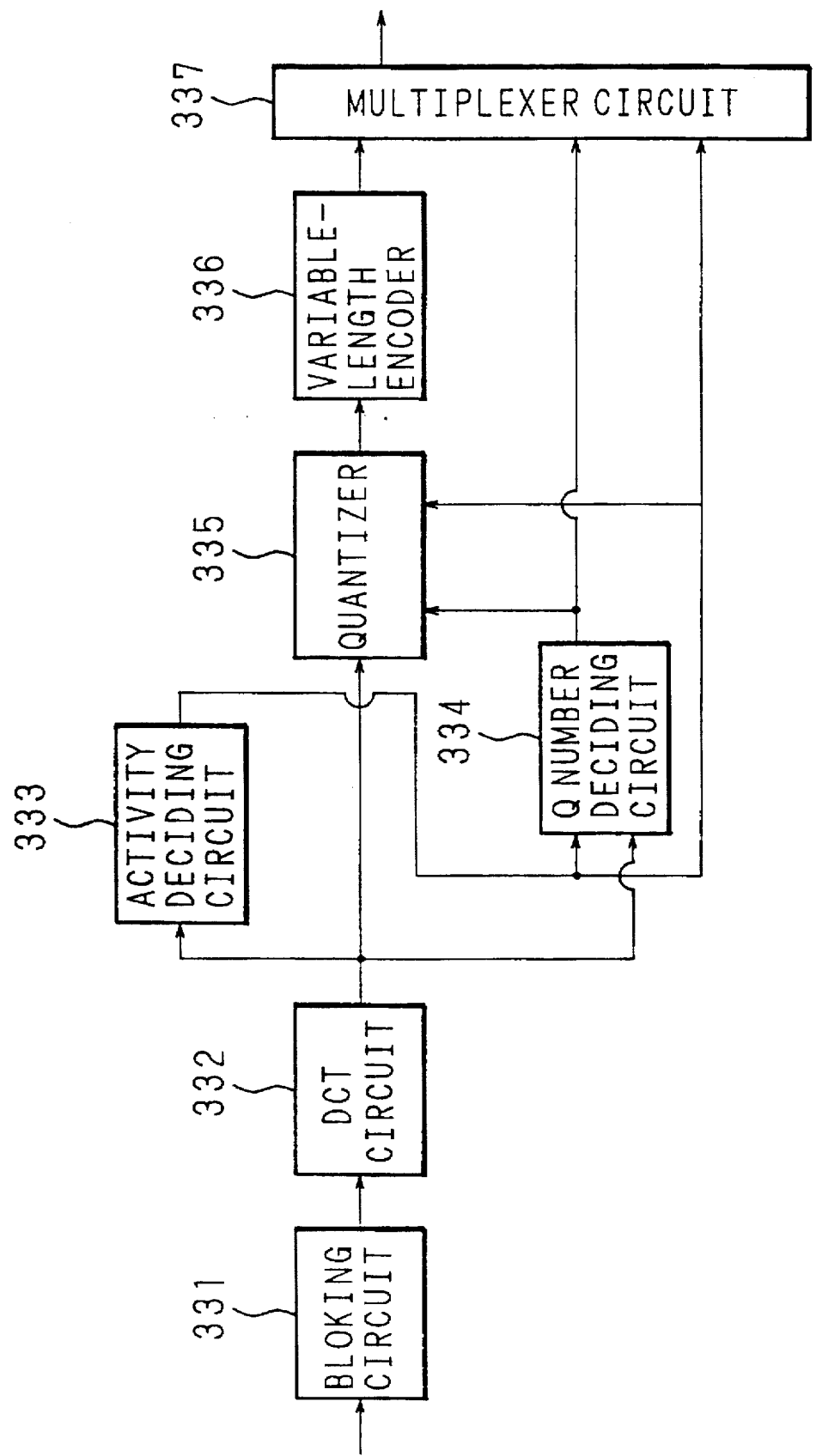
FIG. 14 is a block diagram showing the configuration of still another high-efficiency encoding apparatus according to the prior art.

Hatched regions K and M in FIG. 38 represent data amount regions in the regions H and I in FIG. 12 that could not be used effectively in the prior art. In the fourth embodiment, these regions K and M can be made effective use of for encoding. That is, in this embodiment, encoding can be performed using the data amount indicated at point h, instead of the data amount at point c in the prior art. By roughly centralizing the line J between the lines E and F, the amount of data that cannot be effectively used can be reduced by half when averaged over a number of blocks. The position of the line J is determined by the switching amount of the dead zone width p.

Embodiment 5

Figure 39:
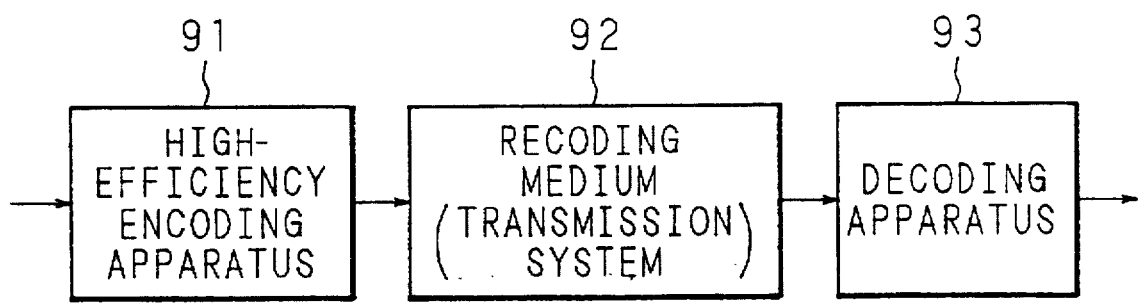
FIG. 39 is a block diagram showing the configuration of a high-efficiency encoding apparatus and decoding apparatus according to a fifth embodiment of the present invention.

FIG. 39 is a block diagram showing the general configuration of a high-efficiency encoding apparatus and decoding apparatus according to a fifth embodiment of the present invention. In FIG. 39, the numeral 91 represents the high-efficiency encoding apparatus shown in FIG. 35 in the fourth embodiment, 92 designates an encoded data recording medium (or a transmission system), and 93 indicates a decoding apparatus for decoding the encoded data into the original digital video signal.

Figure 40:
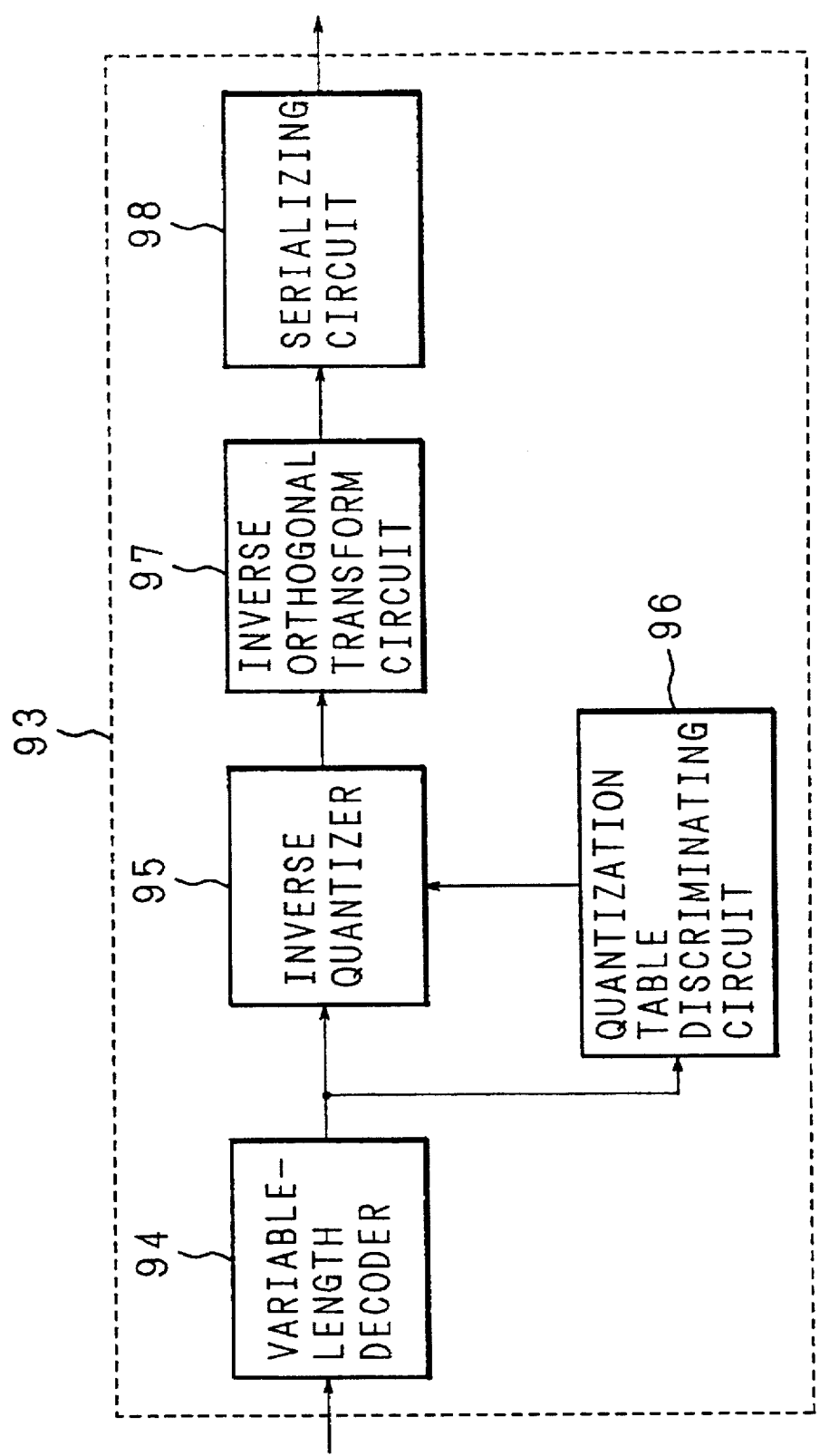
FIG. 40 is a block diagram showing the internal configuration of the decoding apparatus shown in FIG. 39.

FIG. 40 is a block diagram showing the internal configuration of the decoding apparatus 93 shown in FIG. 39. The decoding apparatus 93 has: a variable-length decoder 94 for decoding encoded data; an inverse quantizer 95 for inverse-quantizing input data; a quantization table discriminating circuit 96 for controlling the inverse-quantization step size in the inverse quantizer 92; an inverse orthogonal transform circuit 97 for performing an inverse orthogonal transform, such as inverse DCT, on input data; and a serializing circuit 98 for serializing inputted block data.

Next, the operation of the fifth embodiment will be described. In the high-efficiency encoding apparatus 91, the resulting code amount is controlled by adjusting the quantization step size q and dead zone width p in the internal quantizer, as described in the foregoing fourth embodiment. At this time, only an additional code indicating the quantization step size q is appended to the encoded data. The encoded data is inputted to the decoding apparatus 93 via the recording medium (or transmission system) 92. The variable-length decoder 94 decodes the input data, and the quantization table discriminating circuit 96 that has received the decoded data reads out the data indicating the quantization step size q, based on which the inverse quantization step size in the inverse quantizer 95 is controlled. The inverse-quantized data is inverse-orthogonal transformed by the inverse orthogonal transform circuit 97, whose output block data is serialized by the serializing circuit 98 to output the original video signal. In the above process, data that were encoded by the high-efficiency encoding apparatus 91 with the same quantization step size q but with different dead zone widths p are inverse-quantized by the inverse quantizer 95 using the same characteristic without discriminating the data from one another.

Embodiment 6

Figure 41:
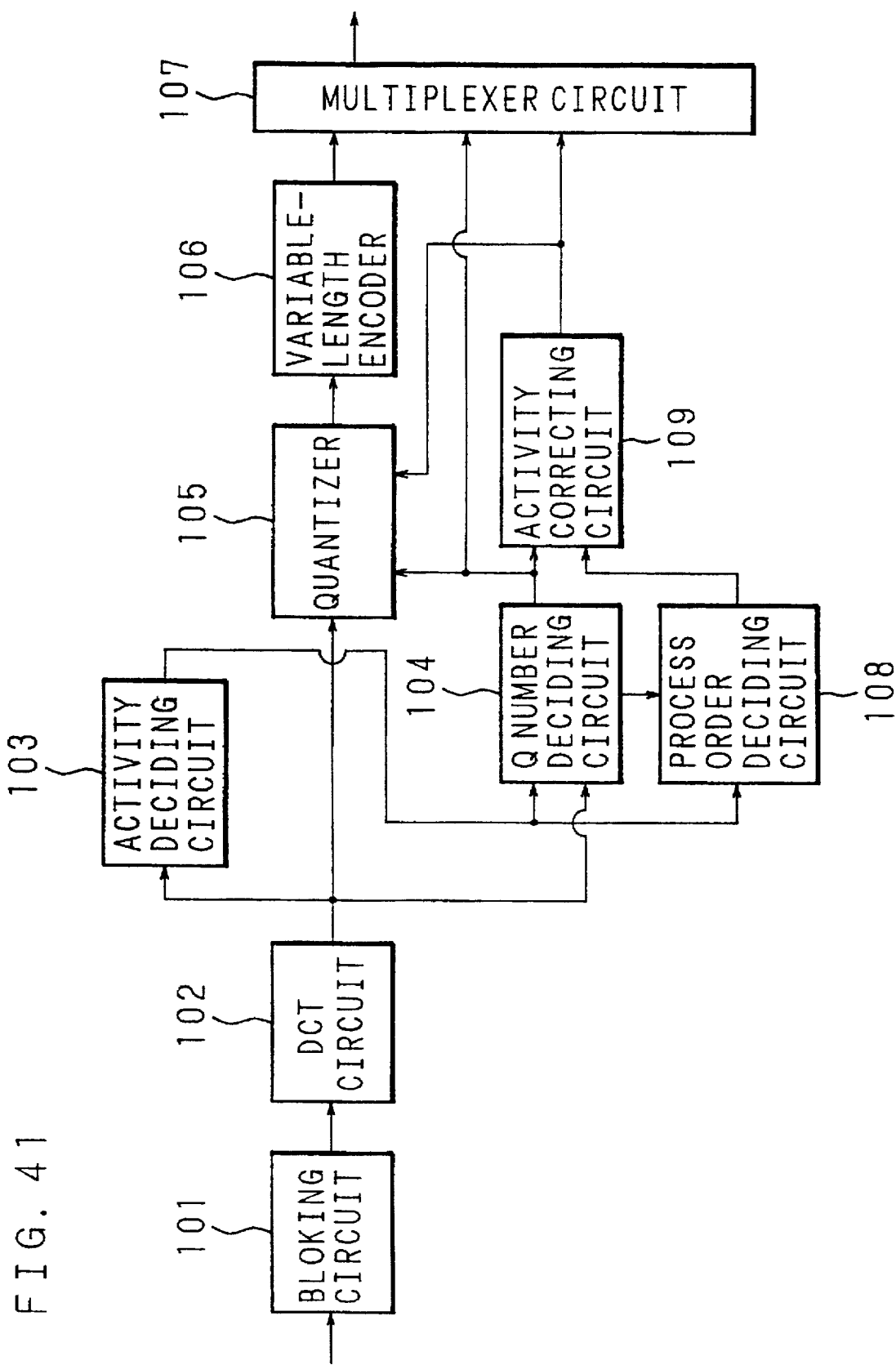
FIG. 41 is a block diagram showing the configuration of a high-efficiency encoding apparatus according to sixth and seventh embodiments of the present invention.

FIG. 41 is a block diagram showing the configuration of a high-efficiency encoding apparatus according to a sixth embodiment of the present invention. In FIG. 41, the numeral 101 designates a blocking circuit for dividing incoming digital video signals into blocks of pixels. The blocking circuit 101 supplies the block data to a DCT circuit 102. The DCT circuit 102 performs DCT on the block data, and supplies the resulting DCT coefficients to an activity deciding circuit 103, a Q number deciding circuit 104, and a quantizer 105. The activity deciding circuit 103 decides activity, a parameter relating to the compression ratio, for each block, and supplies the thus decided activity to the Q number deciding circuit 104 and also to a process order deciding circuit 108. The Q number deciding circuit 104 decides a Q number that provides the largest data amount within a predetermined value, and supplies the Q number to the quantizer 105, a multiplexer circuit 107, process order deciding circuit 108, and an activity correcting circuit 109. Based on the activity from the activity deciding circuit 103 and the Q number from the Q number deciding circuit 104, the process order deciding circuit 108 decides the order of activity correction, and supplies a signal indicating the order to the activity correcting circuit 109. The activity correcting circuit 109 corrects the activity in accordance with the Q number from the Q number deciding circuit 104 and the order of correction decided by the process order deciding circuit 108, and supplies the corrected activity to the quantizer 105 and the multiplexer circuit 107. The quantizer 105 quantizes the DCT coefficients fed from the DCT circuit 102, and supplies the result to a variable-length encoder 106. The variable-length encoder 106 variable-length encodes the quantized DCT coefficients, and supplies the encoded data to the multiplexer circuit 107. The outputs of the Q number deciding circuit 104, activity correcting circuit 109, and variable-length encoder 108 are multiplexed together in the multiplexer circuit 107 for output.

Figure 1:
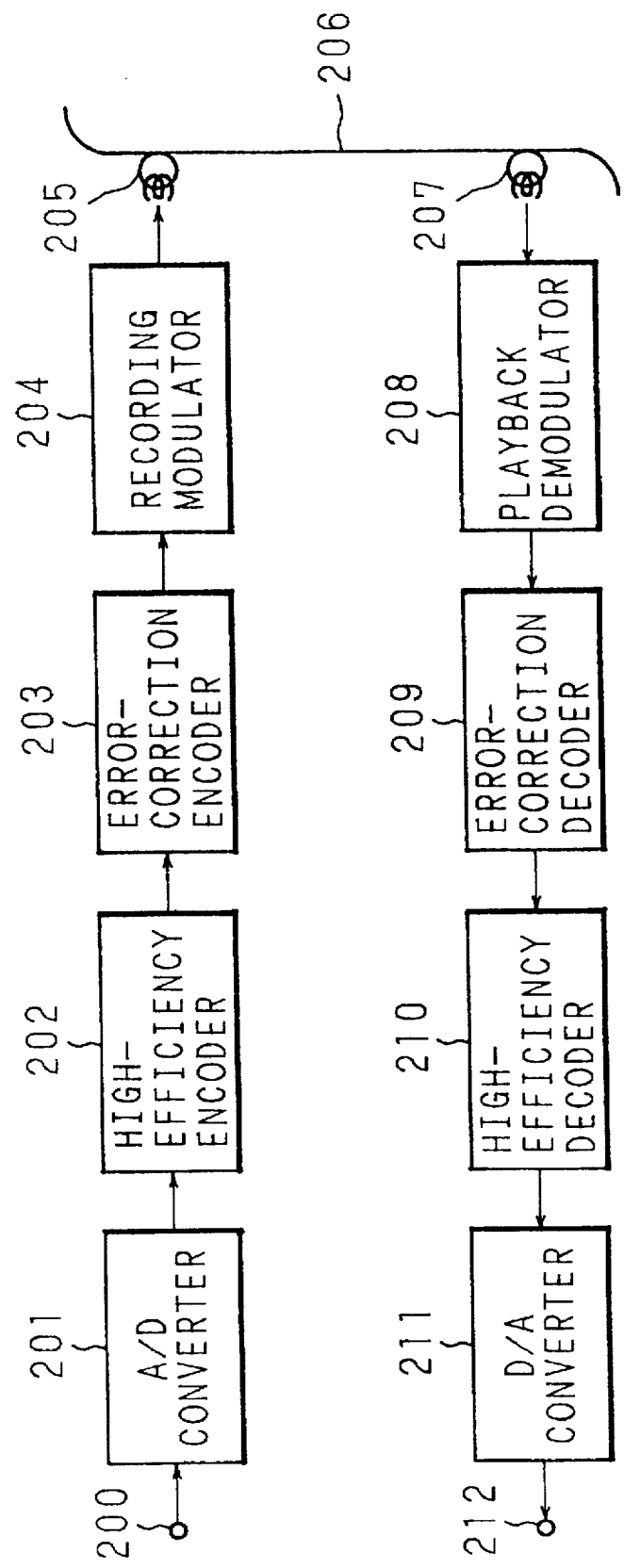
FIG. 1 is a block diagram showing the basic configuration of a consumer digital VTR.
Figure 2:
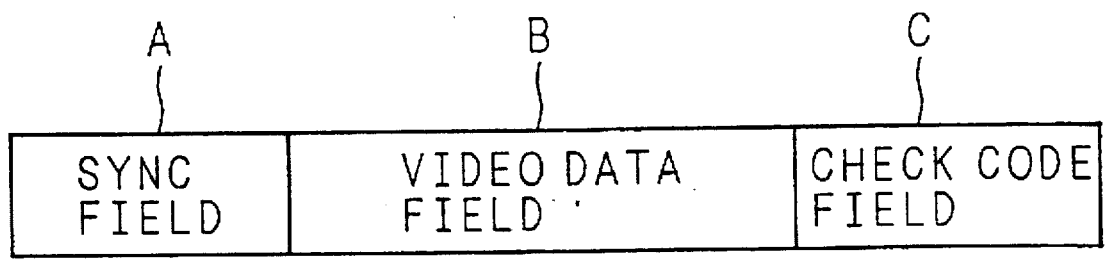
FIG. 2 is a diagram showing a sync block data format.
Figure 3:
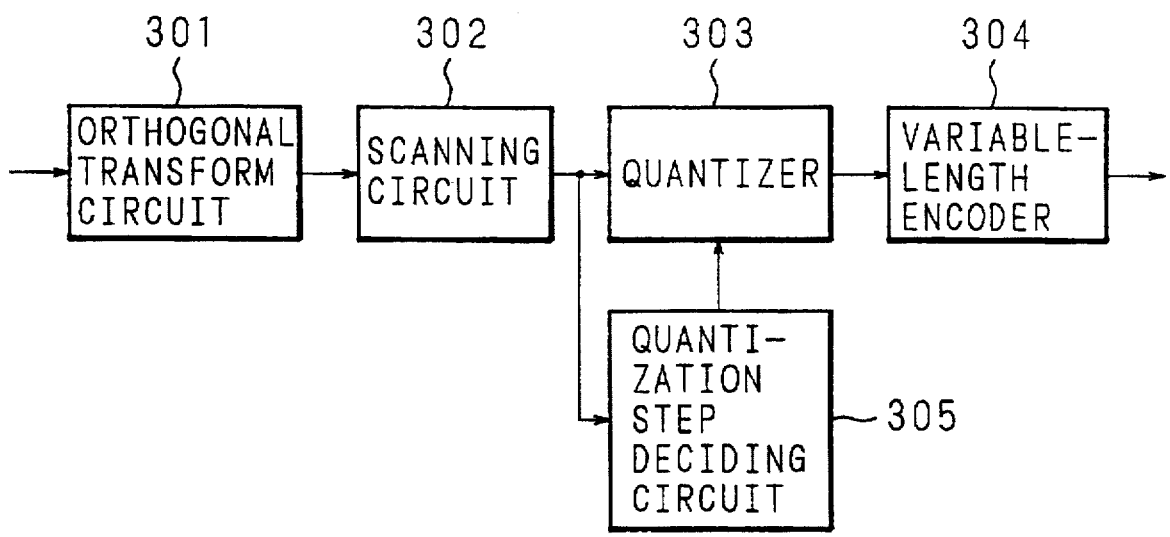
FIG. 3 is a block diagram showing the configuration of a prior art high-efficiency encoding apparatus.

Next, the operation of the high-efficiency encoding apparatus shown in FIG. 41 will be described. The digital signal inputted to the blocking circuit 101 is divided into blocks of a fixed size, and supplied to the DCT circuit 102. In the DCT circuit 102, each digital signal block outputted from the blocking circuit 101 is subjected to the DCT process. The DCT coefficients from the DCT circuit 102 are fed into the activity deciding circuit 103 where activity is decided for each block. For example, for larger activity a larger weight is assigned to the quantization step size. A plurality of DCT coefficient blocks are grouped together as a control unit and supplied to the Q number deciding circuit 104 along with the activity decided for each block. For each Q number, the Q number deciding circuit 104 calculates the data amount expected from the DCT coefficient blocks as the control unit, and decides the Q number that provides the largest total data amount within the size of the video data field B (FIG. 2). An example of the Q number and the quantization step size is shown in FIG. 16.

Using an evaluation equation to be described later, the process order deciding circuit 108 calculates an evaluation value from the Q number supplied from the Q number deciding circuit 104 and the activity for one control unit supplied from the activity deciding circuit 103 and, based on this evaluation value, decides the order in which he activity correcting circuit 109 corrects the activity. More specifically, the order is decided so that the activity is corrected in order of decreasing activity, i.e., the block of the highest compression ratio first. The activity correcting circuit 109 calculates the data amount expected from one control unit while correcting the activity block by block in the order decided by the process order deciding circuit 108, in such a manner as to reduce the compression ratio for the DCT coefficient blocks within the control unit, and compares the calculated amount with the size of the video data field B (FIG. 2).

If the calculated data amount is smaller than the size of the video data field B, the corrected activity is decided as the activity to be sent to the quantizer 108; when it is larger than that size, the activity before correction is decided as the activity to be sent to the quantizer 105. This processing is repeated until all the blocks within one control unit have been evaluated as to whether activity correction is possible or not, or until the calculated data amount becomes equal to the size of the video data field B. When the data amount becomes equal to the size of the video data field B before evaluation of all the blocks is complete, then for any subsequent block the activity calculated by the activity deciding circuit 103 is decided as the activity for that block.

The quantizer 105 performs quantization by obtaining a quantization factor from the activity supplied from the activity correcting circuit 109 and the Q number decided by the Q number deciding circuit 104. Using the quantization factor supplied from the quantizer 105, the variable-length encoder 106 performs variable length encoding such as Huffman coding. The variable-length encoded data from the variable length encoder 106, the activity from the activity correcting circuit 109, and the Q number from the Q number deciding circuit 104 are multiplexed in the multiplexer circuit 107 for output.

In the above example, the data amount is controlled by treating a plurality of blocks as a control unit, but it will be appreciated that the above-described method is also applicable for cases where data amount control is performed by combining a plurality of blocks into a subgroup and treating a plurality of such subgroups as a control unit. In such cases, the Q number may be different between subgroups due to data amount control. If such cases, therefore, an evaluation value is calculated using a certain evaluation equation, from the activity and Q number, and the order of activity correction is decided on the basis of the evaluation value. As an evaluation equation for the data amount control performed on a large group basis, Equation 6 below can be considered.

$$\text{Evaluation value} = (Q \text{ number}) - (2 \times \text{Activity}) \quad \text{(Equation 6)}$$

In this example, when the compression ratio is high, that is, when the Q number is small or the activity is large, the evaluation value calculated from the above equation is small; therefore, when correcting activity for blocks in order of decreasing compression ratio, the blocks are ordered so that the activity is corrected in order of increasing evaluation value. Equation 6 was given as an example of the evaluation equation, but any other appropriate equation may be used as the evaluation equation.

Embodiment 7

A seventh embodiment of the present invention will be described below. The configuration of the high-efficiency encoding apparatus of the seventh embodiment is the same as that of the foregoing sixth embodiment (FIG. 41).

The operation of the high-efficiency encoding apparatus of the seventh embodiment will be described below. The digital signal inputted to the blocking circuit 101 is divided into blocks of a fixed size, and supplied to the DCT circuit 102. In the DCT circuit 102, each digital signal block outputted from the blocking circuit 101 is subjected to the DCT process. The DCT coefficients from the DCT circuit 102 are fed into the activity deciding circuit 103 where activity is decided for each block. A plurality of DCT coefficient blocks are grouped together as a control unit and supplied to the Q number deciding circuit 104 along with the activity decided for each block. For each number, the Q number deciding circuit 104 calculates the data amount expected from the DCT coefficient blocks as the control unit, and decides the Q number that provides the largest total data amount within a target value that is chosen to be smaller by a prescribed value than the size of the video data field B.

Based on the activity for one control unit, the process order deciding circuit 108 decides the order in which the activity correcting circuit 109 corrects the activity. More specifically, the order is decided so that the activity is corrected in order of decreasing activity, i.e. the block of the highest compression ratio first. The activity correcting circuit 109 calculates the data amount expected from one control unit while correcting the activity block by block in the order decided by the process order deciding circuit 108, in such a manner as to reduce the compression ratio for the DCT coefficient blocks within the control unit, and compares the calculated amount with the size of the video data field B.

If the calculated data amount is smaller than the size of the video data field B, the corrected activity is decided as the activity to be sent to the quantizer 105; when it is larger than that size, the activity before correction is decided as the activity to be sent to the quantizer 105. This processing is repeated until the activity has been decided for all the blocks within one control unit, or until the calculated data amount becomes equal to the size of the video data field B. When the data amount becomes equal to the size of the video data field B before deciding the activity for all the blocks, then for any subsequent block the activity calculated by the activity deciding circuit 103 is decided as the activity for that block.

The quantizer 105 performs quantization by obtaining a quantization factor from the activity supplied from the activity correcting circuit 109 and the Q number decided by the Q number deciding circuit 104. Using the quantization factor supplied from the quantizer 105, the variable-length encoder 106 performs variable length encoding such as Huffman coding. The variable-length encoded data from the variable length encoder 106, the activity from the activity correcting circuit 109, and the Q number from the Q number deciding circuit 104 are multiplexed in the multiplexer circuit 107 for output.

In the above example, the data amount is controlled by treating a plurality of blocks as a control unit, but it will be appreciated that, as in the foregoing sixth embodiment, the above-described method is also applicable for cases where data amount control is performed by combining a plurality of blocks into a subgroup and treating a plurality of such subgroups as a control unit.

Embodiment 8

Figure 17:
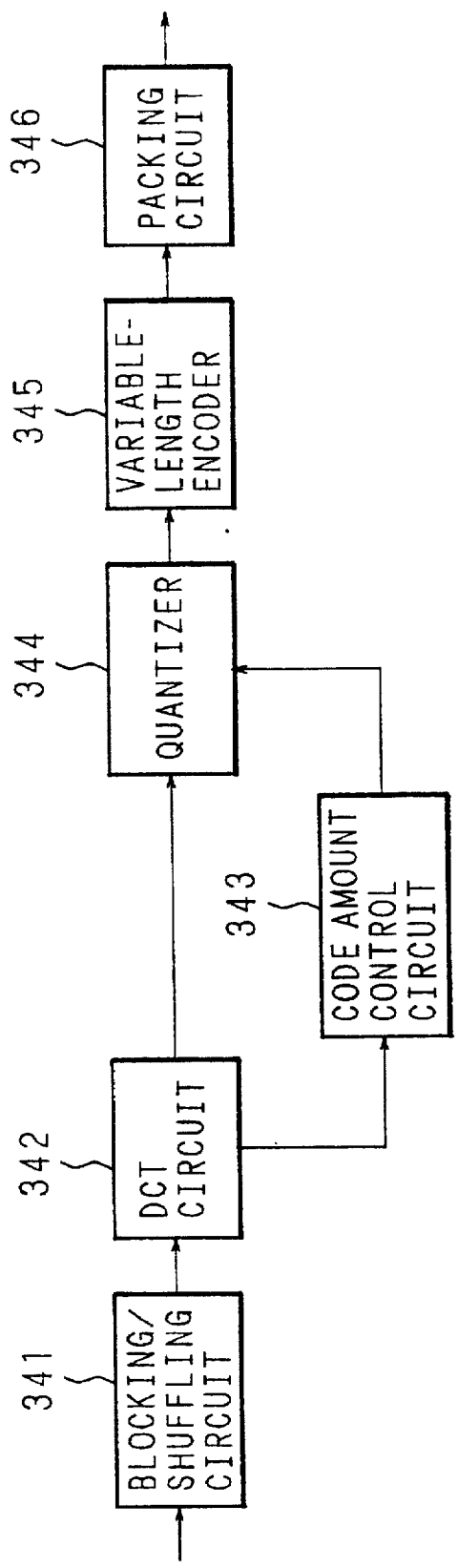
FIG. 17 is a block diagram showing the configuration of another high-efficiency encoding apparatus according to the prior art.
Figure 18:
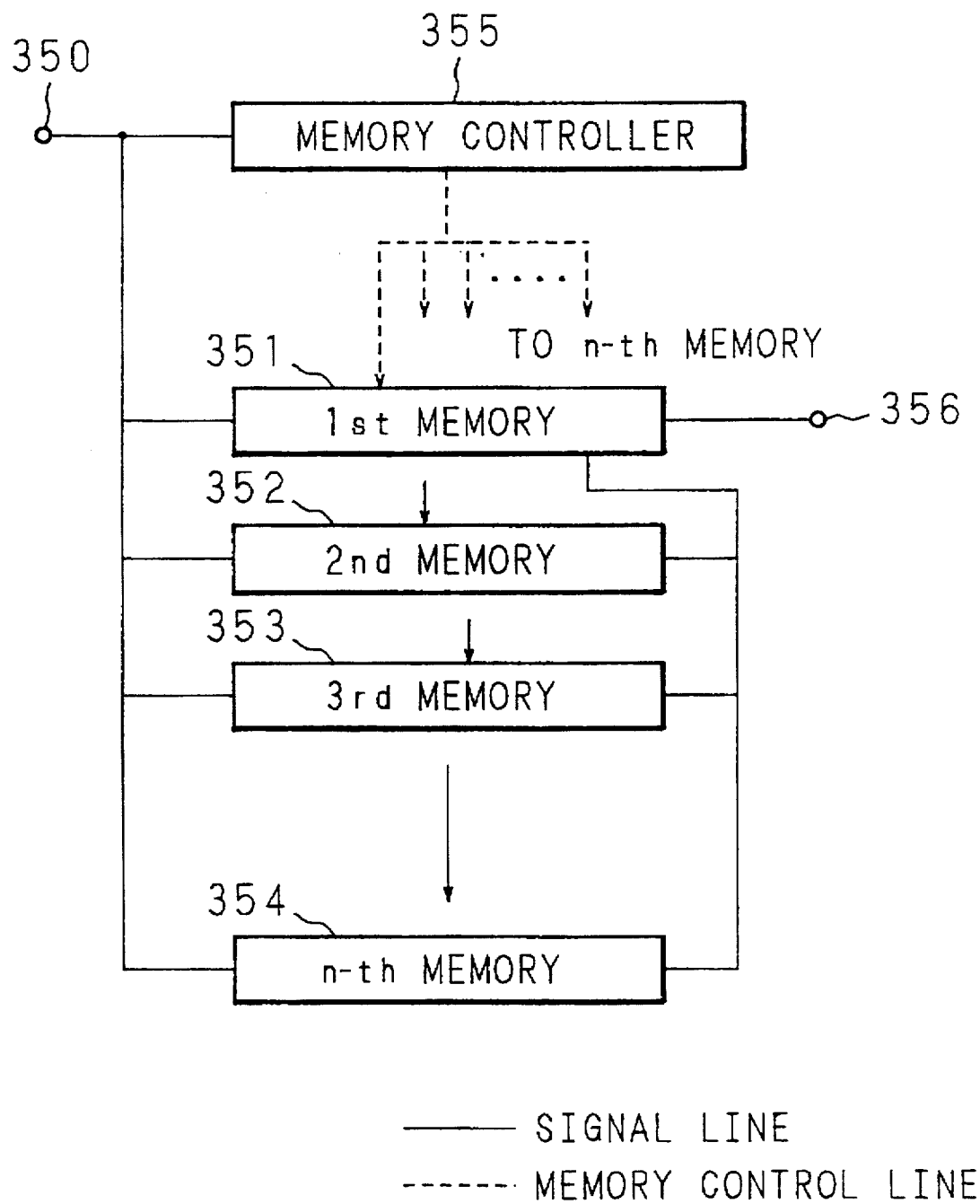
FIG. 18 is a diagram showing the internal configuration of a packing circuit.
Figure 19:
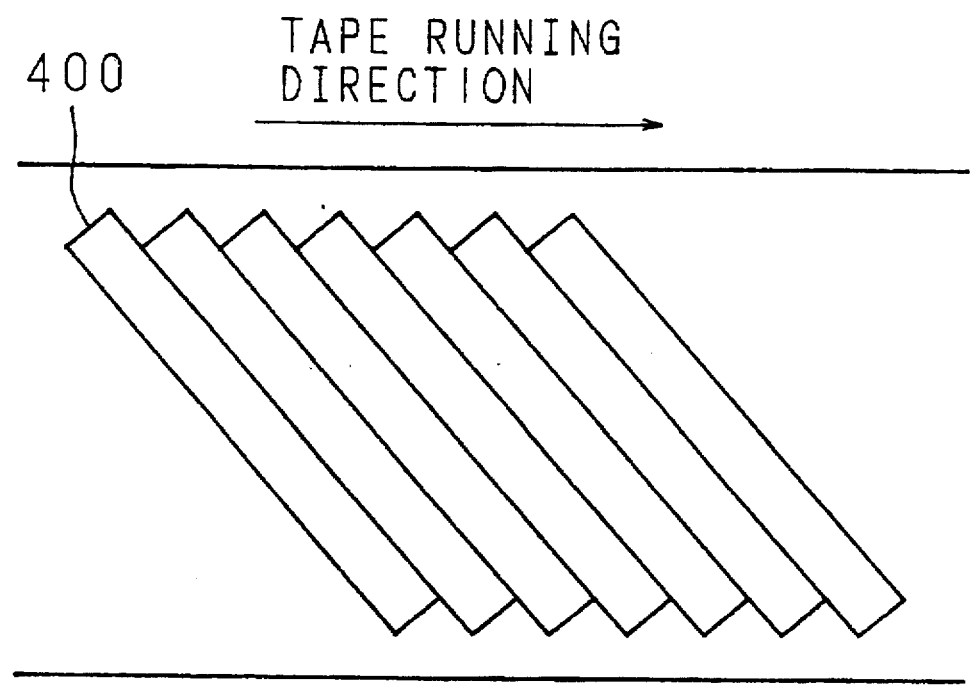
FIG. 19 is a schematic diagram showing a tape record format.
Figure 20:
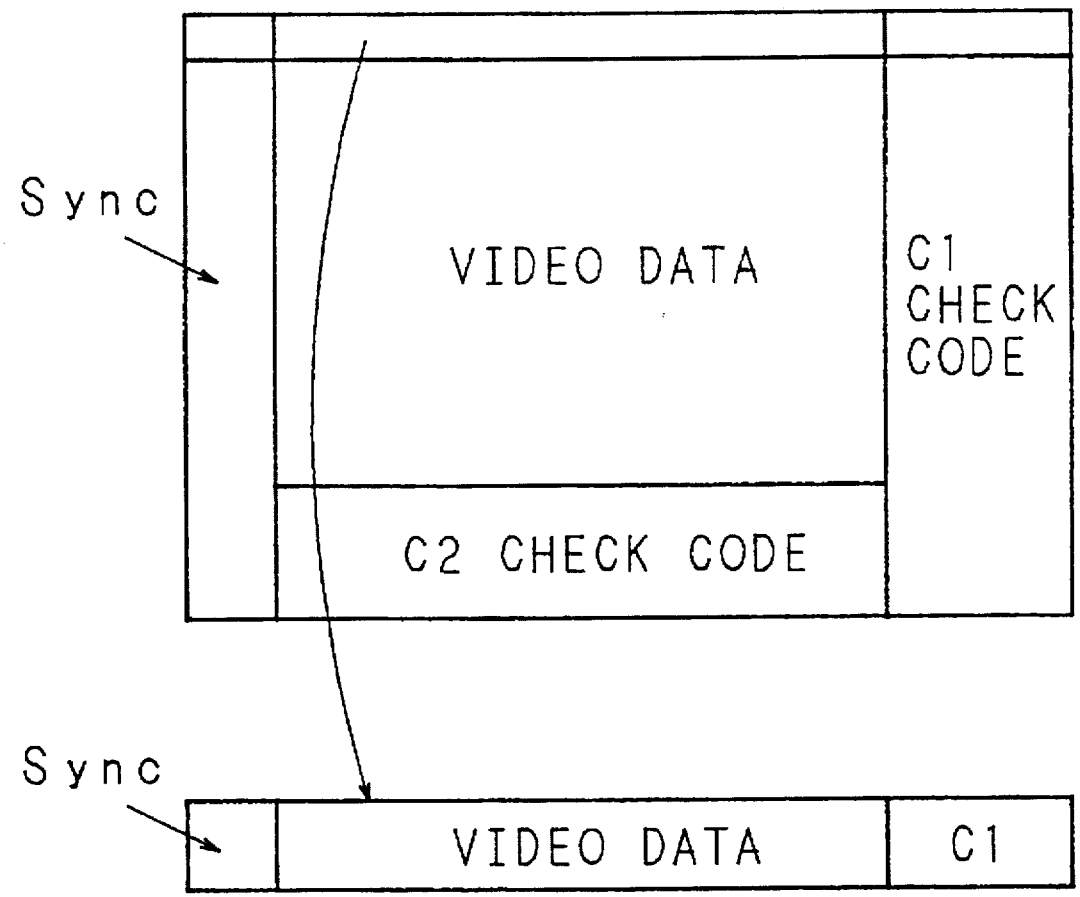
FIG. 20 is a schematic diagram showing a recording signal format.
Figure 42:
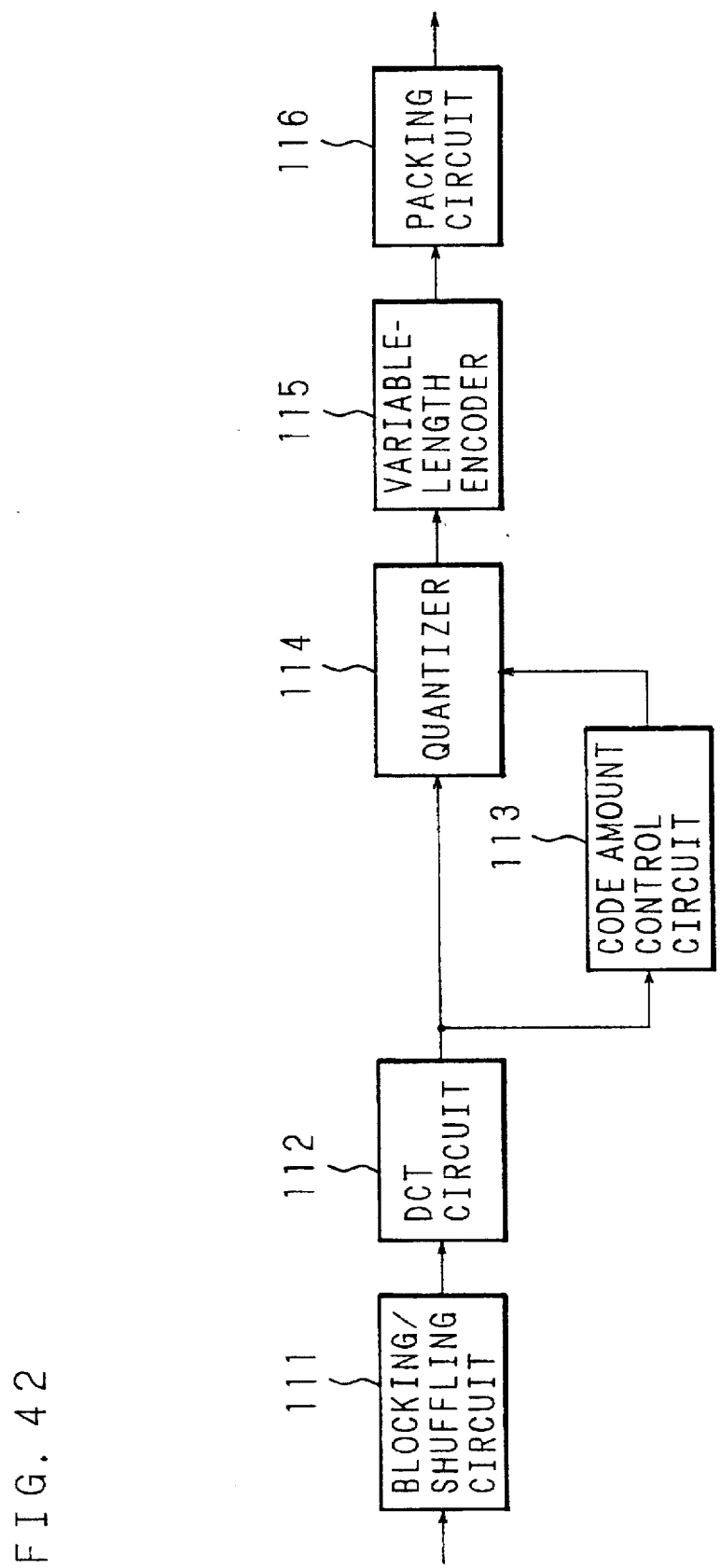
FIG. 42 is a block diagram showing the configuration of a high-efficiency encoding apparatus according to eighth and 11th embodiments of the present invention.

FIG. 42 is a block diagram showing the configuration of a high-efficiency encoding apparatus according to an eighth embodiment of the present invention. In FIG. 42, the numeral 111 designates a blocking/shuffling circuit for blocking and shuffling incoming digital video signals. The blocked data are supplied to a DCT circuit 112 which performs the DCT on each block and supplies the resulting DCT coefficients to a code amount control circuit 113 and a quantizer 114. The code amount control circuit 113 decides the quantization step size so that the code amount for one frame is kept within a prescribed limit, and the quantizer 114 quantizes the DCT coefficients with the quantization step size decided by the code amount control circuit 113. The quantized DCT coefficients outputted from the quantizer 114 are fed into a variable-length encoder 115 which encodes the coefficients with a variable-length code such as a Huffman code and supplies the encoded data to a packing circuit 116. The packing circuit 116 performs encoded-data packing on the encoded data supplied from the variable-length encoder 116, as will be described hereinafter. The above configuration is the same as the previously described prior art example (FIG. 17), and the internal configuration of the packing circuit 116 is the same as that of the prior art shown in FIG. 18.

Figure 43:
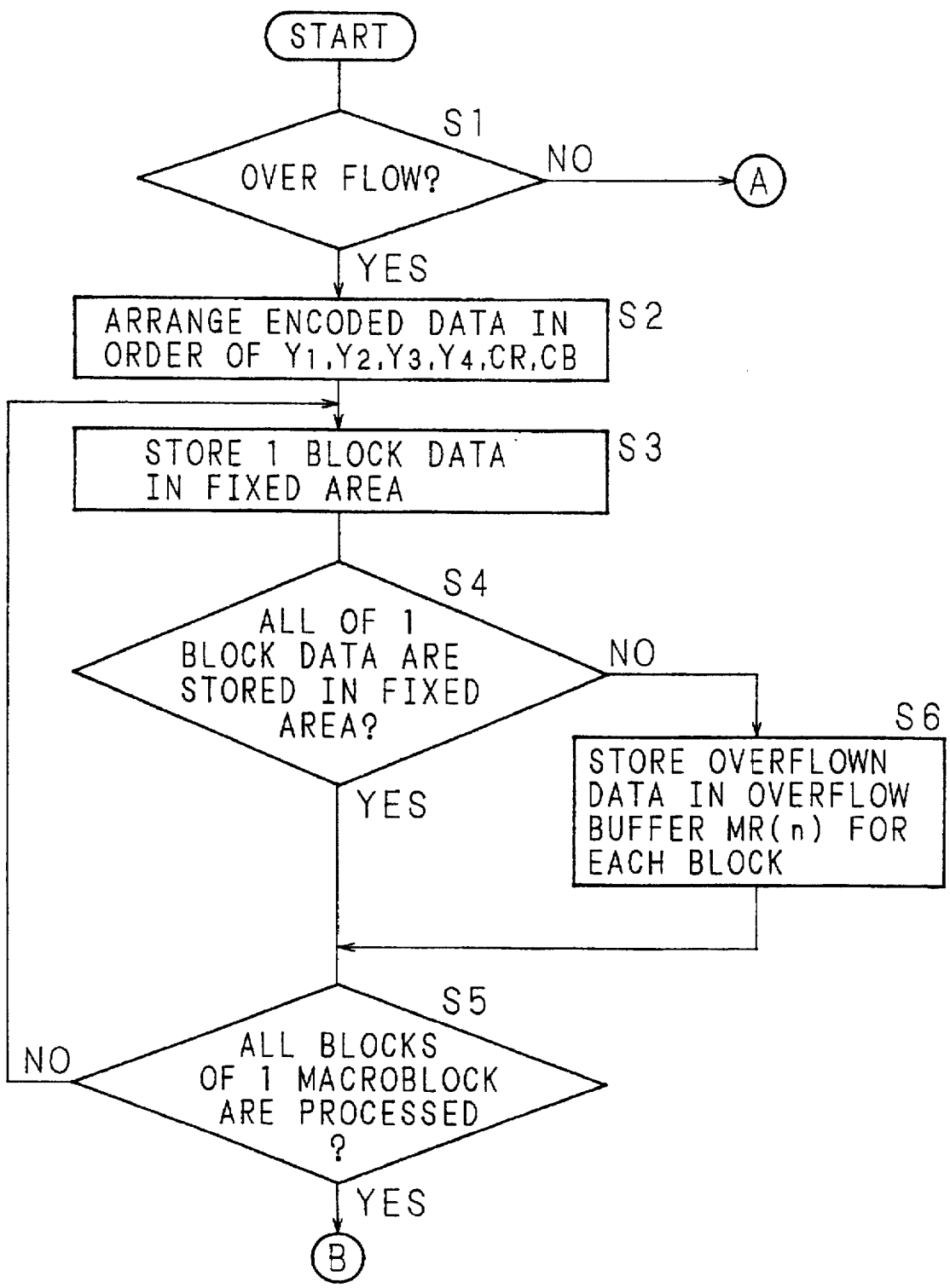
FIG. 43 is a flowchart illustrating a procedure for a packing method according to the eighth embodiment.
Figure 44:
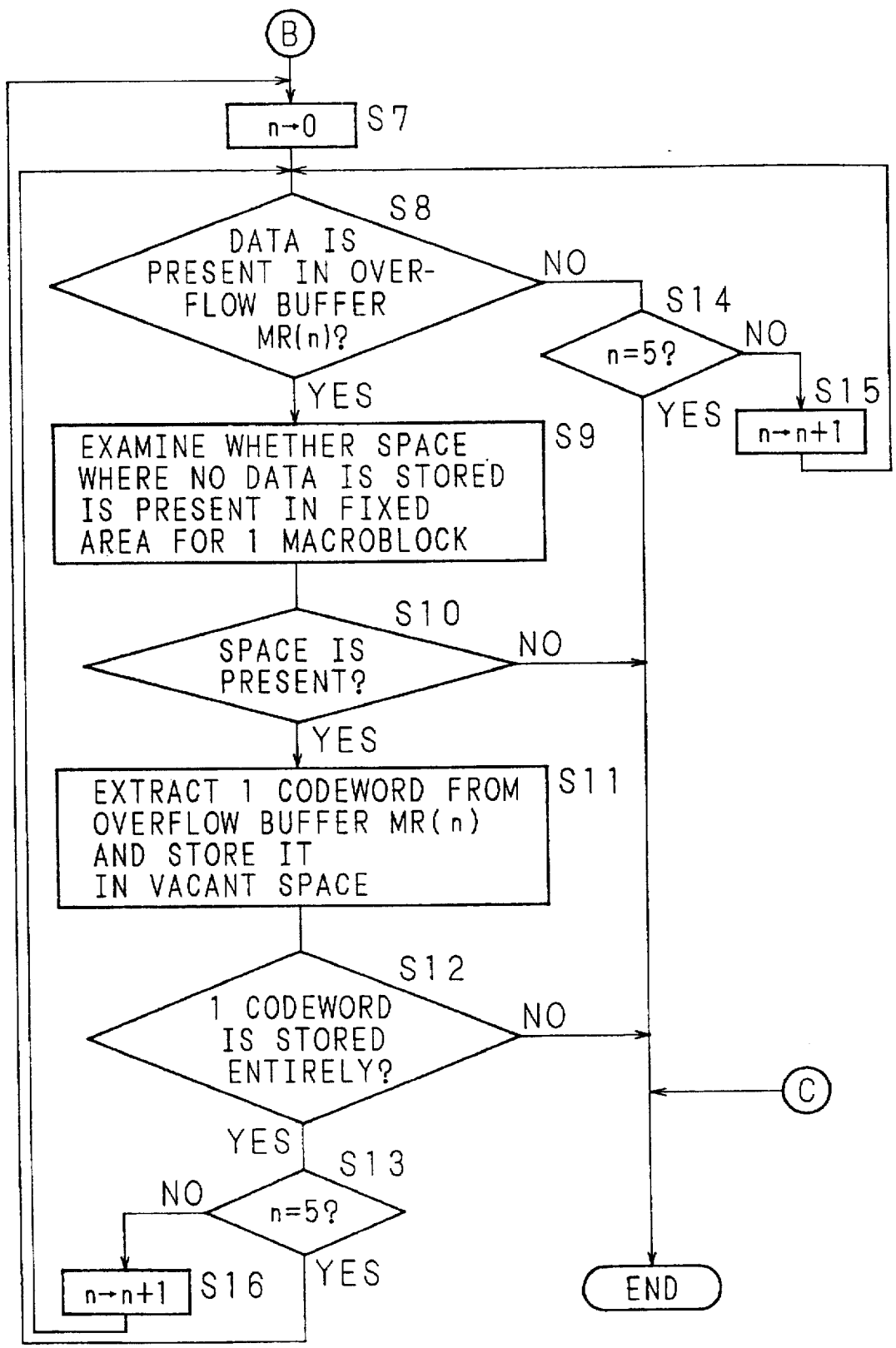
FIG. 44 is a flowchart illustrating a procedure for the packing method according to the eighth embodiment.
Figure 45:
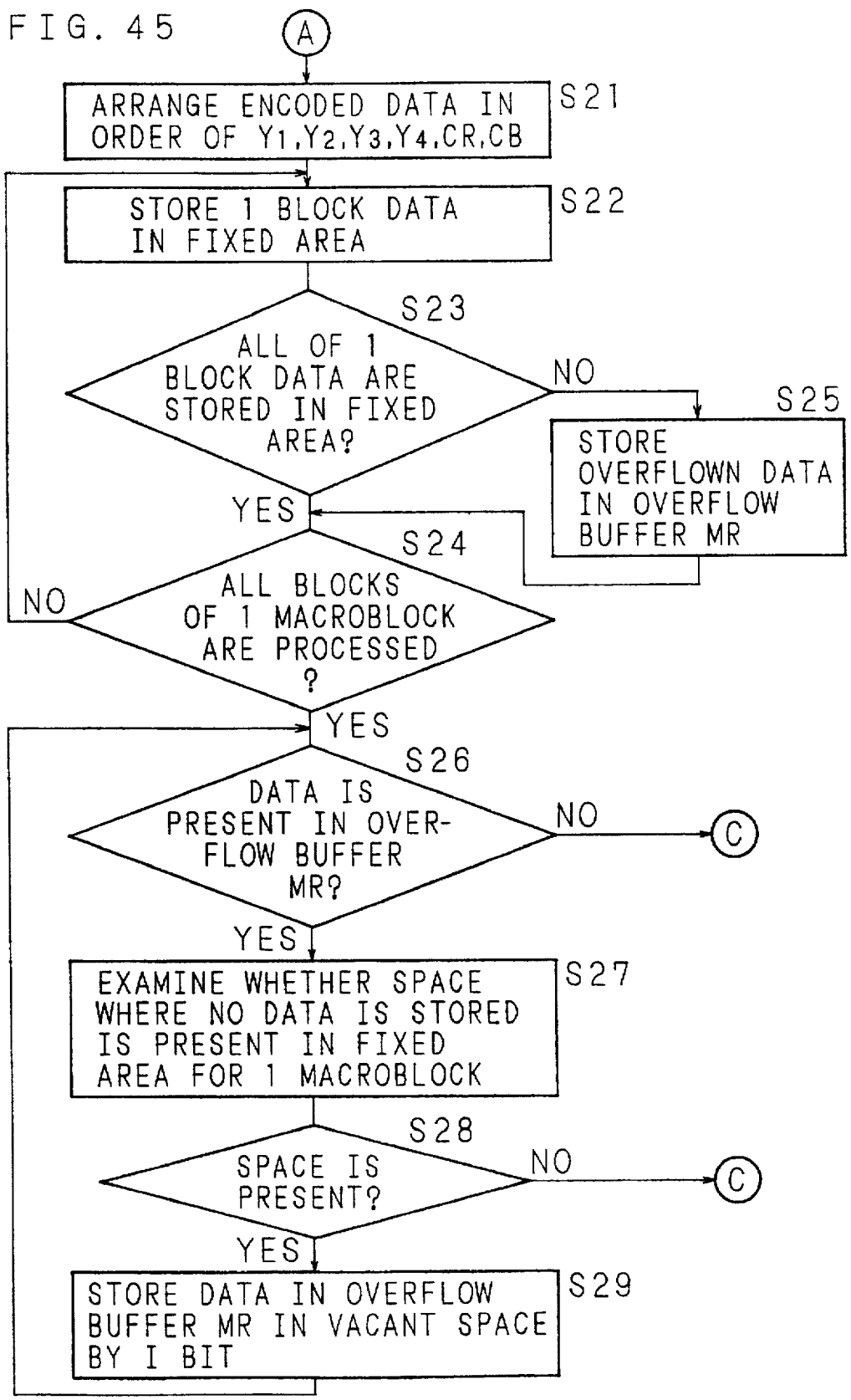
FIG. 45 is a flowchart illustrating part of a procedure for a packing method according to the eighth, ninth, and 10th embodiment.

Next, the operation of the high-efficiency encoding apparatus of the eighth embodiment will be described below. Since the basic operation of the apparatus of the eighth embodiment is the same as that of the prior art shown in FIG. 17, the following detailed description deals only with the packing method of the packing circuit 116 where the present embodiment is different from the prior art example. FIGS. 43, 44, and 45 show a flowchart illustrating the procedures for the packing method according to the eighth embodiment.

Figure 21:
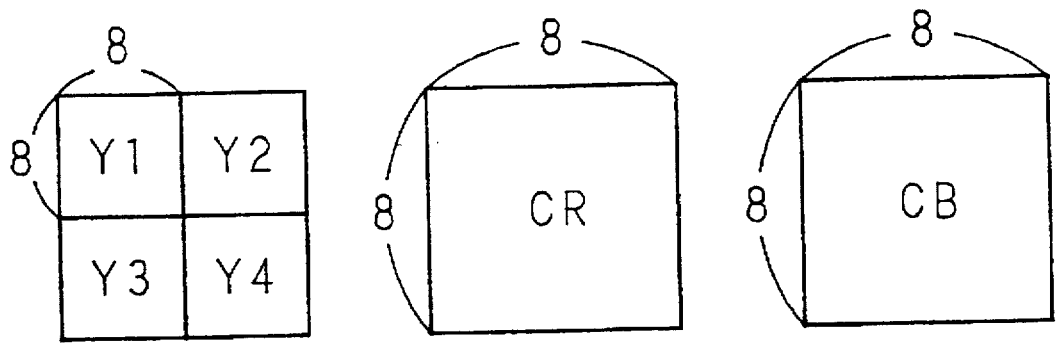
FIG. 21 is a schematic diagram showing a macro block format.

The macro block format shown in the previously given FIG. 21 is also used in this embodiment. First, quantization and variable-length encoding are performed on all the DCT blocks in one macro block, and the code amount in terms of the number of bits is calculated for the whole macro block. Then, it is determined whether the total number of bits is smaller or larger (overflow occurs) than the code amount assigned to one macro block (the sum of the code amounts assigned to the respective DCT blocks) (step S1). If no overflow occurs, the process branches to step S21 in FIG. 45, where the encoded data are arranged in the order of the luminance signal Y1, Y2, Y3, Y4, and color-difference signals CR and CB. After that, the encoded data representing the DCT blocks of the respective signals are stored in a fixed area in the above order (step S22). For each signal, it is determined whether all encoded data of one block have been stored in the fixed area (step S23): When all data have been stored, the process proceeds to step S24; if all data of one DCT block have not been able to be stored in the fixed area, overflown encoded data are stored in an overflow buffer MR in the above order (step S25), after which the process proceeds to step S24. Of the memories (see FIG. 18) forming the packing circuit 116 of FIG. 42, other memories than the first memory 351 are used as the overflow buffer MR here. In step S24, it is determined whether all the DCT blocks in one macro block have been processed: When the processing of all the blocks is complete, the process proceeds to step S26; if not complete yet, the process returns to step S22 to repeat the above processing on the encoded data of the next block.

In step S26, it is determined whether there is any encoded data stored in the overflow buffer MR: When no such data is stored, the process is terminated; if there is any data stored in it, the fixed area assigned to the whole macro block is checked starting from the top thereof to see if there is any space where no data is stored (step S27). Then, it is determined whether there is any such vacant space (step S28). When there is no such space, the process is terminated; if there is any such space, data held in the overflow buffer MR is written in that space (step S29), after which the process returns to step S28 to repeat the above processing.

On the other hand, when an overflow occurs within one macro block (YES in step S1), the process proceeds to step S2 in FIG. 43, where the encoded data are arranged in the order of the luminance signal Y1, Y2, Y3, Y4, and color-difference signals CR and CB. After that, the encoded data representing the DCT blocks of the respective signals are stored in the fixed area in the above order (step S3). For each signal, it is determined whether all encoded data of one block have been stored in the fixed area (step S4): When all data have been stored, the process proceeds to step S5; if all data of one DCT block have not been able to be stored in the fixed area, overflown encoded data are stored in the above order in respective overflow buffers MR(n) (n=0, . . . . 5) assigned to the respective DCT blocks (step S8), after which the process proceeds to step S5. The overflow buffers assigned to Y1, Y2, Y3, Y4, CR, and CB, are designated as MR(0), MR(1), MR(2), MR(3), MR(4), and MR(5), respectively. In step S5, it is determined whether all the DCT blocks in one macroblock have been processed: When the processing of all the blocks is complete, the process proceeds to step S7; if not complete yet, the process returns to step S3 to repeat the above processing on the encoded data of the next block.

In step S7, n is set to 0, and then, it is determined if there is any encoded data stored in the overflow buffer MR(n) (step S8). If no such data is stored, it is determined whether n=5 (step S14). When n=5, the process is terminated; otherwise, the value of n is incremented by 1 (step S15), and the process returns to step S8. On the other hand, when, in step S8, there is any encoded data stored in the buffer, the fixed area assigned to the whole macroblock is checked starting from the top thereof to see if there is any space where no data is stored (step S9). Then, it is determined whether there is any such vacant space (step S10). When there is no such space, the process is terminated; if there is any such space, one codeword is extracted from the overflow buffer MR(n) and stored in that space (step S11). Then, it is determined whether the extracted codeword has been stored in its entirety (step S12). When NO, the process is terminated; if YES, it is determined whether n=5 (step S13). When n=5, the process returns to step S7 to repeat the above processing; otherwise, the value of n is incremented by 1, and the process returns to step S8.

As described above, the overflow buffer is checked to see whether any encoded data is stored in it, and if any data is stored in it, the area assigned to one macro block is checked to see if there is any space where no data is stored; if there is any vacant space, all or part of one codeword data is extracted from the overflow buffer, and stored in the vacant space in the order of the luminance signal Y1, Y2, Y3, Y4, and color-difference signals CR and CB, and when the storing processing for the color-difference signal CB is complete, when there still remains vacant space, the processing returns to the luminance signal Y1 to repeat the same processing. The above processing is repeated as long as there remains vacant space.

Embodiment 9

Figure 46:
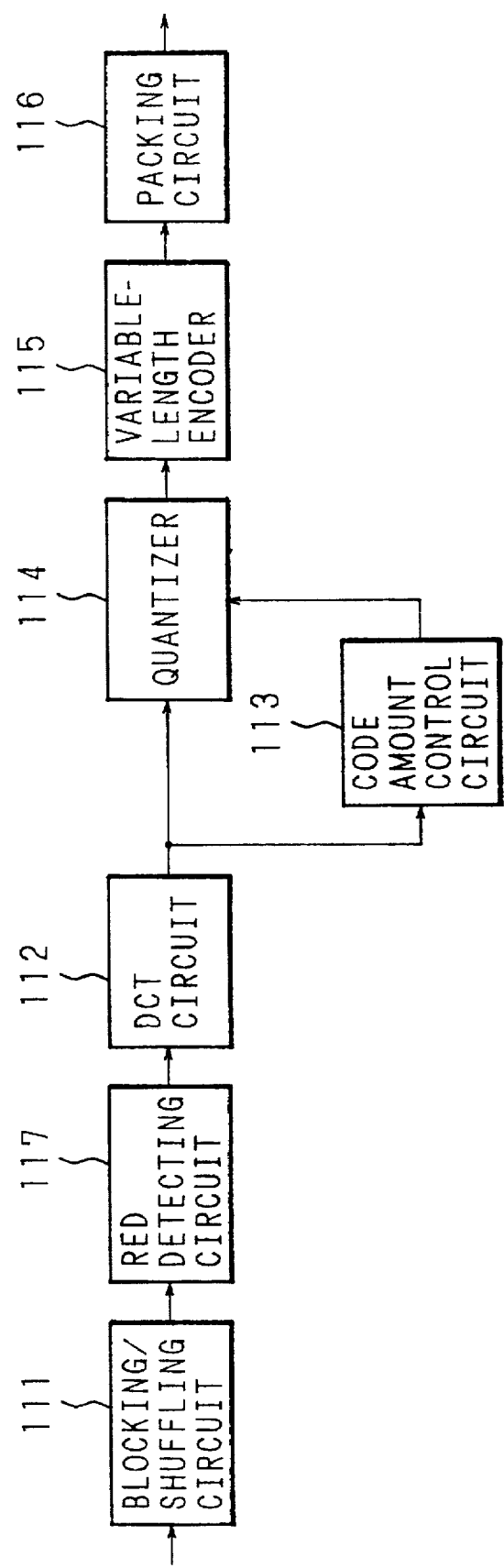
FIG. 46 is a block diagram showing the configuration of a high-efficiency encoding apparatus according to the ninth and 10th embodiments of the present invention.

FIG. 46 is a block diagram showing the configuration of a high-efficiency encoding apparatus according to a ninth embodiment of the present invention. In FIG. 46, the same parts as those shown in FIG. 42 are designated by the same reference numerals, and the description of such parts will not be repeated here. The numeral 117 indicates a red detecting circuit to which data on blocks of the color-difference signals CR and CB at the same position on the screen are inputted, and which detects whether any block contains a high degree of red component, and outputs the result of the detection.

Figure 47:
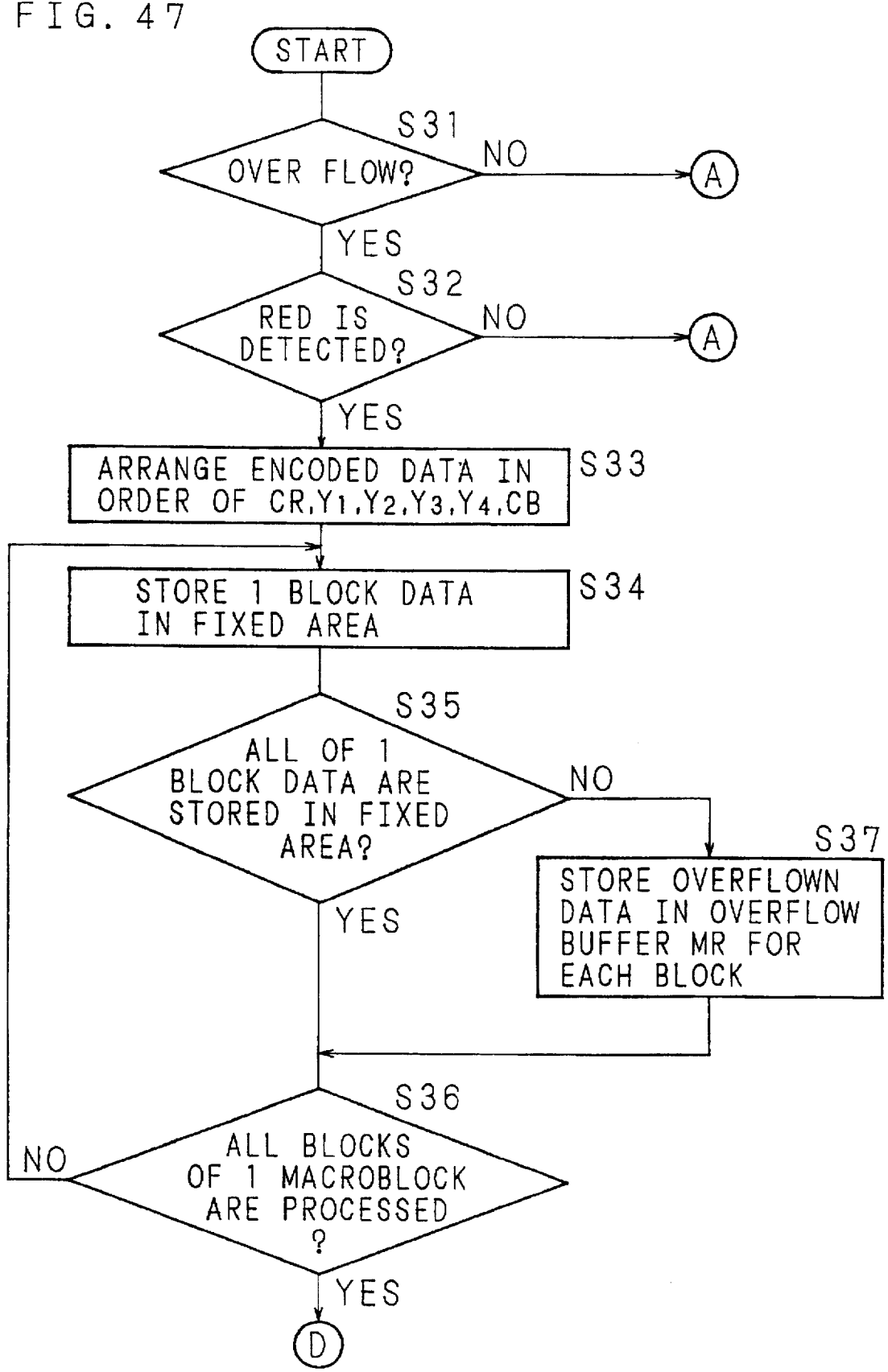
FIG. 47 is a flowchart illustrating a procedure for a packing method according to the ninth embodiment.
Figure 48:
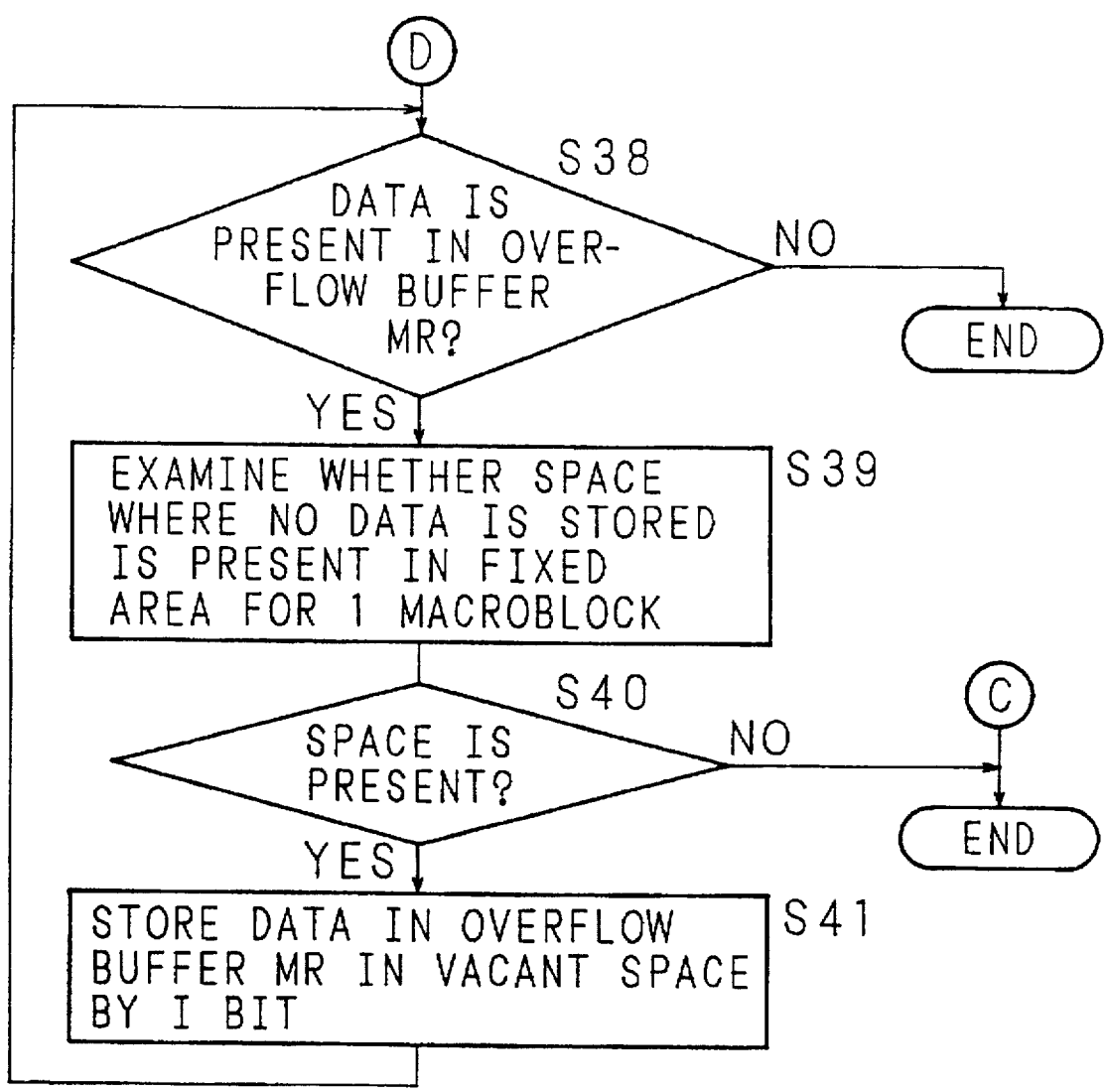
FIG. 48 is a flowchart illustrating a procedure for the packing method according to the ninth embodiment.

Next, the operation (packing method) of the high-efficiency encoding apparatus of the ninth embodiment will be described. FIGS. 47 and 48 show a flowchart illustrating the procedures for the packing method according to the ninth embodiment.

The macro block format shown in the previously given FIG. 21 is also used in this embodiment. First, as in the foregoing eighth embodiment, quantization and variable-length encoding are performed on all the DCT blocks in one macro block, and the code amount in terms of the number of bits is calculated for the whole macro block. Then, it is determined whether the total number of bits is smaller or larger than the code amount assigned to one macro block (step S31). When no overflow occurs, the process branches to step S21 in FIG. 45. The subsequent processing is the same as that described for the eighth embodiment, and therefore, the description of the subsequent processing steps will not be repeated here. When an overflow occurs, it is determined, on the basis of the output of the red detecting circuit 117, whether the macro block currently being processed has been detected as red (step S32), and if it has not been detected as red, the process proceeds to step S21 in FIG. 45, and the same processing as when no overflow occurs is performed.

On the other hand, when the macro block has been detected as red, the encoded data are arranged in the order of the color-difference signal CR, luminance signal Y1, Y2, Y3, Y4, and color-difference signal CB (step S33), after which the encoded data representing the DCT blocks of the respective signals are stored in the fixed area in the above order (step S34). For each signal, it is determined whether all encoded data of one block have been stored in the fixed area (step S35): When all data have been stored, the process proceeds to step S36; if all data of one DCT block have not been able to be stored in the fixed area, overflown encoded data are stored in the overflow buffer MR in the above order (step S37), after which the process proceeds to step S36. In step S36, it is determined whether all the DCT blocks in one macro block have been processed: When the processing of all the blocks is complete, the process proceeds to step S38; if not complete yet, the process returns to step S34 to repeat the above processing on the encoded data of the next block.

Next, it is determined whether there is any encoded data stored in the overflow buffer MR (step S38): If no such data is stored, the process is terminated; if there is any data stored in it, the fixed area assigned to the whole macro block is checked starting from the top thereof to see if there is any space where no data is stored (step S39). Then, it is determined whether there is any such vacant space (step S40). When there is no such space, the process is terminated; if there is any such space, data held in the overflow buffer MR is written in that space (step S41), after which the process returns to step S38 to repeat the above processing.

Embodiment 10

Figure 49:
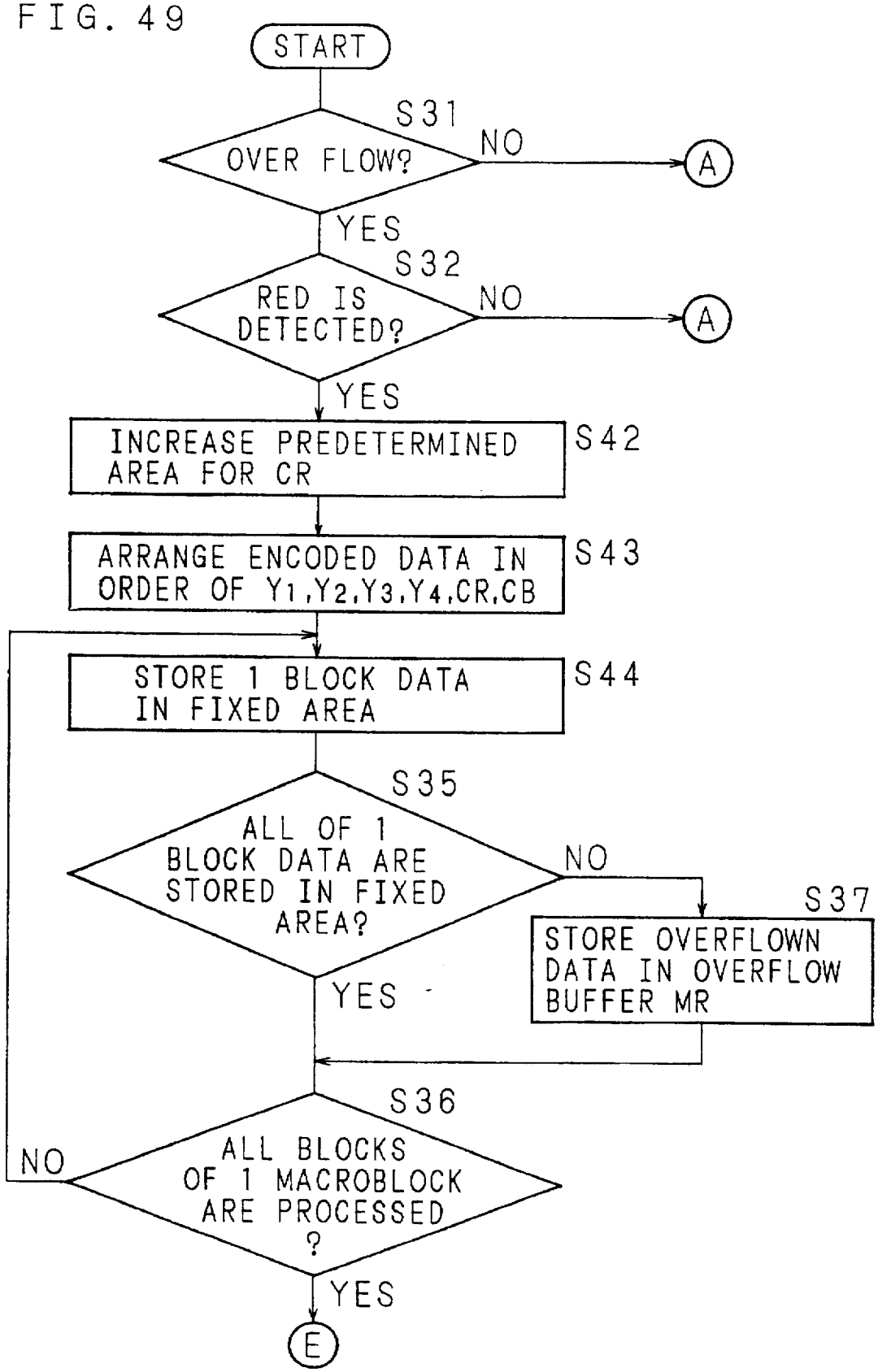
FIG. 49 is a flowchart illustrating a procedure for a packing method according to the 10th embodiment.
Figure 50:
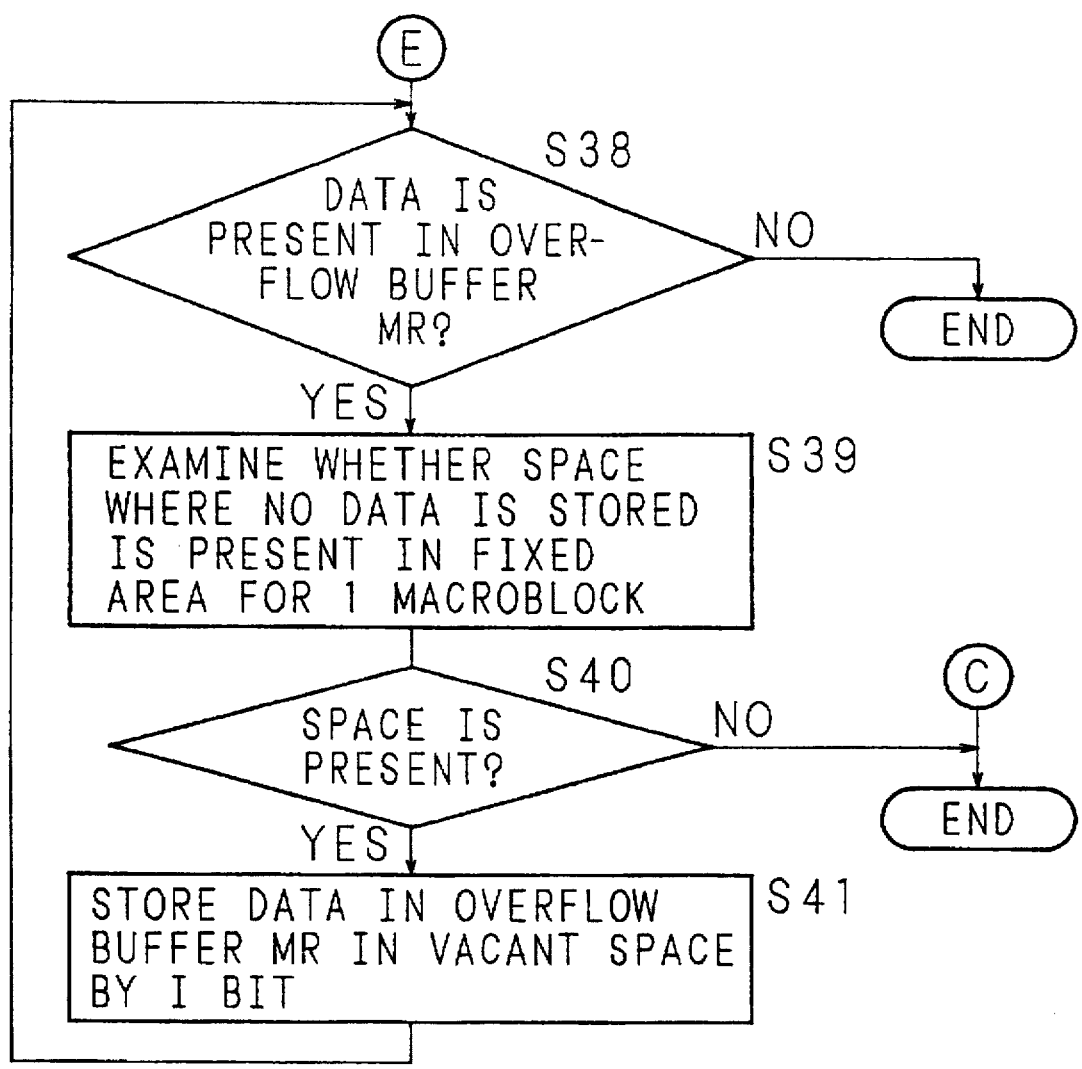
FIG. 50 is a flowchart illustrating a procedure for the packing method according to the 10th embodiment.

A 10th embodiment of the present invention will be described below. The configuration of the high-efficiency encoding apparatus of the 10th embodiment is the same as that of the foregoing ninth embodiment (FIG. 48). The macro block format shown in FIG. 21 is also used in this embodiment. FIGS. 49 and 50 show a flowchart illustrating the packing procedures according to the 10th embodiment. In FIGS. 49 and 50, the same processing steps as those illustrated in the flowchart of FIGS. 47 and 48 are designated by the same step numbers, and the description of such step numbers will not be repeated here.

When an overflow occurs within one macro block, and if the macro block currently being processed is judged as red based on the output of the red detecting circuit 117, the size of the designated area assigned to the color-difference signal CR is increased, while the designated areas assigned to the luminance signal Y1, Y2, Y3, Y4, and color-difference signal CB are reduced in size (step S42). On the other hand, when the CR block has not been detected as red, no change is made in the size of the fixed areas. After arranging the encoded data in the order of the luminance signal Y1, Y2, Y3, Y4, and color-difference signals CR and CB (step S43), the encoded data representing the DCT blocks of the respective signals are stored in the respective fixed areas in the above order (step S44). The subsequent processing steps are the same as those described in the ninth embodiment. It should, however, be noted that in the 10th embodiment, the encoded data representing the DCT blocks are stored in the respective designated areas, always in the order of the luminance signal Y1, Y2, Y3, Y4, and color-difference signals CR and CB.

Embodiment 11

Figure 51:
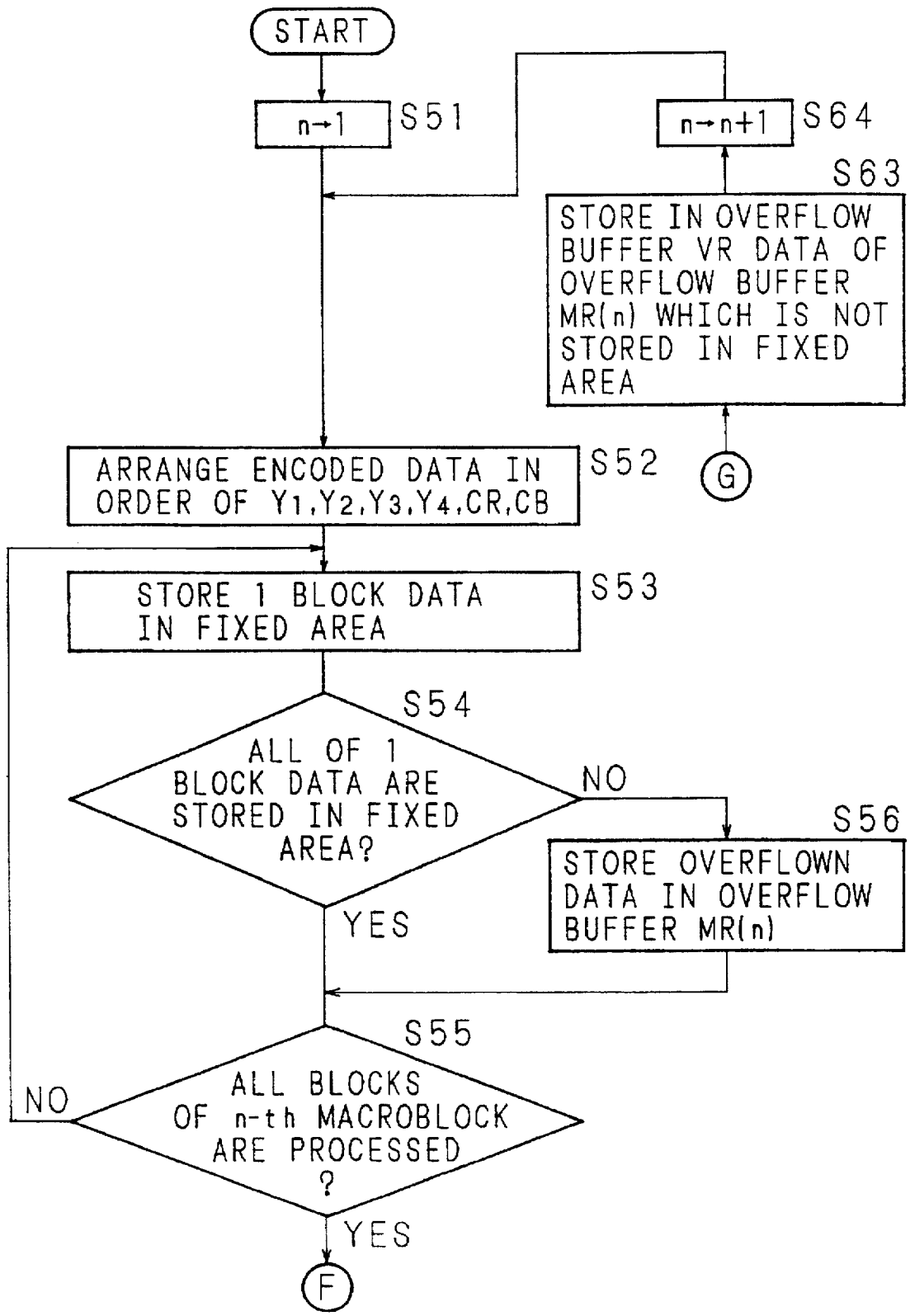
FIG. 51 is a flowchart illustrating a procedure for a packing method according to the 11th embodiment.
Figure 52:
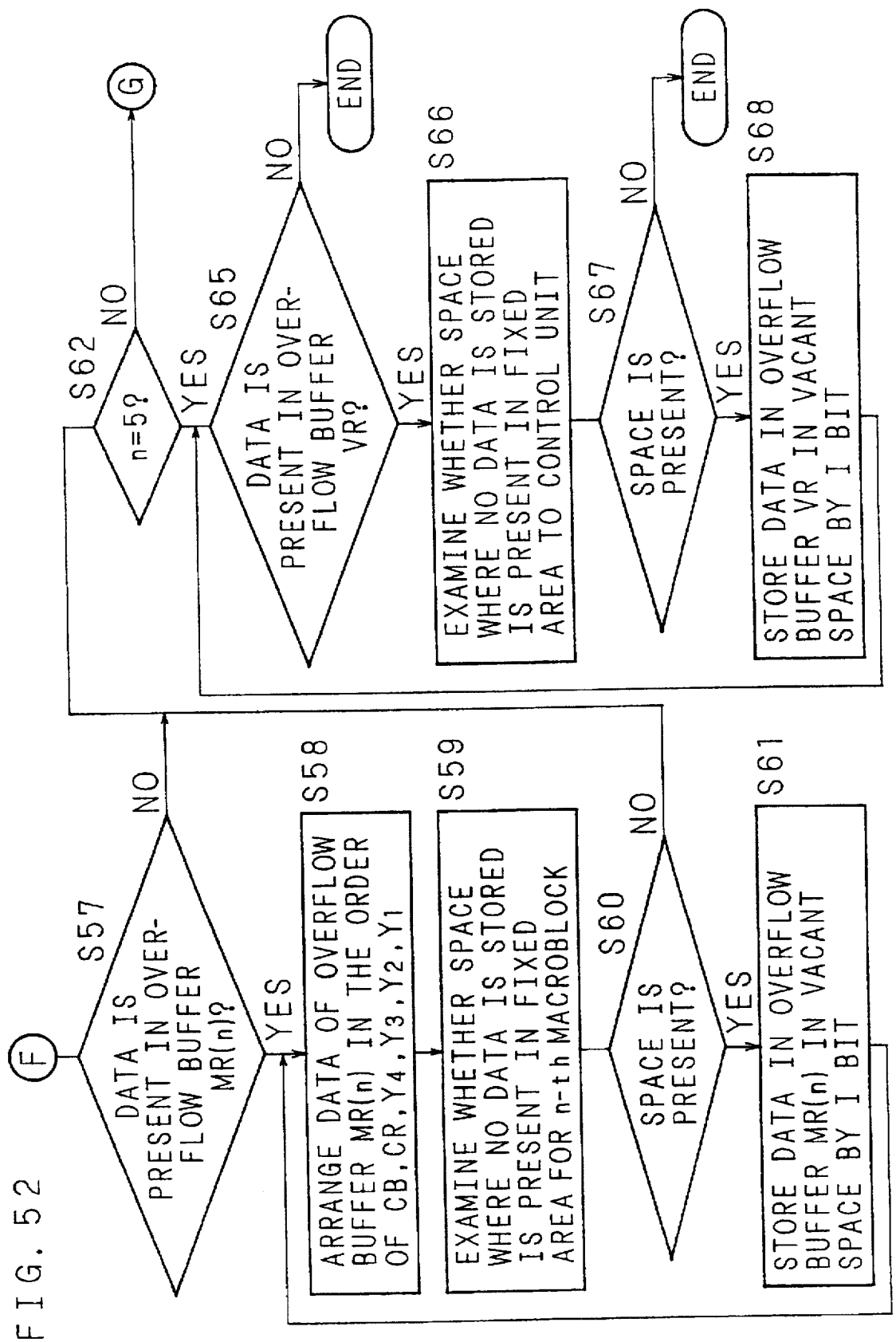
FIG. 52 is a flowchart illustrating a procedure for the packing method according to the 11th embodiment.

An 11th embodiment of the present invention will be described below. The configuration of the high-efficiency encoding apparatus of the 11th embodiment is the same as that of the foregoing eighth embodiment (FIG. 42). FIGS. 51 and 52 show a flowchart illustrating the packing procedures according to the 11th embodiment. An example of a control unit in the 11th embodiment is shown in FIG. 53, wherein five macro blocks are grouped together as a control unit.

First, the value of n representing the macro block number is set to 1 (step S51), and the encoded data are arranged in the order of the luminance signal Y1, Y2, Y3, Y4, and color-difference signals CR and CB (step S52). After that, the encoded data representing the DCT blocks of the respective signals are stored in the fixed area in the above order (step S53). For each signal, it is determined whether all encoded data of one block has been stored in the fixed area (step S54): When all data have been stored, the process proceeds to step S55; if all data of one DCT block have not been able to be stored in the fixed area, overflown encoded data are stored in the above order in the respective overflow buffers MR(n) assigned to the respective DCT blocks (step S86), after which the process proceeds to step S55. In step S55, it is determined whether all the DCT blocks in the n-th macro block have been processed: When the processing of all the blocks is complete, the process proceeds to step S57; if not complete yet, the process returns to step S53 to repeat the above processing on the encoded data of the next block.

In step S57, it is determined whether there is any encoded data stored in the overflow buffer MR(n); if there is any such data, the encoded data in the overflow buffer MR(n) are arranged in the order of the color-difference signals CB and CR and luminance signal Y4, Y3, Y2, Y1 (step S58), after which the fixed area assigned to the whole n-th macro block is checked starting from the top thereof to see if there is any space where no data is stored (step S59). Then, it is determined whether there is any such vacant space (step S80). When there is any such space, data held in the overflow buffer MR(n) is written in that space (step S60), after which the process returns to step S58 to repeat the above processing.

When, in step S87, there is no encoded data stored in the buffer, or if, in step S60, there is no vacant space, the process branches to step S62. In step S62, it is determined whether n=5; if not n=5, data held in the overflow buffer MR(n) but not yet stored in the fixed area is written in an overflow buffer VR (step S83), after which n is incremented by 1 (step S84), and the process returns to step S52.

On the other hand, when n=5 in step S62, then it is determined whether there is any encoded data stored in the overflow buffer VR (step S85). When no encoded data is stored, the process is terminated, but if there is any encoded data, the fixed area assigned to the whole control unit is checked starting from the top thereof to see if there is any space where no data is stored yet (step S66). Then, it is determined whether there is any such vacant space (step S87). When there is no such space, the process is terminated; if there is any such space, data held in the overflow buffer VR is written in that space (step S68), after which the process returns to step S85 to repeat the above processing.

The packing method of the 11th embodiment described according to the above flowchart can be summarized as follows. The encoded data representing the respective DCT blocks in one macro block (the n-th macro block) are stored in the fixed area in the order of the luminance signal Y1, Y2, Y3, Y4 and color-difference signals CR and CB. Data overflown from the fixed area in each DCT block are stored in the overflow buffer MR(n) assigned to the macro block, in the order of the color-difference signals CB and CR and luminance signal Y4, Y3, Y2, Y1. This processing is repeated on the macro blocks 1 to 5 in sequence. Then, the contents of the overflow buffer MR(n) are examined, starting from n=1 in sequence. When there is any encoded data stored in the overflow buffer MR(n), the fixed area assigned to the whole macro block concerned is checked for space where no data is stored yet: When there is such vacant space, encoded data held in the overflow buffer is written in that space; if there is no such vacant space, or if the vacant space is used up before writing all the data held in the overflow buffer, data held in the overflow buffer MR(n) but not yet written in the fixed area is transferred to a different overflow buffer VR. This processing is repeated on the macro blocks 1 to 5 in sequence, until all the data remaining in the overflow buffer MR(n) have been transferred to the overflow buffer VR. Finally, the contents of the overflow buffer VR are examined, and if there is any encoded data stored in the overflow buffer VR, the fixed area assigned to the whole control unit is checked for space where no data is stored yet. When there is such vacant space, the encoded data held in the overflow buffer VR are written in that space until the vacant space is filled up.

In the 11th embodiment, the order in which the overflown data are stored in the overflown buffer is not limited to the above example, but such data may be stored in an order different from the above-illustrated one.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A high-efficiency encoding apparatus, comprising:
    means for dividing a video signal into blocks;
    means for orthogonal-transforming the video signal divided into blocks to produce orthogonal-transformed coefficients;
    means for selecting a dominant low frequency coefficient and a dominant high frequency coefficient for each block from the orthogonal-transformed coefficients; and
    means for controlling a compression ratio for each block, based on a ratio of the dominant high frequency coefficient and the dominant low frequency coefficient.

2. The high-efficiency encoding apparatus of claim 1, wherein the dominant low frequency coefficient is the low frequency coefficient with a maximum value, A and the dominant high frequency coefficient is the high frequency coefficient with a maximum value, B.

3. The high-efficiency encoding apparatus of claim 1, said means for controlling the compressing ratio including, means for adaptively quantizing the orthogonal transformed coefficients from said means for orthogonal-transforming, using the compression ratio, and means for variable length encoding the adaptively quantized orthogonal-transformed coefficients, wherein the compression ratio is reduced for every block where an edge is detected.

4. The high-efficiency encoding apparatus of claim 2, wherein the maximum value A of the dominant low frequency coefficient and the maximum value B of the dominant high frequency coefficient are related such that, for each block, an edge is present when $0.75*A \leq B;$ $B \leq 1.25*A;$ and $TL \leq A \leq TH$ where TL and TH are lower and upper limits, respectively;

said means for controlling the compression ratio reducing the compression ratio for every block where an edge is present.

5. The high-efficiency encoding apparatus of claim 4, wherein $TL=(1/2)^m$, $TL=(1/2)^m-(1/2)^n$, or $TL=(1/2)^m+(1/2)^n$, where m and n are nonnegative integers (m<n).

6. The high-efficiency encoding apparatus of claim 4, wherein $TH=2^j$, $TH=2^j-(1/2)^k$, where j is a nonnegative integer and k is a positive integer.

7. The high-efficiency encoding apparatus of claim 2, wherein the maximum value A of the dominant low frequency coefficient and the maximum value B of the dominant high frequency coefficient are related such that, for each block, an edge is present when $0.125*A \leq B;$ $B \leq A;$ and $TL \leq A \leq TH$ where TL and TH are lower and upper limits, respectively;

said means for controlling the compression ratio reducing the compression ratio for every block where an edge is present.

8. The high-efficiency encoding apparatus of claim 7, wherein $TL=(1/2)^m$, $TL=(1/2)^m-(1/2)^n$, or $TL=(1/2)^m+(1/2)^n$, where m and n are nonnegative integers (m<n).

9. The high-efficiency encoding apparatus of claim 7, wherein $TH=2^j$, $TH=2^j-(1/2)^k$ or $TH=2^j+(1/2)^k$, where j is a nonnegative integer and k is a positive integer.

* * * * *